US011170658B2

(12) United States Patent
Watkins, Jr.

(10) Patent No.: US 11,170,658 B2
(45) Date of Patent: Nov. 9, 2021

(54) METHODS, SYSTEMS, AND COMPUTER PROGRAM PRODUCTS FOR NORMALIZATION AND CUMULATIVE ANALYSIS OF COGNITIVE POST CONTENT

(71) Applicant: East Carolina University, Greenville, NC (US)

(72) Inventor: Robert Todd Watkins, Jr., Chapel Hill, NC (US)

(73) Assignee: East Carolina University, Greenville, NC (US)

(*) Notice: Subject to any disclaimer, the term of this patent is extended or adjusted under 35 U.S.C. 154(b) by 447 days.

(21) Appl. No.: 16/117,827

(22) Filed: Aug. 30, 2018

(65) Prior Publication Data

US 2018/0374377 A1     Dec. 27, 2018

Related U.S. Application Data

(63) Continuation-in-part of application No. 15/794,342, filed on Oct. 26, 2017, now Pat. No. 10,878,711, which is a continuation of application No. 13/425,627, filed on Mar. 21, 2012, now abandoned.

(60) Provisional application No. 62/552,738, filed on Aug. 31, 2017, provisional application No. 61/466,207, filed on Mar. 22, 2011.

(51) Int. Cl.
    *G09B 7/00*       (2006.01)

(52) U.S. Cl.
    CPC ........................ *G09B 7/00* (2013.01)

(58) Field of Classification Search
    CPC ................. G09B 7/00; G09B 7/02
    See application file for complete search history.

(56) References Cited

U.S. PATENT DOCUMENTS 6,877,987 B2    4/2005   Kijlack
8,606,792 B1 *   12/2013   Jackson .............. G06F 16/9535
                                            707/748

(Continued)

FOREIGN PATENT DOCUMENTS

JP           11296061      10/1999
JP         2005157621       6/2005

(Continued)

OTHER PUBLICATIONS

Notice of Final Rejection, dated Jul. 27, 2018, for corresponding Korean Application No. 10-2013-7027083, including English translation (12 pages).

(Continued)

*Primary Examiner* — Kurt Fernstrom
(74) *Attorney, Agent, or Firm* — Myers Bigel, P.A.

(57) ABSTRACT

Methods, systems, and computer program products for assessing a student in in an online discussion event using at least one processor of a computer includes obtaining discussion data comprising a plurality of discussion posts in a data file, each comprising a post author and post content, grouping the plurality of discussion posts of the data file into a plurality of discussion threads, classifying individual discussion posts of the plurality of discussion posts based on a post type, and assigning relative value units (RVUs) to at least one of the plurality of discussion posts, where the RVUs are time-normalized scores based on a complexity of the discussion post.

20 Claims, 48 Drawing Sheets

(29 of 48 Drawing Sheet(s) Filed in Color)

(56) References Cited

U.S. PATENT DOCUMENTS

| | | | |
|---|---|---|---|
| 10,540,906 B1* | 1/2020 | Fieldman | G06F 3/0481 |
| 2003/0180698 A1 | 9/2003 | Salerian | |
| 2005/0196742 A1 | 9/2005 | Harber | |
| 2006/0286539 A1 | 12/2006 | Tidwell-Scheuring | |
| 2007/0031801 A1 | 2/2007 | Tidwell-Scheuring | |
| 2008/0187898 A1 | 8/2008 | Hattie | |
| 2008/0320090 A1* | 12/2008 | Bryan | G06Q 10/00 709/206 |
| 2009/0280460 A1 | 11/2009 | Yaskin | |
| 2010/0316986 A1 | 12/2010 | De La Chica | |
| 2011/0238670 A1* | 9/2011 | Mercuri | G06F 16/9535 707/748 |
| 2012/0141968 A1 | 6/2012 | Li | |
| 2012/0208168 A1 | 8/2012 | Atkinson | |
| 2012/0315616 A1* | 12/2012 | Fourman | G09B 7/02 434/350 |
| 2013/0268536 A1* | 10/2013 | Nachiappan | G06F 16/9535 707/741 |
| 2014/0234810 A1* | 8/2014 | Flor | G06F 40/205 434/169 |
| 2014/0295384 A1* | 10/2014 | Nielson | G09B 5/00 434/157 |
| 2016/0104261 A1* | 4/2016 | Brinton | G06Q 50/01 705/319 |
| 2017/0154541 A1* | 6/2017 | King | G06F 40/169 |
| 2017/0337837 A1* | 11/2017 | Roy | G09B 7/02 |

FOREIGN PATENT DOCUMENTS

| | | |
|---|---|---|
| JP | 2008310787 | 12/2008 |
| KR | 20090096040 | 6/2009 |
| KR | 20100042636 | 4/2010 |
| KR | 101009380 | 1/2011 |
| WO | 2010066003 | 6/2010 |

OTHER PUBLICATIONS

Notice of Preliminary Rejection, dated Jan. 18, 2018, for corresponding Korean Application No. 10-2013-7027083, including English translation (28 pages).

PCT Search Report and Written Opinion, dated Nov. 30, 2012, for corresponding International Application No. PCT/US2012/030037 (10 pages).

Examiner's Report, dated Aug. 21. 2018 for corresponding Canadian Apolication No. 2,830,075 (8 pages).

Extended European Search Report, dated Jul. 8, 2014, for corresponding European Application No. 12760399.1 (6 pages).

Chinese 2nd Office Action, dated Sep. 5, 2016, for corresponding Chinese Application No. 2011280014075.4, including English translation (30 pages).

* cited by examiner

FIG. 3

| Institution Name | | | | |
|---|---|---|---|---|
| Post Author | Type | MicroComps | RVU | Comments |
| Bill Student | Student Post Content | 01.01.01.01<br>01.01.01.02 | 1<br>2 | |
| Martha Student | Student Post Logistics | 01.01.01.02<br>01.01.01.03 | 1<br>2 | |
| Bill Student | Student Post Logistics | 01.01.01.01<br>01.01.01.02 | 1<br>2 | |
| Frank Faculty | Faculty Post Guidance | | | |
| Bill Student | Student Post Other | 01.01.01.04 | 4 | |

— 80s

Faculty Post Case 0
Faculty Post Guidance 1
Faculty Post Other 0
Student Post Content 1
Student Post Logistics 2
Student Post Other 2

| Student | # Posts | Total RVUs |
|---|---|---|
| Bill Student | 3 | 11 |
| Martha Student | 2 | 10 |
| Total | 5 | 21 |

— 80w

Submit

FIG. 4

| Institution Name | |
|---|---|
| Student | Post content -content- content content Post content -content- content content Post content -content- content content Post content -content- content content Post content -content- content content Post content -content- content content |

— 80m

Word Count: 32

Posting Type [ ▼ ]

Microcompetency Codes:

[        ]   RVU: [  ▼ ]

[        ]   RVU: [  ▼ ]

[        ]   RVU: [  ▼ ]

Comments: [                    ]

Progress...75/100    Overview    [ Next » ]   [ Submit ]

| id | replied_to_id | thread_id | timestamp | group | recipients | private | user_id | user | email_address | body url attachment_ids |
|---|---|---|---|---|---|---|---|---|---|---|
| Unique ID | Unique ID | Unique ID | 10/17/2011 12:44 | | | | 5920588 | Student 1 | S1@edu.edu | What are tl https://www.yammer.com/messages/121148394 |
| Unique ID | Unique ID | Unique ID | 10/17/2011 12:44 | | | | 5920589 | Student 3 | S3@edu.edu | Reta page https://www.yammer.com/messages/121148447 |
| Unique ID | Unique ID | Unique ID | 10/17/2011 12:45 | | | | 5920587 | Student 4 | S4@edu.edu | in the moc https://www.yammer.com/messages/121148690 |
| Unique ID | Unique ID | Unique ID | 10/17/2011 12:45 | | | | 5920588 | Student 1 | S1@edu.edu | In some ar https://www.yammer.com/messages/121148615 |
| Unique ID | Unique ID | Unique ID | 10/17/2011 12:46 | | | | 5920587 | Student 4 | S4@edu.edu | Reta page https://www.yammer.com/messages/121148777 |
| Unique ID | Unique ID | Unique ID | 10/17/2011 12:46 | | | | 5920588 | Student 1 | S1@edu.edu | Reta page https://www.yammer.com/messages/121148783 |
| Unique ID | Unique ID | Unique ID | 10/17/2011 12:49 | | | | 5920587 | Student 4 | S4@edu.edu | Reta page https://www.yammer.com/messages/121149026 |
| Unique ID | Unique ID | Unique ID | 10/17/2011 13:01 | | | | 5920588 | Student 1 | S1@edu.edu | What are tl https://www.yammer.com/messages/121152540 |
| Unique ID | Unique ID | Unique ID | 10/17/2011 13:12 | | | | 5920587 | Student 4 | S4@edu.edu | Women te https://www.yammer.com/messages/121155597 |
| Unique ID | Unique ID | Unique ID | 10/17/2011 13:13 | | | | 6640354 | Student 2 | S2@edu.edu | estrogen a https://www.yammer.com/messages/121155722 |
| Unique ID | Unique ID | Unique ID | 10/17/2011 13:14 | | | | 5920588 | Student 1 | S1@edu.edu | random. F https://www.yammer.com/messages/121155902 |
| Unique ID | Unique ID | Unique ID | 10/17/2011 13:14 | | | | 6640354 | Student 2 | S2@edu.edu | due to test https://www.yammer.com/messages/121155938 |
| Unique ID | Unique ID | Unique ID | 10/17/2011 13:15 | | | | 5920587 | Student 4 | S4@edu.edu | Women wl https://www.yammer.com/messages/121156090 |
| Unique ID | Unique ID | Unique ID | 10/17/2011 13:15 | | | | 5920588 | Student 1 | S1@edu.edu | Testosterc https://www.yammer.com/messages/121156203 |
| Unique ID | Unique ID | Unique ID | 10/17/2011 13:16 | | | | 6640354 | Student 1 | S1@edu.edu | Body fat cz https://www.yammer.com/messages/121156278 |
| Unique ID | Unique ID | Unique ID | 10/17/2011 13:16 | | | | 5920588 | Student 2 | S2@edu.edu | is it testtest https://www.yammer.com/messages/121156394 |
| Unique ID | Unique ID | Unique ID | 10/17/2011 13:18 | | | | 6640354 | Student 2 | S2@edu.edu | makes = https://www.yammer.com/messages/121156631 |
| Unique ID | Unique ID | Unique ID | 10/17/2011 13:18 | | | | 5920588 | Student 1 | S1@edu.edu | the tenden https://www.yammer.com/messages/121156813 |
| Unique ID | Unique ID | Unique ID | 10/17/2011 13:25 | | | | 6640354 | Student 1 | S1@edu.edu | http://ww https://www.yammer.com/messages/121158598 |
| Unique ID | Unique ID | Unique ID | 10/17/2011 13:28 | | | | 5920588 | Student 2 | S2@edu.edu | Ah, I had re https://www.yammer.com/messages/121159492 |
| Unique ID | Unique ID | Unique ID | 10/17/2011 13:37 | | | | 5920588 | Student 3 | S3@edu.edu | What is https://www.yammer.com/messages/121161947 |
| Unique ID | Unique ID | Unique ID | 10/17/2011 13:37 | | | | 5920588 | Student 1 | S1@edu.edu | Sensible: I https://www.yammer.com/messages/121162113 |
| Unique ID | Unique ID | Unique ID | 10/17/2011 13:38 | | | | 6640354 | Student 2 | S2@edu.edu | insensible: https://www.yammer.com/messages/121162286 |
| Unique ID | Unique ID | Unique ID | 10/17/2011 13:38 | | | | 5920588 | Student 1 | S1@edu.edu | insensible: https://www.yammer.com/messages/121162287 |
| Unique ID | Unique ID | Unique ID | 10/17/2011 13:38 | | | | 5920589 | Student 3 | S3@edu.edu | Insensible: https://www.yammer.com/messages/121162336 |
| Unique ID | Unique ID | Unique ID | 10/17/2011 13:39 | | | | 6640354 | Student 2 | S2@edu.edu | insensible: https://www.yammer.com/messages/121162341 |
| Unique ID | Unique ID | Unique ID | 10/17/2011 13:40 | | | | 5920588 | Student 1 | S1@edu.edu | So insensic https://www.yammer.com/messages/121162789 |
| Unique ID | Unique ID | Unique ID | 10/17/2011 17:12 | | | | 5920588 | Student 1 | S1@edu.edu | Hemangior https://www.yammer.com/messages/121212488 |
| Unique ID | Unique ID | Unique ID | 10/17/2011 17:12 | | | | 5920588 | Student 1 | S1@edu.edu | A hemangi https://www.yammer.com/messages/121212503 |
| Unique ID | Unique ID | Unique ID | 10/17/2011 17:12 | | | | 5920589 | Student 3 | S3@edu.edu | Symptoms https://www.yammer.com/messages/121212597 |
| Unique ID | Unique ID | Unique ID | 10/17/2011 17:13 | | | | 5920588 | Student 1 | S1@edu.edu | a benign tu https://www.yammer.com/messages/121212599 |
| Unique ID | Unique ID | Unique ID | 10/17/2011 17:13 | | | | 5920589 | Student 3 | S3@edu.edu | Hepatic he https://www.yammer.com/messages/121212748 |
| Unique ID | Unique ID | Unique ID | 10/17/2011 17:13 | | | | 5920588 | Student 1 | S1@edu.edu | Recently, i https://www.yammer.com/messages/121212789 |

FIG. 5

Competency Grid 01 - Quantitative Methods

01 – Concepts of Measurement
01.01.01.00
01.01.01.01 Scales of Measurement
01.01.01.02 Distribution
01.01.01.03 Central Tendency
01.01.01.04 Variability
01.01.01.05 Probability
01.01.01.06 Disease Prevalence
01.01.01.07 Disease Incidence
01.01.01.08 Disease Outcomes
01.01.01.09 Associations
01.01.01.10 Health Impact
01.01.01.11 Sensitivity
01.01.01.12 Specificity
01.01.01.13 Predictive Values 02 – Study Design
01.01.02.00
01.01.02.01 Types of Experimental Studies
01.01.02.02 Types of Observational Studies
01.01.02.03 Sampling and Sample Size
01.01.02.04 Subject Selection and Exposure Allocation
01.01.02.05 Outcome Assessment
01.01.02.06 Internal and External Validity 03 – Hypothesis Testing and Statistical Inference
01.01.03.00
01.01.03.01 Confidence Intervals
01.01.03.02 Statistical Significance and Type I Error
01.01.03.03 Statistical Power and Type II Error

FIG. 7A

Competency Grid 02 – Genetics and Embryogenesis

01 – Gene Expression
01.02.01.00
01.02.01.01 DNA structure
01.02.01.02 DNA Replication
01.02.01.03 Gene Structure and Organization
01.02.01.04 Recombination 02 – Gene Transcription
01.02.02.00
01.02.02.01 Transcription of DNA into RNA
01.02.02.02 Regulation 03 – Gene Translation
01.02.03.00
01.02.03.01 Genetic Code
01.02.03.02 Structure and Function of tRNA
01.02.03.03 Structure and Function of Ribosomes
01.02.03.04 Structure and Function of Proteins
01.02.03.05 Protein Synthesis
01.02.03.06 Regulation of Translation
01.02.03.07 Post-translational Modifications
01.02.03.08 Protein Degradation 04 – Embryogenesis
01.02.04.00
01.02.04.01 Programmed Gene Expression
01.02.04.02 Cleavage and Blastocyst Formation
01.02.04.03 Homeotic Genes 05 – Congenital and Developmental Abnormalities
01.02.05.00
01.02.05.01 Principles
01.02.05.02 Patterns of Anomalies
01.02.05.03 Dysmorphogenesis
01.02.05.04 Down's syndrome
01.02.05.05 Patau's syndrome
01.02.05.06 Edward's syndrome
01.02.05.07 Autosomal deletion syndromes
01.02.05.08 Balanced autosomal translocation
01.02.05.09 Gonadal dysgenesis
01.02.05.10 Klinefelter's syndrome
01.02.05.11 Hermaphrodite
01.02.05.12 Anencephalus and similar anomalies
01.02.05.13 Congenital anomalies of face, and neck
01.02.05.14 Multiple Congenital Anomalies
01.02.05.15 Disorders of Fetal Growth and Development
01.02.05.16 Morbidity Associated with Birth Process
01.02.05.17 Systemic Conditions Unique to The Newborn

FIG. 7B

Group: 20158019Blue
Course: 8019
Date:

| Post Author | Type | MicroComps | RVU | Comments |
|---|---|---|---|---|
| | Student Post Logistics | | | |
| | Student Post Content | 02.03.02.00 | 0.1 | |
| | Student Post Logistics | | | |
| | Student Post Content | 02.03.02.00 | 0.1 | |
| | Student Post Content | 02.03.02.00 | 0.1 | |
| | Student Post Logistics | | | |
| | Student Post Content | 01.04.01.00 | 0.1 | |
| | Student Post Logistics | | | |
| | Student Post Other | | | |
| | Student Post Other | | | |
| | Student Post Logistics | | | |
| | Student Post Content | 01.04.01.00 | 0.2 | |
| | Student Post Logistics | | | |
| | Student Post Logistics | | | |
| | Student Post Content | 02.03.02.00 | 0.1 | |
| | Student Post Content | 02.03.11.00 | 0.1 | |
| | Student Post Content | 02.03.02.00 | 0.1 | |
| | Student Post Content | 02.03.11.00 | 0.2 | |
| | Student Post Content | 02.03.11.00 | 0.2 | |
| | Student Post Content | 02.03.02.00 | 0.1 | |
| | Student Post Content | 02.03.02.00 | 0.1 | |
| | Student Post Logistics | | | |
| | Student Post Logistics | | | |
| | Student Post Content | 02.03.02.00 | 0.1 | |
| | Student Post Content | 02.03.02.00 | 0.1 | |
| | Student Post Logistics | | | |
| | Student Post Logistics | | | |
| | Student Post Other | | | |
| | Student Post Other | | | |
| | Student Post Logistics | | | |
| | Student Post Content | 02.03.02.00 | 0.1 | |
| | Student Post Content | 02.03.02.00 | 0.1 | |
| | Student Post Content | 02.03.02.00 | 0.1 | |
| | Student Post Content | 02.03.02.00 | 0.1 | |
| | Student Post Logistics | | | |
| | Student Post Content | 02.03.04.00 | 0.1 | |
| | Student Post Logistics | | | |
| | Student Post Logistics | | | |
| | Student Post Logistics | | | |
| | Student Post Content | 02.03.04.00 | 0.1 | |
| | Student Post Content | 02.03.02.00 | 0.1 | |
| | Student Post Content | 02.03.02.00 | | |
| | Student Post Content | 02.03.04.00 | 0.2 | |
| | Student Post Content | 02.03.04.00 | 0.2 | |
| | Student Post Logistics | | | |
| | Student Post Logistics | 02.03.05.00 | 0.1 | |
| | Student Post Content | 02.03.05.00 | 0.2 | |
| | Student Post Logistics | | | |
| | Student Post Content | 02.03.05.00 | 0.2 | |
| | Student Post Logistics | | | |
| | Student Post Content | 02.03.05.00 | 0.1 | |
| | Student Post Content | 02.03.05.00 | 0.1 | |
| | Student Post Content | 02.03.02.00 | 0.1 | |
| | Student Post Content | 02.03.05.00 | 0.1 | |
| | Faculty Post Guidance | | | |
| | Student Post Logistics | | | |
| | Student Post Content | 01.09.03.00 | 0.2 | |
| | Student Post Logistics | | | |
| | Student Post Content | 01.09.03.00 | 0.2 | |

FIG. 13

20168019Blue

| RVU Commit Summary ||
| Name | RVUs |
| Student 1 | 4 |
| Student 2 | 4 |
| Student 3 | 4 |
| Student 4 | 4 |
| Student 5 | 4 |
| Student 6 | 4 |

Student Posts

☐ Student 1
Student Post Content: 1 (0.1)
 02.03.04.00: 0.1
Student Post Logistics: 1
Student Post Other: 0

☐ Student 2
Student Post Content: 4 (0.4)
 01.04.01.00: 0.1
 02.03.11.00: 0.1
 02.03.02.00: 0.2
Student Post Logistics: 3
Student Post Other: 2

☐ Student 3
Student Post Content: 11 (1.5)
 02.03.02.00: 0.4
 02.03.11.00: 0.2
 02.03.04.00: 0.3
 02.03.05.00: 0.4
 01.09.03.00: 0.2
Student Post Logistics: 12
Student Post Other: 0

☐ Student 4
Student Post Content: 9 (1)
 02.03.02.00: 0.6
 01.04.01.00: 0.2
 02.03.11.00: 0.2
Student Post Logistics: 4
Student Post Other: 1

☐ Student 5
Student Post Content: 7 (1)
 02.03.02.00: 0.3
 02.03.04.00: 0.2
 02.03.05.00: 0.3
 01.09.03.00: 0.2
Student Post Logistics: 2
Student Post Other: 0

☐ Student 6
Student Post Content: 0 (0)
Student Post Logistics: 0
Student Post Other: 1

Group Overview

☑ Group Totals
Student Post Content: 32 (4)
 02.03.02.00: 1.5
 01.04.01.00: 0.3
 02.03.11.00: 0.5
 02.03.04.00: 0.6
 02.03.05.00: 0.7
 01.09.03.00: 0.4
Student Post Logistics: 22
Student Post Other: 4

FIG. 14

 EAST CAROLINA UNIVERSITY.

[ HOME PAGE ] [ COMPETENCY GRIDS ] [ DATA SOURCES ] [ GRID MANAGEMENT ]

[ 10 - MUSCULOSKELETAL SYSTEM  ]

CLICK AND DRAG TABLE TO NAVIGATE SHIFT-CLICK CELL FOR CELL INFORMATION

| STUDENT# | POINTS | 01-SKEL-NORMAL DEVELOPEMENT AND STRUCTURES | 02-SKEL-NORMAL FUNCTIONS | 03-MUSC-NORMAL DEVELOPEMENT AND STRUCTURES | 04-MUSC-NORMAL FUNCTIONS | 05-ARTH-NORMAL DEVELOPEMENT AND STRUCTURES | 06-ARTH-NORMAL FUNCTIONS | 07-MUSK-UNIQUE COMBINED SYSTEM FUNCTIONS | 08-MUSK-ABNORMAL PROCESSES | 09-MUSK-PHYSICAL DIAGNOSTIC PROCEDURES | 10-MUSK-RADIOGRAPHIC DIAGNOSTIC PROCEDURES | 11-MUSK-PHYSICAL THERAPY | 12-MUSK-PHARMACOTHERAPEUTICS |
|---|---|---|---|---|---|---|---|---|---|---|---|---|---|
| STUDENT HIGH | | 5.6 | 0.6 | 8.3 | | 4.3 | 0.1 | | 8.5 | 0.1 | | 0.2 | 0.2 |
| AVERAGE | | 3.21 | 0.30 | 3.31 | | 2.40 | 0.10 | | 6.20 | 0.10 | | 0.15 | 0.13 |
| STUDENT LOW | | 0.3 | 0.1 | 1.9 | | 1.3 | 0.1 | | 2.4 | 0.1 | | 0.1 | 0.1 |
| | 7.1 | 0.3 | | 2.1 | | 2.1 | | | 2.4 | | | | |
| | 13.8 | 3.3 | | 2.5 | | 1.5 | | | 5.4 | | | | |
| | 22.1 | 4.6 | 0.6 | 8.3 | | 3.6 | | | 5 | | | | |
| | 20.4 | 5.6 | | 2.5 | | 3.5 | 0.1 | | 8.5 | | | | 0.1 |
| | 13.2 | 1.4 | | 3.5 | | 1.7 | | | 6.5 | | | | |
| | 12.7 | 3.6 | | 1.9 | | 1.7 | | | 4.9 | 0.1 | | | |
| | 12.7 | 3.6 | | 1.9 | | 1.7 | | | 4.9 | 0.1 | | | |
| | 12.6 | 1.6 | | 2.4 | | 1.3 | | | 5.2 | | | | 0.1 |
| | 13.2 | 1.4 | | 3.5 | | 1.7 | | | 6.5 | | | | |
| | 16.3 | 3.9 | | 2 | | 2 | | | 8.3 | | | 0.1 | |
| | 13.2 | 1.4 | | 3.5 | | 1.7 | | | 6.5 | | | | |
| | 20.4 | 5.6 | | 2.5 | | 3.5 | 0.1 | | 8.5 | | | | 0.1 |
| | 20.4 | 5.6 | | 2.5 | | 3.5 | 0.1 | | 8.5 | | | | 0.1 |
| | 17.3 | 2.6 | 0.2 | 4.1 | | 2.2 | | | 7.4 | 0.1 | | 0.2 | 0.2 |
| | 21.4 | 5.1 | 0.1 | 3.9 | | 4.3 | | | 7.9 | | | | |
| | 7.1 | 0.3 | | 2.1 | | 2.1 | | | 2.4 | | | | |
| | 13.2 | 1.4 | | 3.5 | | 1.7 | | | 6.5 | | | | |
| | 21.4 | 5.1 | 0.1 | 3.9 | | 4.3 | | | 7.9 | | | | |
| | 16.3 | 3.9 | | 2 | | 2 | | | 8.3 | | | 0.1 | |
| | 22.1 | 4.6 | 0.6 | 8.3 | | 3.6 | | | 5 | | | | |
| | 22.1 | 4.6 | 0.6 | 8.3 | | 3.6 | | | 5 | | | | |
| | 21.4 | 5.1 | 0.1 | 3.9 | | 4.3 | | | 7.9 | | | | |
| | 18.8 | 3.3 | | 2.5 | | 1.5 | | | 5.4 | | | | |
| | 16.3 | 3.9 | | 2 | | 2 | | | 8.3 | | | 0.1 | |

FIG. 16

| Name | User Access | |
|---|---|---|
| 00 - Uber Competency Grid | | |
| 00C - Uber Competency Grid (clinical) | | |
| 00D - Uber Competency Grid (discussion) | | |
| 00X - Uber Competency Grid (exam) | | |
| 01 - Quantitative Methods | | |
| 02 - Genetics and Embryogenesis | | |
| 03 - Anatomy Discipline | | |
| 04 - Cell Biology and Metabolism | | |
| 05 - Human Immunity | | |
| 06 - Physiology Discipline | | |
| 07 - Pathology Discipline (and Microbiology) | | |
| 08 - Pharmacology Discipline | | |
| 09 - Integument | | |
| 10 - Musculoskeletal System | | |
| 11 - Nervous System(s) | | |
| 12 - Endocrine System | | |
| 13 - Cardiovascular System (Blood and Lymphatics) | | |
| 14 - Respiratory System | | |
| 15 - Digestive System (Oral Detail) | | |
| 15C - Digestive System (Oral Detail) | | |
| 16 - Oral and Dental Pathology | | |
| 16C - Oral and Dental Pathology (clinical) | | |
| 17 - Digestive System (Non-Oral) | | |
| 18 - Urinary System | | |
| 19 - Reproductive Systems | | |
| 20 - Patient Considerations | | |
| 21 - Physician Considerations | | |
| 22 - Health Care Issues | | |
| 23 - Dental / Oral Pain Control | | |

FIG. 17

 EAST CAROLINA UNIVERSITY.

| HOME PAGE | COMPETENCY GRIDS | DATA SOURCES | GRID MANAGEMENT |

03 - ANATOMY DISCIPLINE

CLICK AND DRAG TABLE TO NAVIGATE SHIFT-CLICK CELL FOR CELL INFORMATION

| STUDENT# | POINTS | 01 - SCOPE OF HUMAN ANATOMY | 02 - ANATOMICAL TERMINOLOGY | 03 - BODY CAVITIES AND REGIONS | 04 - ITEG - NORMAL STRUCTURES AND FUNCTION | 05 - SKEL - NORMAL DEVELOPMENT AND STRUCTURES | 06 - MUSC - NORMAL DEVELOPMENT AND STRUCTURES | 07 - ARTH - NORMAL DEVELOPMENT AND STRUCTURES | 08 - NERV - NORMAL DEVELOPMENT AND STRUCTURES | 09 - ECRI - NORMAL DEVELOPMENT AND STRUCTURES | 10 - HEME - NORMAL DEVELOPMENT AND STRUCTURES | 11 - LYMH - NORMAL DEVELOPMENT AND STRUCTURES | 12 - CVAS - NORMAL DEVELOPMENT AND STRUCTURES | 13 - RESP - NORMAL DEVELOPMENT AND STRUCTURES |
|---|---|---|---|---|---|---|---|---|---|---|---|---|---|---|
| STUDENT HIGH | | 0.2 | 1.9 | 0.2 | 1.9 | 5.6 | 8.3 | 4.3 | 8.4 | 1.3 | 1 | 1.3 | 1.4 | 0.7 |
| AVERAGE | | 0.15 | 0.98 | 0.20 | 1.03 | 3.21 | 3.31 | 2.40 | 4.11 | 0.77 | 0.54 | 0.68 | 0.81 | 0.25 |
| STUDENT LOW | | 0.1 | 0.2 | 0.2 | 0.1 | 0.3 | 1.9 | 1.3 | 1.2 | 0.4 | 0.3 | 0.1 | 0.3 | 0.1 |
| | 16.1 | | 0.2 | | | 0.3 | 2.1 | 2.1 | 3.5 | 0.7 | | | | 0.1 |
| | 27.8 | | 1.1 | | 0.4 | 3.3 | 2.5 | 1.5 | 3 | 1.1 | | | 1 | 0.1 |
| | 58.7 | | 1.4 | | 0.6 | 4.6 | 8.3 | 3.6 | 6.4 | 0.5 | 1 | 0.6 | | 0.7 |
| | 37.0 | | 1.9 | | 1.3 | 5.6 | 2.5 | 3.5 | 3.6 | 0.9 | 0.4 | 1.3 | 1 | 0.2 |
| | 28.1 | 0.2 | 1.3 | | | 1.4 | 3.5 | 1.7 | 6.8 | 1.3 | | 0.6 | | 0.1 |
| | 22.9 | | 1.1 | | 0.1 | 3.6 | 1.9 | 1.7 | 2.3 | 1 | | | 0.4 | 0.2 |
| | 22.9 | | 1.1 | | 0.1 | 3.6 | 1.9 | 1.7 | 2.3 | 1 | | | 0.4 | 0.2 |
| | 28.8 | | 0.7 | | 1 | 1.6 | 2.4 | 1.3 | 1.2 | 0.5 | 0.5 | | 0.4 | 0.1 |
| | 28.1 | 0.2 | 1.3 | | | 1.4 | 3.5 | 1.7 | 6.8 | 1.3 | | 0.6 | | 0.1 |
| | 40.7 | | 0.6 | | 1.9 | 3.9 | 2 | 2 | 3.7 | 0.4 | | 0.1 | 1.1 | 0.4 |
| | 28.1 | 0.2 | 1.3 | | | 1.4 | 3.5 | 1.7 | 6.8 | 1.3 | | 0.6 | | 0.1 |
| | 37.0 | | 1.9 | | 1.3 | 5.6 | 2.5 | 3.5 | 3.6 | 0.9 | 0.4 | 1.3 | 1 | 0.2 |
| | 37.0 | | 1.9 | | 1.3 | 5.6 | 2.5 | 3.5 | 3.6 | 0.9 | 0.4 | 1.3 | 1 | 0.2 |
| | 31.6 | | 1.1 | 0.2 | 1.3 | 2.6 | 4.1 | 2.2 | 1.8 | 0.4 | | | 0.3 | 0.2 |
| | 50.8 | 0.1 | 0.2 | | 1.6 | 5.1 | 3.9 | 4.3 | 8.4 | 0.8 | 0.3 | | 1.4 | 0.4 |
| | 16.1 | | 0.2 | | | 0.3 | 2.1 | 2.1 | 3.5 | 0.7 | | | | 0.1 |
| | 26.1 | 0.2 | 1.3 | | | 1.4 | 3.5 | 1.7 | 6.8 | 1.3 | | 0.6 | | 0.1 |
| | 50.6 | 0.1 | 0.2 | | 1.6 | 5.1 | 3.9 | 4.3 | 8.4 | 0.8 | 0.3 | | 1.4 | 0.4 |
| | 40.7 | | 0.6 | | 1.9 | 3.9 | 2 | 2 | 3.7 | 0.4 | | 0.1 | 1.1 | 0.4 |
| | 58.7 | | 1.4 | | 0.6 | 4.6 | 8.3 | 3.6 | 6.4 | 0.5 | 1 | 0.6 | | 0.7 |
| | 58.7 | | 1.4 | | 0.6 | 4.6 | 8.3 | 3.6 | 6.4 | 0.5 | 1 | 0.6 | | 0.7 |
| | 50.8 | 0.1 | 0.2 | | 1.6 | 5.1 | 3.9 | 4.3 | 8.4 | 0.8 | 0.3 | | 1.4 | 0.4 |
| | 27.8 | | 1.1 | | 0.4 | 3.3 | 2.5 | 1.5 | 3 | 1.1 | | | 1 | 0.1 |
| | 40.7 | | 0.6 | | 1.9 | 3.9 | 2 | 2 | 3.7 | 0.4 | | 0.1 | 1.1 | 0.4 |

FIG. 18

Data Sources:
☑ Clinical
☑ Didactic
☑ Discussion

Date Range: Include scores within the follow date range. Start: 2011-06-01   End: 2015-06-30

FIG. 19

User Access:   Included                    Excluded
                                           Faculty 1
                                           Faculty 2
                                           Student 1
                                           Student 2
                                           Student 3
                                           Student 4
                                           Student 5
                                           Student 6
                                           Student 7
                                           Student 8
                                           Student 9
                                           Student 10

FIG. 20

Data Sources:
☑ Clinical
☑ Didactic
☑ Discussion

Data Range: Include scores within the follow data range. Start: 2011-06-01    End: 2015-06-30

Competencies

| | | | |
|---|---|---|---|
| | 00 - Undergraduate Sci | Microcompetencies: | 00.00.01.00<br>00.00.02.00<br>00.00.03.00 | remove |
| | 01 - Quantitative Metho | Microcompetencies: | 01.01.01.00<br>01.01.01.01<br>01.01.01.02<br>01.01.01.03<br>01.01.01.04 | remove |
| | 02 - Basic Genetics and | Microcompetencies: | 01.02.01.00<br>01.02.01.01<br>01.02.01.02<br>01.02.01.03<br>01.02.01.04 | remove |
| | 03 - Anatomy Discipline | Microcompetencies: | 01.03.01.00<br>01.03.01.01<br>01.03.01.02<br>01.03.02.00<br>01.03.02.01 | remove |
| | 04 - Cell Biology and M | Microcompetencies: | 01.04.01.00<br>01.04.01.01<br>01.04.01.02<br>01.04.01.03<br>01.04.01.04 | remove |
| | 05 - Human Immunity | Microcompetencies: | 01.06.01.00<br>01.06.01.01<br>01.06.01.02<br>01.06.02.00<br>01.06.02.01 | remove |
| | 06 - Physiology Discipli | Microcompetencies: | 01.07.01.00<br>01.07.01.01<br>01.07.01.02<br>01.07.01.03<br>01.07.01.04 | remove |
| | 07 - Pathology Disciplin | Microcompetencies: | 01.03.05.00<br>01.03.05.01<br>01.03.05.02<br>01.09.01.00<br>01.09.01.01 | remove |
| | 08 - Pharmacology Disc | Microcompetencies: | 01.10.01.00<br>01.10.02.00<br>01.10.03.00<br>01.10.04.00<br>01.10.05.00 | remove |
| | 09 - Integument | Microcompetencies: | 02.01.01.04<br>02.01.01.03<br>02.01.01.02<br>02.01.01.01<br>02.01.01.00 | remove |
| | 10 - Musculoskeletal Sy | Microcompetencies: | 02.02.01.04<br>02.02.01.03<br>02.02.01.02<br>02.02.01.01<br>02.02.01.00 | remove |

Student Scores

☐ Student 1
Total: 51.0
02.04.02.02: 5.0
02.04.03.00: 1.0
02.04.01.00: 8.0
02.08.03.09: 3.0
02.06.03.00: 11.0
02.04.02.12: 2.0
02.08.07.13: 3.0
02.04.02.00: 4.0
02.04.02.10: 1.0
01.04.02.00: 1.0
02.08.07.03: 4.0
02.06.02.00: 3.0
02.05.01.00: 2.0
02.10.07.00: 1.0
02.10.02.00: 4.0
02.04.02.03: 1.0
02.10.05.00: 2.0

☐ Student 2
Total: 51.0
02.04.02.02: 1.0
02.04.03.00: 1.0
02.04.01.00: 9.0
02.08.03.09: 3.0
02.06.03.00: 10.0
02.04.02.12: 2.0
02.08.07.13: 1.0
02.04.02.00: 4.0
02.04.02.10: 2.0
01.04.02.00: 1.0
02.08.07.03: 4.0
02.06.02.00: 3.0
02.05.01.00: 2.0
02.10.07.00: 1.0
02.10.02.00: 4.0
02.04.02.03: 1.0
02.10.05.00: 2.0

☐ Student 3
Total: 54.0
02.04.02.02: 2.0
02.04.03.00: 1.0
02.04.01.00: 9.0
02.08.03.09: 2.0
02.06.03.00: 11.0
02.04.02.12: 2.0
02.08.07.13: 3.0
02.04.02.00: 6.0
02.04.02.10: 2.0
01.04.02.00: 1.0
02.08.07.03: 2.0
02.06.02.00: 3.0
02.05.01.00: 2.0
02.10.07.00: 1.0
02.10.02.00: 4.0
02.04.02.03: 1.0
02.10.05.00: 2.0

☐ Student 4
Total: 40.0
02.04.02.02: 1.0
02.04.03.00: 1.0
02.04.01.00: 5.0
02.08.03.09: 3.0
02.06.03.00: 10.0
02.04.02.12: 2.0
02.08.07.13: 1.0
02.04.02.00: 1.0
02.04.02.10: 1.0
01.04.02.00: 1.0
02.08.07.03: 5.0
02.06.02.00: 2.0
02.05.01.00: 2.0
02.10.07.00: 1.0
02.10.02.00: 1.0
02.04.02.03: 1.0
02.10.05.00: 2.0

| RVU Commit Summary ||
|---|---|
| Name | RVUs |
| Student | 51.0 |
| Student | 51.0 |
| Student | 54.0 |
| Student | 40.0 |
| Student | 50.0 |
| Student | 43.0 |
| Student | 45.0 |
| Student | 46.0 |
| Student | 48.0 |
| Student | 57.0 |
| Student | 48.0 |
| Student | 52.0 |
| Student | 49.0 |
| Student | 54.0 |
| Student | 45.0 |
| Student | 54.0 |
| Student | 48.0 |
| Student | 50.0 |
| Student | 52.0 |
| Student | 52.0 |
| Student | 46.0 |
| Student | 56.0 |
| Student | 53.0 |
| Student | 56.0 |
| Student | 39.0 |
| Student | 41.0 |
| Student | 49.0 |
| Student | 54.0 |
| Student | 39.0 |
| Student | 53.0 |
| Student | 38.0 |
| Student | 51.0 |
| Student | 50.0 |
| Student | 60.0 |
| Student | 52.0 |
| Student | 53.0 |
| Student | 54.0 |
| Student | 52.0 |
| Student | 49.0 |
| Student | 43.0 |
| Student | 54.0 |
| Student | 54.0 |
| Student | 49.0 |
| Student | 51.0 |
| Student | 50.0 |
| Student | 40.0 |
| Student | 52.0 |
| Student | 48.0 |
| Student | 44.0 |
| Student | 55.0 |
| Student | 56.0 |
| Student | 51.0 |

FIG. 27

📊 SoDM8950 - Assessment and Treatment 7 (17) - Section 001 - Assessment 01 - QUANTITATIVE SKILLS ASSESSMENT- D4 Week 178 Clinic Session Details  Grading Summary  Grade Report ✚ Add Scores ▾                                                                                                    🗑 Delete Scores First  Previous  1  2  3  4  5  ...  Next  Last

| Student | Instructor | Date | Tieback ID | Microcompetency | ReVUs | |
|---|---|---|---|---|---|---|
| | | Thu, Jan 5 2017 | ecuaxium_165619 | 5104.150.400.210 - Periapical Radiographic Examination, General | 2.0 | |
| | | Thu, Jan 5 2017 | ecuaxium_165619 | 5104.150.400.220 - Bitewing Radiographic Examination, General | 1.0 | |
| | | Thu, Jan 5 2017 | ecuaxium_165290 | 5104.800.200.001 - Simple Extractions | 4.0 | |
| | | Thu, Jan 5 2017 | ecuaxium_165312 | 5104.150.200.200 - Limited Examination, General | 4.0 | |
| | | Thu, Jan 5 2017 | ecuaxium_165349 | 5104.400.400.002 - Resin Restorations | 10.0 | |
| | | Thu, Jan 5 2017 | ecuaxium_165400 | 5104.700.400.002 - Resin Base Partial Denture | 5.0 | |
| | | Thu, Jan 5 2017 | ecuaxium_165400 | 5104.700.400.002 - Resin Base Partial Denture | 5.0 | |
| | | Thu, Jan 5 2017 | ecuaxium_165489 | 5104.400.400.002 - Resin Restorations | 10.0 | |
| | | Thu, Jan 5 2017 | ecuaxium_165481 | 5104.400.400.002 - Resin Restorations | 10.0 | |
| | | Thu, Jan 5 2017 | ecuaxium_165511 | 5104.150.200.200 - Limited Examination, General | 4.0 | |

📚 SoDM8110 - Foundational Biological Sciences 1 (20) - Section 001 - Assessment 8110.001 - D1
Week 03 Exam Details    Grading Summary    Grade Report + Add Scores ▾                                                                        🗑 Delete Scores First  Previous  1  2  3  4  5  ...  Next  Last

| Student | Instructor | Date | Tieback ID | Microcompetency | ReVUs | |
|---|---|---|---|---|---|---|
| ▓▓▓ | ▓▓▓ | Wed, Aug 31 2016 | ExamMaster_795602 | 5132.010.200.000 - Practitioner Ethical Considerations, General | 1.0 | ✎ 🗑 |
| ▓▓▓ | ▓▓▓ | Wed, Aug 31 2016 | ExamMaster_795598 | 5132.010.200.000 - Practitioner Ethical Considerations, General | 1.0 | ✎ 🗑 |
| ▓▓▓ | ▓▓▓ | Wed, Aug 31 2016 | ExamMaster_795610 | 5132.010.200.000 - Practitioner Ethical Considerations, General | 1.0 | ✎ 🗑 |
| ▓▓▓ | ▓▓▓ | Wed, Aug 31 2016 | ExamMaster_795607 | 5132.010.200.000 - Practitioner Ethical Considerations, General | 1.0 | ✎ 🗑 |
| ▓▓▓ | | Wed, Aug 31 2016 | ExamMaster_927875 | 2608.000.000.000 - Genetics, General | 1.0 | ✎ 🗑 |
| ▓▓▓ | ▓▓▓ | Wed, Aug 31 2016 | ExamMaster_927874 | 2608.000.000.000 - Genetics, General | 1.0 | ✎ 🗑 |
| ▓▓▓ | | Wed, Aug 31 2016 | ExamMaster_927877 | 2608.000.000.000 - Genetics, General | 1.0 | ✎ 🗑 |
| ▓▓▓ | ▓▓▓ | Wed, Aug 31 2016 | ExamMaster_927876 | 2608.000.000.000 - Genetics, General | 1.0 | ✎ 🗑 |
| ▓▓▓ | ▓▓▓ | Wed, Aug 31 2016 | ExamMaster_927826 | 2608.000.000.000 - Genetics, General | 1.0 | ✎ 🗑 |
| ▓▓▓ | ▓▓▓ | Wed, Aug 31 2016 | ExamMaster_927827 | 2608.000.000.000 - Genetics, General | 0.0 | ✎ 🗑 |

SoDM24 - Restorative Dentistry 

Properties

| | |
|---|---|
| Institution | EAST CAROLINA UNIVERSITY |
| School | School of Dental Medicine |
| Program | Dentistry (DDS, DMD) |
| Name | SoDM24 - Restorative Dentistry |
| Microcompetency Codes and Names | 5104.400.000.000 - Operative / Restorative Dentistry, General<br>5104.400.100.000 - Esthetic Changes to Tooth Structure, General<br>5104.400.100.001 - External Bleaching<br>5104.400.100.002 - Odontoplasty<br>5104.400.100.003 - Enamel Microabrasion<br>5104.400.200.000 - Operative Techniques to Reduce Tooth Sensitivity, General<br>5104.400.200.001 - Sedative Filling<br>5104.400.200.002 - Application of Desensitizing Agent<br>5104.400.400.000 - Direct Operative Restorations, General<br>5104.400.400.001 - Amalgam Restorations<br>5104.400.400.002 - Resin Restorations<br>5104.400.400.003 - Post, Core, and Build-Up<br>5104.400.500.000 - Indirect Operative Restorations, General<br>5104.400.500.001 - Indirect Inlay / Onlay Restorations<br>5104.400.500.002 - Labial Veneer<br>5104.400.600.000 - Other Restorative Procedures, General<br>5104.400.600.001 - Silicate Cement Fillings<br>5104.400.600.002 - Gold Foil Restorations |
| GUID | 0e23ad00-768c-4d4d-abaa-3f4aaa5e231b |

FIG. 30

| | | |
|---|---|---|
| 12 | SoDM11 - Endocrine System(s) | ▾ |
| 13 | SoDM12 - Cardiovascular System (Blood and Lymphatics) | ▾ |
| 14 | SoDM13 - Respiratory System | ▾ |
| 15 | SoDM14 - Gastrointestinal System (Oral Detail) | ▾ |
| 16 | SoDM15 - Gastrointestinal System (Non-Oral) | ▾ |
| 17 | SoDM16 - Renal/Urinary System | ▾ |
| 18 | SoDM17 - Reproductive Systems | ▾ |
| 19 | SoDM18 - Patient Considerations | ▾ |
| 20 | SoDM19 - Practitioner Considerations | ▾ |
| 21 | SoDM20 - Patient Assessment | ▾ |
| 22 | SoDM21 - Inter-Professional Consultation | ▾ |
| 23 | SoDM22 - Oral Disease Prevention Strategies | ▾ |
| 24 | SoDM23 - Pain, Anxiety and Behavior Management | ▾ |
| 25 | SoDM24 - Restorative Dentistry | ▾ |
| 26 | SoDM25 - Periodontics/Periodontology | ▾ |
| 27 | SoDM26 - Endodontics/Endodontology | ▾ |
| 28 | SoDM27 - Fixed Prosthodontics | ▾ |
| 29 | SoDM28 - Removable Prosthodontics | ▾ |
| 30 | SoDM29 - Occlusal and Orthodontic Therapies | ▾ |
| 31 | SoDM30 - Oral/Maxillofacial Surgery | ▾ |

FIG. 31

TO BARRACUDA1 🔒PRIVATE

[FOLLOW] WHAT ARE SIGNS/SYMPTOMS IF THE FACIAL NERVE IS DAMAGED DURING A DENTAL PROCEDURE? HOW WOULD THE PATIENT PRESENT?
LIKE REPLY SHARE FOLLOW MORE 11 HOURS AGO

> SIGNS AND SYMPTOMS OF FACIAL NERVE DAMAGE WOULD HAVE THE PATIENT APPEAR WITH NUMBNESS, THEY WOULD HAVE A LACK OF EMOTIONAL EXPRESSION. THE FACE WOULD DROOP.
> 11 HOURS AGO LIKE REPLY SHARE MORE

> THE PATIENT WOULD PRESENT BELL'S PALSY. THEY MIGHT COMPLAIN ABOUT NOT BEING ABLE TO FEEL THEIR FACE AND THEIR FACE WOULD DISPLAY PARALYSIS.
> 11 HOURS AGO LIKE REPLY SHARE MORE

> BELL'S PALSY WOULD BE THE MOST COMMON TYPE OF FACIAL NERVE DAMAGE, YOU MIGHT WANT TO LOOK FOR AN EMOTIONLESS FACE. MAYBE EVEN LOOK TO SEE IF BOTH SIDES OF THE FACE MATCH UP.
> 11 HOURS AGO LIKE REPLY SHARE MORE

> THE MOST PROMINENT DEFICIT NOTED BY PATIENTS WITH FACIAL NERVE DAMAGE IS WEAKNESS OF MUSCLES OF FACIAL EXPRESSION.
> ADDITIONALLY, THE FACE MAY 'DROOP' ON THE SIDE OF DAMAGE DUE TO THE EFFECTS OF GRAVITY.
> THE MOST COMMON CAUSE OF FACIAL WEAKNESS IS BELL'S PALSY, AN IDIOPATHIC CONDITION THAT MAY RESULT FROM VIRAL INFECTION-INDUCED INFLAMMATORY SWELLING OF THE FACIAL NERVE IN ITS CANAL
> 11 HOURS AGO LIKE REPLY SHARE MORE

> IF THE FACIAL NERVES WERE DAMAGED DURING A DENTAL PROCEDURE, THE SYMPTOMS DISCUSSED ABOVE WOULD NOT NECESSARILY BE PERMANENT. HOWEVER, LIKE MENTIONED, THERE IS MORE THAN ONE CAUSE OF BELL'S PALSY. IF THE FACIAL NERVE SWELLED DUE TO AN INFECTION WHAT DO YOU THINK THE TREATMENT MIGHT BE?

SoDM8539 - Oral Medicine Seminars 2 (18) - Section 001Y - Assessment 73 - Week 74 Yammer

Students   Details   Rules

| Group | Students | Status | |
|---|---|---|---|
| D45FE0DA | A818CD5E | Not Started | Go To Assessment ⊙ |
| | C2209002 | | |
| | 18537DD3 | | |
| | DEFF1B43 | | |
| | 21SA0458 | | |
| | B074B31F | | |
| DAB8057A | DFEEA6F7 | Not Started | Go To Assessment ⊙ |
| | B1E7EF7B | | |
| | F071DF6E | | |
| | 47AEBA85 | | |
| | 02C4ACE8 | | |

FIG. 34

Thread 6 of 8

↰ DEFF1B43 Wed, Jan 13, 2016 at 2:13 PM

What are some signs you may see in a patient who has hyperthyroidism or hypothyroidism?

Post Type

| Content | Logistics | Other | Trash |

↰ 18537DD3 Wed, Jan 13, 2016 at 2:15 PM

With hyper function you can see weight loss, heart failure, exophthalmous, thin hair, diarrhea, hyperreflexia, and warm skin/sweaty palms Post Type

| Content | Logistics | Other | Trash |

↰ DEFF1B43 Wed, Jan 13, 2016 at 2:21 PM

In patients with uncontrolled hyperthyroidism they may undergo what is known as a thyroid storm. A thyroid storm will typically come with signs of restlessness, nausea, abdominal pain, fever, profuse sweating or heart arrhythmia.

Post Type

| Content | Logistics | Other | Trash |

↰ 18537DD3 Wed, Jan 13, 2016 at 2:22 PM

Yes. With the arrhythmia they have tachycardia that can turn into v-fib.

Post Type

| Content | Logistics | Other | Trash |

E6820OB3 Thu, Jan 14, 2016 at 10:52 AM

Facial nerve palsy causes reduced movement of the cheek muscles, and the side of the mouth does not turn down (al 364) at, Douglas e. MacLeod's Clinical Examination, 13th Edition. Elsevier Health Sciences, 2013. VitalBook file.

Post Type

Content | Logistics | Other | Trash

Microcompetency                                    0.1   0.2   0.3   0.5   1.0   5.0

2620.026.008.002 - Facial nerve disorders     ✓

Select Microcompetency...

Commit Status

☐ Committed

🔖 SoDM8119 - Clinical Medicine Case Seminars 1 (19) - Section 001Y - Assessment 01 - Week 02 Yammer Details    Grading Summary    Grade Report High       42.3
Average    30.6
Low        23.2

| Rank | Student Name | ReVUs | Score | Pass/Fail | Date of Completion |
|---|---|---|---|---|---|
| 1 |  | 42.3 | N/A | N/A | Sun, Sep 6 2015 |
| 2 |  | 39.2 | N/A | N/A | Sun, Sep 6 2015 |
| 3 |  | 38.4 | N/A | N/A | Sun, Sep 6 2015 |
| 4 |  | 38.3 | N/A | N/A | Sun, Sep 6 2015 |
| 5 |  | 36.0 | N/A | N/A | Sun, Sep 6 2015 |
| 6 |  | 35.9 | N/A | N/A | Sun, Sep 6 2015 |
| 7 |  | 35.8 | N/A | N/A | Sun, Sep 6 2015 |
| 8 |  | 35.7 | N/A | N/A | Sat, Sep 5 2015 |
| 9 |  | 35.6 | N/A | N/A | Sun, Sep 6 2015 |
| 10 |  | 35.5 | N/A | N/A | Sun, Sep 6 2015 |
| 11 |  | 35.0 | N/A | N/A | Sat, Sep 5 2015 |
| 12 |  | 34.7 | N/A | N/A | Sat, Sep 5 2015 |
| 13 |  | 34.1 | N/A | N/A | Sat, Sep 5 2015 |
| 14 |  | 34.0 | N/A | N/A | Sun, Sep 6 2015 |
| 15 |  | 33.3 | N/A | N/A | Sun, Sep 6 2015 |

FIG. 39

Report

Summary Statistics

| | Rank | GPA | Total | 01 - Week 01 Yammer | 02 - Week 02 Yammer | 03 - Week 03 Yammer | 04 - Week 04 Yammer | 05 - Week 05 Yammer | 06 - Week 06 Yammer | 07 - Week 07 Yammer | 08 - Week 08 Yammer | 09 - Week 09 Yammer | 10 - Week 10 Yammer | 11 - Week 11 Yammer | 12 - Week 12 Yammer | 13 - Week 13 Yammer | 14 - Week 14 Yammer | 15 - Week 15 Yammer | 16 - Week 16 Yammer | 17 - Week 17 Yammer | 18 - Week 18 Yammer | 19 - Week 19 Yammer | 20 - Week 20 Yammer |
|---|---|---|---|---|---|---|---|---|---|---|---|---|---|---|---|---|---|---|---|---|---|---|---|
| High | | | 409.3 | 42.3 | 20.5 | 16.4 | 30.7 | 24.7 | 61.3 | 54.2 | 7.0 | 34.2 | 15.8 | 36.8 | 21.4 | 16.9 | 18.9 | 13.8 | 18.0 | 6.1 | | | |
| Average | | | 258.7 | 30.6 | 13.9 | 10.0 | 14.8 | 14.8 | 39.5 | 32.8 | 2.4 | 23.2 | 10.5 | 24.1 | 10.8 | 11.5 | 7.8 | 7.9 | 9.4 | 2.7 | | | |
| Low | | | 10.2 | 23.2 | 10.6 | 7.3 | 7.7 | 8.3 | 19.7 | 16.3 | 0.5 | 12.7 | 4.1 | 12.1 | 4.2 | 5.6 | 3.4 | 4.4 | 5.5 | 0.7 | | | |
| Stdev | | | 65.9 | 4.2 | 2.8 | 2.2 | 5.8 | 4.4 | 9.7 | 10.6 | 2.2 | 6.5 | 3.4 | 6.3 | 5.3 | 3.8 | 3.3 | 2.9 | 3.2 | 2.2 | | | |

Individual Totals

| | Rank | GPA | Total | 01 | 02 | 03 | 04 | 05 | 06 | 07 | 08 | 09 | 10 | 11 | 12 | 13 | 14 | 15 | 16 | 17 | 18 | 19 | 20 |
|---|---|---|---|---|---|---|---|---|---|---|---|---|---|---|---|---|---|---|---|---|---|---|---|
| 149674BD | 1 | 4.00 | 409.3 | 35.7 | 20.4 | 16.0 | 30.7 | 24.7 | 61.3 | 54.2 | N/A | 34.2 | 15.2 | 29.7 | 20.5 | 16.9 | 16.9 | 10.0 | 17.1 | 5.8 | N/A | N/A | N/A |
| 2742F802 | 2 | 3.92 | 403.1 | 35.0 | 20.5 | 16.4 | 30.4 | 24.7 | 59.4 | 53.7 | N/A | 33.3 | 14.8 | 30.1 | 20.1 | 15.9 | 16.2 | 9.5 | 18.0 | 6.1 | N/A | N/A | N/A |
| 18D1A166 | 3 | 3.83 | 395.7 | 34.7 | 18.9 | 16.1 | 27.9 | 22.9 | 59.0 | 54.0 | N/A | 33.4 | 14.6 | 31.0 | 18.3 | 15.7 | 16.3 | 9.1 | 18.0 | 5.8 | N/A | N/A | N/A |
| 8A666FE3E | 4 | 3.57 | 374.3 | 34.1 | 18.9 | 15.3 | 29.0 | 22.8 | 55.2 | 47.6 | N/A | 31.4 | 13.0 | 27.7 | 18.5 | 14.3 | 15.4 | 9.3 | 15.9 | 5.8 | N/A | N/A | N/A |
| FC799BF9 | 5 | 3.38 | 358.3 | 32.0 | 18.1 | 13.4 | 27.1 | 22.6 | 51.3 | 47.1 | N/A | 30.2 | 12.3 | 28.0 | 17.2 | 14.2 | 15.7 | 8.1 | 15.8 | 5.2 | N/A | N/A | N/A |
| E1B69577 | 6 | 3.29 | 351.1 | 32.2 | 18.0 | 13.8 | 27.1 | 22.3 | 53.3 | 47.2 | N/A | 30.2 | 12.3 | 25.7 | 16.7 | 13.3 | 13.6 | 7.9 | 14.6 | 4.8 | N/A | N/A | N/A |
| 1827A5ED | 7 | 3.08 | 334.0 | 28.8 | 12.6 | 8.1 | 13.7 | 17.3 | 53.4 | 52.8 | 7.0 | 31.5 | 15.8 | 29.8 | 13.7 | 15.8 | 6.6 | 13.6 | 12.2 | 1.3 | N/A | N/A | N/A |
| 87C13175 | 8 | 3.06 | 332.7 | 29.0 | 13.1 | 7.8 | 13.0 | 16.9 | 52.3 | 52.8 | 7.0 | 30.2 | 15.3 | 29.8 | 14.6 | 16.2 | 7.3 | 13.8 | 12.8 | 1.5 | N/A | N/A | N/A |
| 989D3CD6 | 9 | 2.90 | 319.6 | 28.6 | 12.9 | 8.0 | 13.2 | 16.9 | 53.2 | 50.7 | 6.0 | 29.9 | 14.7 | 27.2 | 12.4 | 14.7 | 6.9 | 12.8 | 9.9 | 1.0 | N/A | N/A | N/A |
| CBB436E8 | 10 | 2.68 | 301.0 | 25.8 | 12.4 | 7.3 | 12.8 | 16.2 | 48.6 | 46.0 | 5.0 | 28.7 | 14.6 | 25.4 | 12.1 | 13.6 | 5.7 | 12.6 | 10.2 | 1.0 | N/A | N/A | N/A |
| D13CE9BC | 11 | 2.67 | 300.6 | 26.0 | 12.8 | 7.7 | 12.7 | 15.8 | 47.4 | 47.8 | 5.0 | 27.9 | 14.4 | 25.5 | 12.5 | 13.9 | 5.2 | 13.2 | 9.6 | 1.2 | N/A | N/A | N/A |
| E68200B3 | 12 | 2.65 | 299.0 | 38.4 | 11.3 | 11.6 | 15.3 | 16.2 | 43.0 | 32.5 | N/A | 34.2 | 8.4 | 36.8 | 11.1 | 16.5 | 6.8 | 7.0 | 9.9 | N/A | N/A | N/A | N/A |
| 5960C196 | 13 | 2.58 | 293.2 | 42.3 | 12.4 | 12.0 | 15.0 | 16.5 | 36.4 | 29.1 | N/A | 32.7 | 7.8 | 36.4 | 11.3 | 14.7 | 7.6 | 6.6 | 10.4 | N/A | N/A | N/A | N/A |
| A84E24CD | 14 | 2.53 | 289.0 | 35.6 | 11.2 | 11.3 | 16.1 | 15.9 | 41.2 | 31.5 | N/A | 31.7 | 7.7 | 35.6 | 11.3 | 16.1 | 7.0 | 6.8 | 10.0 | N/A | N/A | N/A | N/A |

FIG. 40

Report

Summary Statistics

| | Group High | Class Rank | Participation By Group High | Participation By Class High | Total | 01 - Week 01 Yammer | 02 - Week 02 Yammer | 03 - Week 03 Yammer | 04 - Week 04 Yammer | 05 - Week 05 Yammer | 06 - Week 06 Yammer | 07 - Week 07 Yammer | 08 - Week 08 Yammer | 09 - Week 09 Yammer | 10 - Week 10 Yammer | 11 - Week 11 Yammer | 12 - Week 12 Yammer | 13 - Week 13 Yammer | 14 - Week 14 Yammer | 15 - Week 15 Yammer | 16 - Week 16 Yammer | 17 - Week 17 Yammer | 18 - Week 18 Yammer | 19 - Week 19 Yammer | 20 - Week 20 Yammer |
|---|---|---|---|---|---|---|---|---|---|---|---|---|---|---|---|---|---|---|---|---|---|---|---|---|---|
| Group High | | | | | 2,291.8 | 203.7 | 144.8 | 91.0 | 172.2 | 140.0 | 339.5 | 303.8 | 30.0 | 191.1 | 81.9 | 173.4 | 111.3 | 80.3 | 83.1 | 66.0 | 99.4 | 33.6 | N/A | N/A | N/A |
| Group Average | | | | | 1,368.4 | 159.8 | 72.5 | 52.1 | 76.1 | 77.0 | 204.9 | 169.1 | 11.6 | 120.4 | 54.6 | 125.4 | 56.1 | 59.6 | 40.5 | 41.3 | 50.0 | 14.6 | N/A | N/A | N/A |
| Group Low | | | | | 960.0 | 123.6 | 54.6 | 38.9 | 40.2 | 44.4 | 102.6 | 84.6 | 3.0 | 78.4 | 24.6 | 65.4 | 25.2 | 29.4 | 19.8 | 22.8 | 28.8 | 4.2 | N/A | N/A | N/A |
| Group Stdev | | | | | 359.8 | 27.6 | 20.6 | 14.4 | 35.4 | 25.8 | 60.5 | 60.1 | 10.8 | 35.1 | 18.6 | 34.8 | 28.8 | 20.2 | 19.6 | 14.2 | 19.0 | 13.5 | N/A | N/A | N/A |
| 01D2EAE7 | 100.0% | 1 | | | 2,291.8 | 203.7 | 114.8 | 91.0 | 172.2 | 140.0 | 339.5 | 303.8 | N/A | 191.1 | 81.9 | 172.2 | 111.3 | 80.3 | 83.1 | 53.9 | 99.4 | 33.6 | N/A | N/A | N/A |
| 14967480 | 100.0% | 1 | 100.0% | | 409.3 | 35.7 | 20.4 | 16.0 | 30.7 | 24.7 | 61.3 | 54.2 | N/A | 34.2 | 15.2 | 29.7 | 20.5 | 16.9 | 16.9 | 10.0 | 17.1 | 5.8 | N/A | N/A | N/A |
| 2742F802 | 98.5% | 2 | 98.5% | | 403.1 | 35.0 | 20.5 | 16.4 | 30.4 | 24.7 | 59.4 | 53.7 | N/A | 33.3 | 14.8 | 30.1 | 20.1 | 15.9 | 15.2 | 9.5 | 16.0 | 6.1 | N/A | N/A | N/A |
| 1ED1A186 | 96.7% | 3 | 96.7% | | 395.7 | 34.7 | 18.9 | 16.1 | 27.9 | 22.9 | 59.0 | 54.0 | N/A | 33.4 | 14.6 | 31.0 | 18.3 | 16.3 | 16.3 | 9.1 | 18.0 | 5.8 | N/A | N/A | N/A |
| 8A86FE3E | 91.4% | 4 | 91.4% | | 374.3 | 34.1 | 18.9 | 15.3 | 29.0 | 22.8 | 55.2 | 47.6 | N/A | 31.4 | 13.0 | 27.7 | 16.5 | 14.3 | 15.4 | 9.3 | 18.0 | 5.9 | N/A | N/A | N/A |
| FC799BF9 | 87.5% | 5 | 87.5% | | 358.3 | 32.0 | 18.1 | 13.4 | 27.1 | 22.6 | 51.3 | 47.1 | N/A | 30.2 | 12.3 | 28.0 | 17.2 | 14.2 | 15.7 | 8.1 | 15.8 | 5.2 | N/A | N/A | N/A |
| E1B89577 | 85.8% | 6 | 85.8% | | 351.1 | 32.2 | 18.0 | 13.8 | 27.1 | 22.3 | 53.3 | 47.2 | N/A | 28.6 | 12.0 | 25.7 | 16.7 | 13.3 | 13.6 | 7.9 | 14.6 | 4.8 | N/A | N/A | N/A |
| 0A79C88E | 69.3% | 2 | | | 1,587.9 | 141.2 | 63.8 | 38.9 | 65.4 | 84.7 | 254.9 | 252.1 | 30.0 | 146.2 | 74.8 | 137.8 | 65.3 | 74.2 | 30.7 | 66.0 | 53.8 | 8.0 | N/A | N/A | N/A |
| 1827A5ED | 100.0% | 1 | 81.6% | | 334.0 | 28.8 | 12.6 | 8.1 | 13.1 | 17.3 | 53.4 | 52.6 | 7.0 | 31.5 | 15.8 | 29.8 | 13.7 | 15.8 | 8.6 | 13.6 | 12.2 | 1.3 | N/A | N/A | N/A |
| 67C13175 | 99.6% | 2 | 81.3% | | 332.7 | 28.0 | 13.1 | 7.8 | 13.0 | 16.9 | 52.3 | 52.8 | 7.0 | 30.2 | 15.3 | 29.9 | 14.6 | 16.2 | 7.3 | 13.8 | 12.0 | 1.5 | N/A | N/A | N/A |
| 989D3CD8 | 95.7% | 3 | 78.1% | | 319.6 | 28.6 | 12.9 | 8.0 | 13.2 | 18.5 | 53.2 | 50.7 | 6.0 | 29.9 | 14.7 | 27.2 | 12.4 | 14.7 | 5.9 | 12.8 | 9.9 | 1.0 | N/A | N/A | N/A |
| CB8436B8 | 90.1% | 4 | 73.5% | | 301.0 | 26.8 | 12.4 | 7.3 | 12.8 | 16.2 | 48.6 | 46.0 | 5.0 | 28.7 | 14.6 | 25.4 | 12.1 | 13.6 | 6.7 | 12.6 | 10.2 | 1.0 | N/A | N/A | N/A |
| D13CE98C | 90.0% | 5 | 73.4% | | 300.6 | 28.0 | 12.8 | 7.7 | 12.7 | 15.8 | 47.4 | 47.8 | 5.0 | 27.9 | 14.4 | 25.5 | 12.5 | 13.9 | 5.2 | 13.2 | 9.6 | 1.2 | N/A | N/A | N/A |

| | Rank | Total ReVUs | Total Content Posts | Total Logistics Posts | Total Other Posts | Total Trash Posts | Cumulative Participation | Efficiency Index |
|---|---|---|---|---|---|---|---|---|
| Summary Statistics | | | | | | | | |
| Maximum | | 442.6 | 1,692 | 436 | 489 | 835 | 2,571 | 93% |
| Mean | | 281.8 | 868 | 138 | 60 | 217 | 1,066 | 83% |
| Minimum | | 196.6 | 370 | 31 | 4 | 37 | 489 | 65% |
| Standard Deviation | | 58.8 | 325 | 101 | 94 | 195 | 479 | 7% |
| Students | | | | | | | | |
| 1496748D | 1 | 442.6 | 1,692 | 390 | 489 | 835 | 2,571 | 66% |
| 2742F802 | 2 | 416.7 | 1,613 | 426 | 428 | 816 | 2,467 | 65% |
| 1ED1A166 | 3 | 410.1 | 1,601 | 321 | 348 | 749 | 2,270 | 71% |
| 8A66FE3E | 4 | 386.8 | 1,139 | 88 | 107 | 271 | 1,334 | 85% |
| FC799BF9 | 5 | 370.5 | 611 | 123 | 55 | 223 | 789 | 77% |
| 67C13175 | 6 | 366.8 | 1,681 | 260 | 137 | 271 | 2,078 | 81% |
| E1B69577 | 7 | 364.7 | 568 | 77 | 40 | 123 | 685 | 83% |
| 1827A5ED | 8 | 363.2 | 1,434 | 285 | 123 | 220 | 1,842 | 78% |
| 9B9D3CD8 | 9 | 335.3 | 1,336 | 178 | 89 | 272 | 1,603 | 83% |
| D3140CB8 | 10 | 318.8 | 1,136 | 113 | 45 | 163 | 1,294 | 88% |
| A84E24CD | 11 | 318.6 | 1,044 | 131 | 25 | 217 | 1,200 | 87% |
| 0D4CFAB1 | 12 | 317.0 | 1,119 | 139 | 36 | 227 | 1,294 | 86% |
| CB843688 | 13 | 313.6 | 693 | 50 | 38 | 101 | 781 | 89% |
| E68200B3 | 14 | 312.1 | 1,215 | 436 | 88 | 638 | 1,739 | 70% |
| D13CE9BC | 15 | 307.5 | 697 | 114 | 45 | 162 | 856 | 81% |
| 60111159 | 16 | 302.8 | 1,000 | 88 | 49 | 110 | 1,137 | 88% |
| 5960C196 | 17 | 301.2 | 1,228 | 340 | 41 | 805 | 1,609 | 76% |
| 46B7C076 | 18 | 293.9 | 949 | 200 | 75 | 184 | 1,224 | 78% |

| Cumulative Participation | Total Tzgith Beats | Total Kazan |
|---:|---:|---:|
| 5,308 | 1,867 | 3,441 |
| 1,669 | 406 | 1,263 |
| 47 | 6 | 41 |
| 1,002 | 343 | 659 |
| 5,308 | 1,867 | 3,441 |
| 3,468 | 998 | 2,470 |
| 4,006 | 1,023 | 2,983 |
| 3,720 | 1,055 | 2,665 |
| 3,096 | 578 | 2,518 |
| 2,967 | 421 | 2,546 |
| 2,863 | 890 | 1,973 |
| 1,977 | 770 | 1,207 |
| 2,171 | 327 | 1,844 |
| 1,935 | 763 | 1,172 |
| 2,203 | 284 | 1,919 |
| 1,792 | 352 | 1,440 |
| 1,983 | 583 | 1,400 |
| 1,590 | 408 | 1,182 |
| 1,625 | 393 | 1,232 |
| 1,981 | 157 | 1,824 |
| 2,026 | 357 | 1,669 |
| 1,827 | 936 | 891 |
| 1,958 | 208 | 1,750 |
| 1,779 | 186 | 1,593 |
| 1,945 | 235 | 1,710 |
| 1,933 | 637 | 1,296 |
| 1,565 | 656 | 909 |
| 1,557 | 200 | 1,357 |
| 2,298 | 434 | 1,864 |
| 1,727 | 449 | 1,278 |
| 1,316 | 156 | 1,160 |
| 1,374 | 111 | 1,263 |
| 1,363 | 247 | 1,116 |
| 1,032 | 311 | 721 |
| 1,454 | 633 | 821 |
| 1,704 | 396 | 1,308 |
| 1,764 | 494 | 1,270 |
| 913 | 253 | 660 |
| 1,358 | 458 | 900 |
| 1,284 | 225 | 1,059 |
| 1,511 | 471 | 1,040 |
| 896 | 148 | 748 |
| 1,222 | 368 | 854 |
| 1,032 | 223 | 809 |
| 902 | 230 | 672 |
| 796 | 119 | 677 |
| 565 | 71 | 494 |
| 469 | 35 | 434 |
| 549 | 189 | 360 |
| 410 | 103 | 307 |
| 667 | 62 | 605 |
| 447 | 104 | 343 |
| 504 | 71 | 433 |
| 252 | 42 | 210 |

FIG. 45

| ReVU Rank | Total ReVUe | Total Content Posts | Content Score | 4510 | 4530 |
|---|---|---|---|---|---|
|  | 618.80 | 4,417 |  |  |  |
|  | 340.10 | 1,344 |  |  |  |
|  | 162.10 | 42 |  |  |  |
|  | 93.40 | 831 |  |  |  |
| 1 | 618.80 | 4,417 | 7.14 | 0.50 | 3.57 |
| 8 | 431.80 | 2,490 | 5.77 | 0.50 | 2.88 |
| 4 | 517.40 | 3,739 | 7.23 | 0.50 | 3.61 |
| 3 | 528.80 | 2,993 | 5.66 | 0.50 | 2.83 |
| 9 | 425.00 | 2,481 | 5.84 | 0.50 | 2.92 |
| 12 | 399.90 | 2,509 | 6.27 | 0.50 | 3.14 |
| 7 | 432.50 | 2,365 | 5.47 | 0.50 | 2.73 |
| 41 | 268.10 | 1,064 | 3.97 | 0.50 | 1.98 |
| 26 | 331.40 | 1,537 | 4.64 | 0.50 | 2.32 |
| 37 | 285.40 | 1,322 | 4.63 | 0.50 | 2.32 |
| 20 | 355.10 | 1,774 | 5.00 | 0.50 | 2.50 |
| 34 | 299.00 | 1,217 | 4.07 | 0.50 | 2.04 |
| 21 | 349.50 | 1,569 | 4.49 | 0.50 | 2.24 |
| 40 | 272.60 | 1,338 | 4.91 | 0.50 | 2.45 |
| 38 | 280.90 | 1,221 | 4.35 | 0.50 | 2.17 |
| 18 | 363.30 | 1,682 | 4.63 | 0.50 | 2.31 |
| 14 | 376.00 | 1,699 | 4.52 | 0.50 | 2.26 |
| 25 | 333.80 | 1,270 | 3.81 | 0.50 | 1.90 |
| 17 | 363.30 | 1,577 | 4.34 | 0.50 | 2.17 |
| 27 | 328.70 | 1,642 | 5.00 | 0.50 | 2.50 |
| 16 | 371.60 | 1,609 | 4.33 | 0.50 | 2.16 |
| 13 | 399.90 | 1,428 | 3.57 | 0.50 | 1.79 |
| 31 | 316.70 | 1,196 | 3.78 | 0.50 | 1.89 |
| 30 | 320.70 | 1,159 | 3.61 | 0.50 | 1.81 |
| 2 | 529.00 | 1,896 | 3.58 | 0.50 | 1.79 |
| 15 | 374.30 | 1,320 | 3.53 | 0.50 | 1.76 |
| 39 | 279.20 | 1,014 | 3.63 | 0.50 | 1.82 |
| 36 | 298.70 | 1,187 | 3.97 | 0.50 | 1.99 |
| 33 | 300.00 | 1,120 | 3.73 | 0.50 | 1.87 |
| 46 | 227.80 | 910 | 3.99 | 0.50 | 2.00 |
| 23 | 341.50 | 1,188 | 3.48 | 0.50 | 1.74 |
| 11 | 410.60 | 1,465 | 3.57 | 0.50 | 1.78 |
| 5 | 447.10 | 1,486 | 3.32 | 0.50 | 1.66 |
| 48 | 212.70 | 784 | 3.69 | 0.50 | 1.84 |
| 24 | 338.00 | 1,172 | 3.47 | 0.50 | 1.73 |
| 28 | 324.90 | 1,025 | 3.15 | 0.50 | 1.58 |
| 6 | 438.50 | 1,371 | 3.13 | 0.50 | 1.56 |
| 42 | 264.10 | 733 | 2.78 | 0.50 | 1.39 |
| 10 | 414.20 | 1,007 | 2.43 | 0.50 | 1.22 |
| 19 | 361.90 | 878 | 2.43 | 0.50 | 1.21 |
| 22 | 344.00 | 666 | 1.94 | 0.50 | 0.97 |
| 29 | 320.80 | 668 | 2.08 | 0.50 | 1.04 |
| 44 | 228.40 | 499 | 2.18 | 0.50 | 1.09 |
| 51 | 190.80 | 419 | 2.20 | 0.50 | 1.10 |
| 45 | 228.20 | 415 | 1.82 | 0.50 | 0.91 |
| 53 | 179.00 | 371 | 2.07 | 0.50 | 1.04 |
| 32 | 315.20 | 605 | 1.92 | 0.50 | 0.96 |
| 49 | 203.10 | 398 | 1.96 | 0.50 | 0.98 |
| 35 | 298.70 | 390 | 1.31 | 0.50 | 0.65 |
| 54 | 162.10 | 240 | 1.48 | 0.50 | 0.74 |

FIG. 47

| Total Other Pixels | Other Past Score | Other Past Weight | Weighted Oth |
|---|---|---|---|
| 251 | | | |
| 60 | | | |
| 0 | | | |
| 51 | | | |
| 70 | 1.17 | 0.10 | 0.12 |
| 246 | 4.10 | 0.10 | 0.41 |
| 84 | 1.40 | 0.10 | 0.14 |
| 125 | 2.08 | 0.10 | 0.21 |
| 251 | 4.18 | 0.10 | 0.42 |
| 92 | 1.53 | 0.10 | 0.15 |
| 80 | 1.33 | 0.10 | 0.13 |
| 103 | 1.72 | 0.10 | 0.17 |
| 63 | 1.05 | 0.10 | 0.11 |
| 41 | 0.68 | 0.10 | 0.07 |
| 31 | 0.52 | 0.10 | 0.05 |
| 64 | 1.07 | 0.10 | 0.11 |
| 60 | 1.00 | 0.10 | 0.10 |
| 66 | 1.10 | 0.10 | 0.11 |
| 56 | 0.93 | 0.10 | 0.09 |
| 14 | 0.23 | 0.10 | 0.02 |
| 60 | 1.00 | 0.10 | 0.10 |
| 108 | 1.80 | 0.10 | 0.18 |
| 43 | 0.72 | 0.10 | 0.07 |
| 18 | 0.30 | 0.10 | 0.03 |
| 47 | 0.78 | 0.10 | 0.08 |
| 147 | 2.45 | 0.10 | 0.25 |
| 89 | 1.48 | 0.10 | 0.15 |
| 72 | 1.20 | 0.10 | 0.12 |
| 99 | 1.65 | 0.10 | 0.17 |
| 88 | 1.47 | 0.10 | 0.15 |
| 47 | 0.78 | 0.10 | 0.08 |
| 27 | 0.45 | 0.10 | 0.05 |
| 36 | 0.60 | 0.10 | 0.06 |
| 22 | 0.37 | 0.10 | 0.04 |
| 103 | 1.72 | 0.10 | 0.17 |
| 74 | 1.23 | 0.10 | 0.12 |
| 44 | 0.73 | 0.10 | 0.07 |
| 31 | 0.52 | 0.10 | 0.05 |
| 29 | 0.48 | 0.10 | 0.05 |
| 62 | 1.03 | 0.10 | 0.10 |
| 51 | 0.85 | 0.10 | 0.09 |
| 19 | 0.32 | 0.10 | 0.03 |
| 38 | 0.63 | 0.10 | 0.06 |
| 37 | 0.62 | 0.10 | 0.06 |
| 89 | 1.48 | 0.10 | 0.15 |
| 15 | 0.25 | 0.10 | 0.03 |
| 11 | 0.18 | 0.10 | 0.02 |
| 5 | 0.08 | 0.10 | 0.01 |
| 55 | 0.92 | 0.10 | 0.09 |
| 13 | 0.22 | 0.10 | 0.02 |
| 10 | 0.17 | 0.10 | 0.02 |
| 2 | 0.03 | 0.10 | 0.00 |
| 14 | 0.23 | 0.10 | 0.02 |
| 2 | 0.03 | 0.10 | 0.00 |

FIG. 48

| Adjusted Participation Score | Summary Statistics | | | Final Rankings |
|---|---|---|---|---|
| | Maximum | | | |
| | Mean | | | |
| | Minimum | | | |
| | Standard Deviation | | | |
| 4.92 | | 100.10% | 1001.0 | 1 |
| 4.40 | | 89.39% | 893.9 | 2 |
| 4.03 | | 81.90% | 819.0 | 3 |
| 3.95 | | 80.25% | 802.5 | 4 |
| 3.89 | | 79.00% | 790.0 | 5 |
| 3.84 | | 78.11% | 781.1 | 6 |
| 3.50 | | 71.11% | 711.1 | 7 |
| 3.38 | | 68.67% | 686.7 | 8 |
| 3.29 | | 66.79% | 667.9 | 9 |
| 3.25 | | 66.01% | 660.1 | 10 |
| 3.15 | | 64.03% | 640.3 | 11 |
| 2.91 | | 59.21% | 592.1 | 12 |
| 2.88 | | 58.52% | 585.2 | 13 |
| 2.84 | | 57.82% | 578.2 | 14 |
| 2.79 | | 56.75% | 567.5 | 15 |
| 2.77 | | 56.27% | 562.7 | 16 |
| 2.76 | | 56.14% | 561.4 | 17 |
| 2.76 | | 56.12% | 561.2 | 18 |
| 2.75 | | 55.94% | 559.4 | 19 |
| 2.71 | | 55.03% | 550.3 | 20 |
| 2.68 | | 54.46% | 544.6 | 21 |
| 2.57 | | 52.25% | 522.5 | 22 |
| 2.46 | | 49.98% | 499.8 | 23 |
| 2.42 | | 49.17% | 491.7 | 24 |
| 2.41 | | 49.07% | 490.7 | 25 |
| 2.39 | | 48.61% | 486.1 | 26 |
| 2.28 | | 46.32% | 463.2 | 27 |
| 2.27 | | 46.21% | 462.1 | 28 |
| 2.24 | | 45.51% | 455.1 | 29 |
| 2.18 | | 44.41% | 444.1 | 30 |
| 2.16 | | 43.84% | 438.4 | 31 |
| 2.16 | | 43.83% | 438.3 | 32 |
| 2.09 | | 42.45% | 424.5 | 33 |
| 2.04 | | 41.52% | 415.2 | 34 |
| 2.03 | | 41.04% | 410.4 | 35 |
| 1.98 | | 40.21% | 402.1 | 36 |
| 1.78 | | 36.23% | 362.3 | 37 |
| 1.64 | | 33.27% | 332.7 | 38 |
| 1.55 | | 31.42% | 314.2 | 39 |
| 1.45 | | 29.50% | 295.0 | 40 |
| 1.34 | | 27.20% | 272.0 | 41 |
| 1.24 | | 25.14% | 251.4 | 42 |
| 1.19 | | 24.26% | 242.6 | 43 |
| 1.17 | | 23.87% | 238.7 | 44 |
| 1.12 | | 22.77% | 227.7 | 45 |
| 1.10 | | 22.30% | 223.0 | 46 |
| 1.05 | | 21.44% | 214.4 | 47 |
| 1.05 | | 21.42% | 214.2 | 48 |
| 0.83 | | 16.81% | 168.1 | 49 |
| 0.76 | | 15.42% | 154.2 | 50 |

 Thu, Jan 14, 2016 at 11:51 AM

PART 4 of 4 You discussed with Harry's PCP that you are highly suspicious of pathology associated with the trigeminal nerve between the areas of the trigeminal nuclei and trigeminal ganglion, as you have ruled-out an odontogenic or facial cause for Harry's symptoms. You review Harry's MRI with the Oral and Maxillofacial surgeon as well as the neuroradiologist and identify that the cuts of the MRI were potentially too large at the time of imaging to include the lesion. The slices of the MRI were set at 5 mm previously. The Oral and Maxillofacial surgeon reorders an MRI of the brain at 1mm slices, and the results identify a hyperattenuated lesion consistent with the location of the trigeminal nerve root measuring 4mm X 5 mm. Harry was referred to a Neurosurgeon for definitive treatment as the clinical and radiologic findings were consistent with a trigeminal nerve schwannoma. How would the clinical findings differ if the lesion was found in the brainstem? In the cerebral cortex? What are the symptoms of Horner's syndrome and what underlying disease conditions may cause it?

Post Type

Case  Guidance  Other

FIG. 49

 8A66FE3E Thu, Jan 14, 2016 at 2:50 PM

Thanks!

Post Type

Content  Logistics  Other  Trash

FIG. 50

 E6820083 Thu, Jan 14, 2016 at 3:59 PM

Post Type

Content  Logistics  Other  Trash

METHODS, SYSTEMS, AND COMPUTER PROGRAM PRODUCTS FOR NORMALIZATION AND CUMULATIVE ANALYSIS OF COGNITIVE POST CONTENT

RELATED APPLICATIONS

This non-provisional patent application claims priority, under 35 U.S.C. § 119(e), to U.S. Provisional Application Ser. No. 62/552,738, filed Aug. 31, 2017, entitled "METHODS, SYSTEMS, AND COMPUTER PROGRAM PRODUCTS FOR NORMALIZATION AND CUMULATIVE ANALYSIS OF COGNITIVE EDUCATIONAL OUTCOME ELEMENTS," and under 35 U.S.C. § 120 as a continuation-in-part of U.S. patent application Ser. No. 15/794,342, filed Oct. 26, 2017, entitled "NORMALIZATION AND CUMULATIVE ANALYSIS OF COGNITIVE EDUCATIONAL OUTCOME ELEMENTS AND RELATED INTERACTIVE REPORT SUMMARIES," which is a continuation of U.S. patent application Ser. No. 13/425,627 filed Mar. 21, 2012, which claims the benefit, under 35 U.S.C. § 119(e), of U.S. Provisional Application Ser. No. 61/466,207, filed Mar. 22, 2011, entitled "NORMALIZATION AND CUMULATIVE ANALYSIS OF COGNITIVE EDUCATIONAL OUTCOME ELEMENTS AND RELATED INTERACTIVE REPORT SUMMARIES", the disclosures of each of which are incorporated herein in their entirety by reference.

COPYRIGHT PROTECTED MATERIAL

A portion of the disclosure of this patent document contains material which is subject to copyright protection. The copyright owner, East Carolina University of Greenville, N.C., has no objection to the reproduction by anyone of the patent document or the patent disclosure, as it appears in the Patent and Trademark Office patent file or records, but otherwise reserves all copyright rights whatsoever.

FIELD OF THE INVENTION

The invention relates to educational assessment systems that can evaluate student competency in different sub-topics related to an educational topic, concept or field and/or evaluate cohort factors associated with positive and negative cognitive test outcomes.

BACKGROUND

In the past, educational and testing systems were designed to evaluate students based primarily on didactic based tests. To automate such evaluations, the use of microcompetency codes for curriculum mapping of didactic topics has been proposed. Others have used MeSH (Medical Subject Heading) codes for certain types of educational evaluations of medical curriculums. However, these codes have not resulted in a practical way to evaluate students, particularly in a manner that can consider other types of input. Indeed, such prior approaches are only able to evaluate students for topics presented in didactic environments.

Many educational programs may require proof of knowledge, skills, and inter-disciplinary problem solving as evidence of competency. However, it is difficult to assess these different educational outcomes longitudinally. For example, in dental and medical education, and other educational fields, it is believed that a greater degree of student competencies should be based on other factors, e.g., over 60% of the student competence should be measured in clinical environments.

There remains a need for improved evaluation systems that can provide improved competency-based assessments.

SUMMARY

According to some embodiments of the present invention, a method for assessing a student in in an online discussion event using at least one processor of a computer includes obtaining discussion data comprising a plurality of discussion posts in a data file, each comprising a post author and post content, grouping the plurality of discussion posts of the data file into a plurality of discussion threads, classifying individual discussion posts of the plurality of discussion posts based on a post type, and assigning relative value units (RVUs) to at least one of the plurality of discussion posts, where the RVUs are time-normalized scores based on a complexity of the discussion post.

According to some embodiments of the present invention, a system for assessing a student in in an online discussion event using at least one processor of a computer may include a processor, a display coupled to the processor, and a memory coupled to the processor and storing computer readable program code that when executed by the processor causes the processor to perform operations including obtaining discussion data comprising a plurality of discussion posts in a data file, each comprising a post author and post content, grouping the plurality of discussion posts of the data file into a plurality of discussion threads, classifying individual discussion posts of the plurality of discussion posts based on a post type, and assigning relative value units (RVUs) to at least one of the plurality of discussion posts, where the RVUs are time-normalized scores based on a complexity of the discussion post.

According to some embodiments of the present invention, a computer program product for operating an electronic device to assess a student in in an online discussion event includes a non-transitory computer readable storage medium having computer readable program code embodied in the medium that when executed by a processor causes the processor to perform operations including obtaining discussion data comprising a plurality of discussion posts in a data file, each comprising a post author and post content, grouping the plurality of discussion posts of the data file into a plurality of discussion threads, classifying individual discussion posts of the plurality of discussion posts based on a post type, and assigning relative value units (RVUs) to at least one of the plurality of discussion posts, where the RVUs are time-normalized scores based on a complexity of the discussion post.

In some embodiments, classifying the individual discussion posts of the plurality of discussion posts based on the post type comprises classifying the individual discussion posts of the plurality of discussion posts as at least one of a case post type, a guidance post type, an other post type, a content post type, a logistics post type, or a trash post type. In some embodiments, assigning the RVUs to at least one of the plurality of discussion posts comprises assigning the RVUs to at least one of the plurality of discussion posts of the content post type. In some embodiments, ones of the plurality of discussion posts that are classified as the trash post type are not assigned RVUs.

In some embodiments, the method and/or operations further include assigning a microcompetency code to at least one of the plurality of discussion posts, wherein the microcompetency code corresponds to one or more skills contributing to competence of the student.

In some embodiments, the method and/or operations further include calculating a number of discussion posts of a post type in which the student is the post author, and determining a leadership assessment for the student based on the calculated number of discussion posts of the post type in which the student is the post author. In some embodiments, the student is one of a plurality of students contributing the plurality of discussion posts, and the method and/or operations further include calculating a median number of discussion posts of the post type contributed by the plurality of students, dividing the number of discussion posts of the post type in which the student is the post author by the median number of discussion posts of the post type contributed by the plurality of students to generate a post score for the student, multiplying the post score by a weight assigned to the post type to generate an adjusted post score, and determining a leadership assessment for the student based on the adjusted post score.

In some embodiments, one RVU corresponds to a predetermined number of minutes of discussion, and assigning the RVUs to the at least one of the plurality of discussion posts is automatically determined based on a number of keywords in the at least one of the plurality of discussion posts.

In some embodiments, the method and/or operations further include, prior to assigning the RVUs to the at least one of the plurality of discussion posts, performing a self-assessment of the at least one of the plurality of discussion posts by the student. In some embodiments, the method and/or operations further include, based on a determination that the self-assessment is discordant with the assigned RVUs, adjusting the assigned RVUs downward.

As will be appreciated by those of skill in the art in light of the above discussion, the present invention may be embodied as methods, systems and/or computer program products or combinations of same. In addition, it is noted that aspects of the invention described with respect to one embodiment, may be incorporated in a different embodiment although not specifically described relative thereto. That is, all embodiments and/or features of any embodiment can be combined in any way and/or combination. Applicant reserves the right to change any originally filed claim or file any new claim accordingly, including the right to be able to amend any originally filed claim to depend from and/or incorporate any feature of any other claim although not originally claimed in that manner. These and other objects and/or aspects of the present invention are explained in detail in the specification set forth below.

BRIEF DESCRIPTION OF THE DRAWINGS

The patent or application file contains at least one drawing executed in color. Copies of this patent or patent application publication with color drawings will be provided by the Office upon request and payment of the necessary fee.

FIG. 3 is a block diagram illustrating a display screen in a graphical user interface of an exemplary discussion event input according to some embodiments of the present invention.

FIG. 4 is a block diagram illustrating a display screen of an exemplary discussion event input according to some embodiments of the present invention.

FIG. 5 is a screen shot of an example of a discussion thread and associated CSV file according to some embodiments of the present invention.

FIGS. 7A and 7B are competency grid listings of two respective sets of associated microcompetencies according to some embodiments of the present invention.

FIG. 13 is a screen shot of a graphical user interface for a summative report after grading according to some embodiments of the present invention.

FIG. 14 is a screen shot of a graphical user interface for a post verification report before the data is submitted to the grid according to some embodiments of the present invention.

FIG. 16 is a partial screen shot of an exemplary interactive evaluation grid that is parsed to display a single anatomical system according to some embodiments of the present invention.

FIG. 17 is a partial screen shot of a graphical user interface for a managing an interactive evaluation grid where multiple grids are presented for editing according to some embodiments of the present invention.

FIG. 18 is a partial screen shot of an exemplary interactive evaluation grid that is parsed to analyze the data by a single discipline according to some embodiments of the present invention.

FIG. 19 is a partial screen shot of a graphical user interface including a component of an interactive evaluation grid that allows selective viewing of one or more modalities and for the definition of an analysis date range according to some embodiments of the present invention.

FIG. 20 is a screen shot of a graphical user interface of a cohort manager that determines which students and faculty are included in a particular cohort according to some embodiments of the present invention.

FIG. 21 is a screen shot of a graphical user interface for a managing an interactive evaluation grid where competencies include microcompetency codes according to some embodiments of the present invention.

FIG. 22 is a screen shot of a graphical user interface illustrating raw imported exam data for a single student after an item analysis has been performed according to some embodiments of the present invention.

FIG. 23 is a screen shot of a graphical user interface for verifying a raw data report in preparation for validation according to some embodiments of the present invention.

FIG. 24 is a screen shot of a graphical user interface illustrating an RVU Commit Summary screen before data is committed according to some embodiments of the present invention.

FIG. 25 is a screen shot of a graphical user interface illustrating data that was collected and merged by microcompetency code for different students according to some embodiments of the present invention.

FIG. 26 is a screen shot of a graphical user interface illustrating data that was collected and merged by microcompetency code and that is verified to provide all students with the correct score according to some embodiments of the present invention.

FIG. 27 is a screen shot of a graphical user interface illustrating an RVU Commit Summary screen that includes RVU scores ready to commit to one or more data bases for the grid according to some embodiments of the present invention.

FIGS. 28 and 29 are screen shots of graphical user interfaces that illustrate example implementations of tieback identifiers (IDs) according to some embodiments of the present invention.

FIG. 30 is a screen shot of a graphical user interface that illustrates a sample listing of microcompetency codes associated with a defined program competency according to some embodiments of the present invention.

FIG. 31 is a screen shot of a graphical user interface that illustrates a sample listing of competencies that may be associated with a particular program according to some embodiments of the present invention.

FIG. 32 is a screen shot of a graphical user interface that illustrates an example of a weblog PBL thread according to some embodiments of the present invention.

FIG. 33 is a screen shot of a graphical user interface that illustrates a sample data export indicating example discussion data that may be collected according to some embodiments of the present invention.

FIG. 34 is a screen shot of a graphical user interface that illustrates options for a screener to provide assessment for students in various discussion groups according to some embodiments of the present invention.

FIG. 35 is a screen shot of a graphical user interface that illustrates functionality to view posts and assign a post type according to some embodiments of the present invention.

FIGS. 36 and 37 are screen shots of graphical user interfaces that illustrate functionality to assign grades to particular content posts according to some embodiments of the present invention.

FIG. 38 is a screen shot of a graphical user interface that illustrates functionality to commit submitted discussion grades according to some embodiments of the present invention.

FIG. 39 is a screen shot of a graphical user interface that illustrates a generated report with assigned RVUs per student according to some embodiments of the present invention.

FIG. 40 is a screen shot of a graphical user interface that illustrates a generated report with individual student rankings across several weeks of reporting according to some embodiments of the present invention.

FIG. 41 is a screen shot of a graphical user interface that illustrates a generated report with group rankings, as well as rankings of individuals within groups according to some embodiments of the present invention.

FIG. 42 is a screen shot of a graphical user interface that illustrates a generated report with student ranks by competency based on the graded discussions according to some embodiments of the present invention.

FIG. 43 is a screen shot of a graphical user interface that illustrates a generated report indicating the types of posts detected for each student, as well as the overall RVUs achieved according to some embodiments of the present invention.

FIG. 44 is a screen shot of a graphical user interface that illustrates a generated report with adjustments to discount trash posts according to some embodiments of the present invention.

FIG. 45 is a screen shot of a graphical user interface that illustrates a generated report with example data for rankings of students assessed for discussion provided in online postings according to some embodiments of the present invention.

FIG. 47 is a screen shot of a graphical user interface that illustrates a generated report with example rankings for a posting category of other posts according to some embodiments of the present invention.

FIG. 48 is a screen shot of a graphical user interface that illustrates a generated report with student rankings based on a calculated adjusted participation score according to some embodiments of the present invention.

FIG. 49 is a screen shot of a graphical user interface displaying an example post of the case post type according to some embodiments of the present invention.

FIG. 50 is a screen shot of a graphical user interface displaying an example post of the other post type according to some embodiments of the present invention.

FIG. 51 is a screen shot of a graphical user interface displaying an example post of the trash post type according to some embodiments of the present invention.

DETAILED DESCRIPTION

Figure 1:
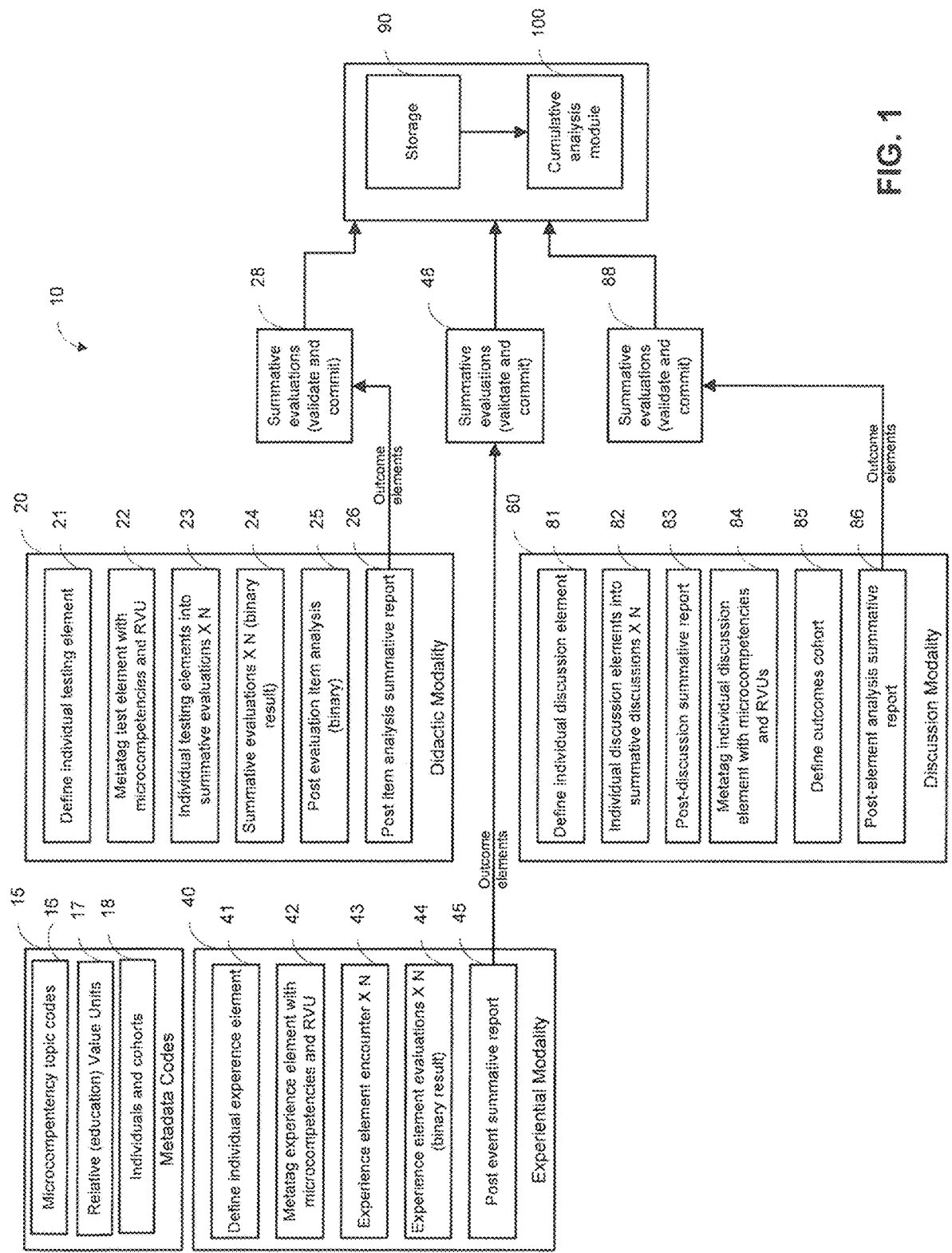
FIG. 1 is a schematic illustration of an evaluation system/method according to some embodiments of the present invention.

The present invention will now be described more fully hereinafter with reference to the accompanying figures, in which preferred embodiments of the invention are shown. This invention may, however, be embodied in many different forms and should not be construed as limited to the embodiments set forth herein.

Like numbers refer to like elements throughout. In the figures, layers, regions, or components may be exaggerated for clarity. Broken lines illustrate optional features or operations unless specified otherwise.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. As used herein, phrases such as "between X and Y" and "between about X and Y" should be interpreted to include X and Y. As used herein, phrases such as "between about X and Y" mean "between about X and about Y." As used herein, phrases such as "from about X to Y" mean "from about X to about Y."

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein. Well-known functions or constructions may not be described in detail for brevity and/or clarity.

It will be understood that when an element is referred to as being "on", "attached" to, "connected" to, "coupled" with, "contacting", etc., another element, it can be directly on, attached to, connected to, coupled with or contacting the other element or intervening elements may also be present. In contrast, when an element is referred to as being, for example, "directly on", "directly attached" to, "directly connected" to, "directly coupled" with or "directly contacting" another element, there are no intervening elements present. It will also be appreciated by those of skill in the art that references to a structure or feature that is disposed "adjacent" another feature may have portions that overlap or underlie the adjacent feature.

It will be understood that, although the terms first, second, etc. may be used herein to describe various elements, components, regions, features, steps, layers and/or sections, these elements, components, features, steps, regions, layers and/or sections should not be limited by these terms. These terms are only used to distinguish one element, component, feature, step, region, layer or section from another region, layer or section. Thus, a first element, component, region, layer, feature, step or section discussed below could be termed a second element, component, region, layer, feature, step or section without departing from the teachings of the present invention. The sequence of operations (or steps) is not limited to the order presented in the claims or figures unless specifically indicated otherwise.

The term "student" refers to the individual(s) being evaluated. As used herein, the term "substantially real time" includes receiving and/or transmitting data between sites during a discussion or test accounting for system delays in remote transmission between sites which may be on the order of seconds or less or potentially minutes in length as a result of routing, traffic, transmission route and/or system communication link employed which can impede the transfer such that slight delays may occur.

The term "automatic" means that substantially all or all of the operations so described can be carried out without requiring the assistance and/or manual input of a human operator. The term "electronic" means that the system, operation or device can communicate using any suitable electronic media and typically employs programmatically controlling the communication between participants using a computer network.

The term "programmatically" means the action is directed via a computer program code.

The term "hub" means a node and/or control site (or sites) that controls and/or hosts data exchange between different user sites using a computer network. The term "FERPA" refers to the Family Educational Rights and Privacy Act (FERPA) under the laws of the United States of America.

The term "formative evaluation" refers to a cross-sectional event where individuals are provided guidance to improve performance. Formative evaluations are not required to be submitted for grades or points. For a student, the formative assessment can identify achievement and areas for further work, and, for a teacher, course, curriculum, and/or school, can evaluate the effectiveness of a class, teacher, program and the like.

The terms "summative evaluation," "summative grading," and "summative assessment" refer to a cross-sectional event where individuals are given an evaluation of performance in the form of points or grades. These terms may be used interchangeably herein. The event may be an assessment in terms of a pass, fail, or other grade or mark, given typically on completion of a course or module, which indicates whether or not a student "passed." The event may be fairly formal, such as a quiz or test. Note that the summative assessment can also be formative, if the feedback offered is sufficient.

The term "outcome element" is a unit of defined educational outcome as part of a summative evaluation. An outcome element may include one or more of the following data: date, unique identifier, student unique identifier, faculty unique identifier, tieback identifier, summative assessment identifier, microcompetency code, relative educational value unit(s), evaluation type, and/or success/fail. Some embodiments provide that success/fail may be a binary value, but the present invention is not limited thereto. When normalized, an outcome element may contain microcompetency code(s) and relative educational value unit(s). The normalized element may ignore failed items and may only give credit for successful items.

The term "cumulative evaluation" refers to a parsed collection of many, typically all, summative evaluations to provide a balanced, if not complete, analysis of student performance in a program, curriculum and/or competency.

The term "cumulative analysis engine" refers to an electronic circuit that can electronically analyze student summative evaluation data inputs over time from at least one of the different educational evaluation environments, and typically three or more education evaluation environments (e.g., didactic, experiential, and discussion, among others) to generate a representation of the cohort performance relative to competency definitions.

Educational evaluation of performance may use formative and summative evaluations relative to a set of curriculum standards. Some embodiments provide that this can be done with basic scores on exams that are averaged to give a grade. In complex outcomes environments, simple grades may not provide enough information to correct specific deficiencies. The term "competency" has been used to give a more precise definition of skills and knowledge required to perform integrated tasks, such as those corresponding to medicine, engineering, and/or law, among others. Some embodiments may be particularly suitable for competency evaluation of students using normalized inputs associated with didactic grading, experiential grading and discussion environment grading. Some embodiments of the present invention can be used to assess effectiveness of complex curricula based on student competency scores. Any competency can be represented with a statement and/or definition and/or can be represented by multiple sub-components. As used herein, the sub-topics corresponding to competencies may be referred to as "microcompetencies" and will be detailed in later sections.

In some embodiments, the systems/methods are not configured to define objective differences between relative skills. The student encounters may be generally, and more typically, totally binary. The terms "didactic environment" and "didactic modality" refer to tests that evaluate a student's learning based on classroom lectures, textbooks, and/or homework. As such, a didactic environment may be limited to reporting elements that are correctly answered (but may discard or give credit for known false-negatives). There are two specific types of assessments in the didactic environment. The basic didactic assessments are simple tests of knowledge with a selection of a single correct answer from one or more incorrect choices. The applied didactic assessment is a more complex test of knowledge where there is a selection of multiple correct answers among many incorrect answers, or where the student writes an answer in text that is compared to a pre-set optimal answer.

An experiential (e.g., clinical) environment may report skills that are successfully completed. There are at least two types of assessments in the experiential environment. The quantitative skills assessment counts the number of experiences encountered by a student as represented by relative value unit(s). The qualitative skills assessment judges the performance of the student while performing a task. This is a direct or indirect observation of skill assessed using a pre-determined rubric.

The term "discussion environment" refers to a problem solving or discussion forum related to a microcompetency code where a student's ability to solve a defined problem or provide a detailed discussion of a defined discussion element demonstrating proficiency or comprehension and critical thinking is given a grade. The discussion environment may be an online environment or may be a paper-based or even classroom environment. Therefore, there may be at least two specific types of assessments in the discussion environment: an assessment of discussion, and an assessment of project/paper/document.

The assessment of discussion may be provided in an online format that accepts user responses and can be (interactively) monitored and/or assessed by a teacher, professor, teacher assistant, and/or other educational evaluator. To promote test integrity, a camera mode can be used and/or biometric inputs can be used to validate that the responder is the student. In other embodiments, a dedicated test site for the testing can be used and student identity can be validated upon access to the site. A CSV (Comma Separated Values) file may be used to provide a measure of the exercise and/or integrate the discussion environment competency evaluation into the cumulative outcome evaluation. Each system can have its own CSV file format that can then be parsed for grading.

The assessment of project/paper/document judges the performance of a group and/or individual in the development of a final product of the discussion that is graded against a pre-determined rubric. A discussion environment may report posts that are made therein. These reports may be defined as cognitive evaluations, meaning that relative quality of individual measures may not be used. Non-cognitive subjective values may be evaluated with other techniques.

In competency-based curricula there may be three different modalities for delivering instruction, and therefore, three different environments for evaluation. According to some embodiments, the three different environments for evaluation can be integrated into an extensible competencies electronic evaluation platform. The environments for evaluation may be the didactic modality, the experiential modality, and the discussion modality. Each will be detailed in separate sections of this document. Not all educational fields use all modalities for evaluation.

In general, "competence" is used to represent a minimal standard for accomplishment that defines a course of study or the completion of a training or educational program. "Proficiency" or "expertise" are considered above the level of basic competence. The determination of the standards for achieving competence can be by the cumulative accrual of assessments, or points, or courses. It can also be defined as having completed a sequence of specifically designed assessments. Combinations of the two methods can also be used.

The term "Normalization" and the term "normalized" refer to a defined correlation standard for measuring different factors. For example, a point value assigned to individual tests or test questions, time spent in clinical or on experiential tasks, values assigned to critical thinking exercises and the like. According to some embodiments, summative reports from many different environments may be digested when available. The results in the individual digested summative reports may be normalized into a common format. All of the summative reports may be combined into a common data set and a graphical representation of the data may be provided in a Cumulative Analysis Grid. Some embodiments provide that normalization may include defining relative value of points based on educational time spent, categorizing possible topics taught (microcompetency) and defining individuals, sub-cohorts of individuals, and cohorts of individuals that may be cumulatively evaluated.

The term "minimal time of relative value" (T) may refer to the basis unit for assigning credit for any outcomes event. T is the base time and can be further multiplied by other factors to assign event credit. The different inputs may be normalized using the minimal time of relative value (T). For example, a test question may have numeric output of "1" or "2" based on how long it is predicted that a typical student may need to evaluate and answer the question. The number can be assigned in time equivalents defined by a particular institution and/or based on a standard, such as a "1" for a 15 minute equivalent (thus a "2" can be associated with questions rated at a "30 minute" projected response time). If a student correctly answers the question, the answer receives the defined (normalized score). For experiences, like clinical practice of medicine or dentistry, the actual time that it takes to perform the task and the relative complexity of the task can be given a normalized value relative to 15 minutes. For example, the average time to extract a tooth may be 15 minutes, therefore, 1 value unit is given. This makes getting one question on a didactic exam equal to taking out a tooth in clinic, from a normalized basis. Similarly, for discussion-based environments, it is possible to give partial points for individual responses to problem-based learning discussions.

The term "relative educational value unit" (RVU or ReVU) is an expression of possible credit for a skills assessment that is relative to time and complexity. For example, assuming that a didactic test item is equal to 1 RVU, then an experiential procedure or discussion experience may be mapped to additional time or complexity. A RVU can be expressed as equal to a basic time interval (T), multiplied by increments of T when more than one time interval is associated with a task or discussion. Additionally, the RVU may be adjusted for complexity: T×n (multiple of T)×C (complexity multiplier). The RVU may provide a relative value score associated with different educational factors, e.g., test scores, test answers, clinical or other experiential tasks or hours, discussion based problem solving skill scores and the like, normalized to a time unit (T).

Thus, grading using RVUs is time-equivalent normalized and may be used for summative outcome evaluation of different categories of testing/evaluation.

The term "microcompetency codes" corresponds to microcompetencies and refers to a hierarchical expression of different topics that are possible for a student to experience during a competency-based educational curriculum. For example, a plurality of microcompetencies are associated with an overall competency for a particular curriculum. Not all codes are necessarily expressed in the curriculum, but the microcompetencies are a superset of what is possible to encounter. Additionally, although generally used herein in the plural form "microcompetencies," the singular form "microcompetency" is included therein.

The term "topic" refers to a defined educational concept, field or subject. The term "topic code" refers to an identifier that is correlated to a defined topic. The term "identifier" refers to a unique set of characters, typically numeric and/or alphanumeric characters. The identifier may be in a defined format for standardization across multiple electronic evaluation platforms. The microcompetencies are expressed as a defined hierarchical set of individual microcompetencies that correspond to a sub-topic of one or more defined topic codes. That is, one microcompetency may be associated with more than one topic code. A topic code typically includes a plurality of associated microcompetencies and may include between about 10-100 for some competency topics, although such range is not limiting. For example, some embodiments herein provide that more or less microcompetencies may be associated with different topics and different topics may have different numbers of microcompetencies. The microcompetencies may be provided with sufficient numbers to allow granular evaluation of a different sub-concepts within a particular topic. The microcompetencies may themselves be related to a plurality of sub-microcompetency codes. A particular educational assessment system may have several hundred topic codes and thousands of microcompetencies. The microcompetencies may be uniquely coded, for example, with a numerical code, but other code types may be used. The code may identify the relationship and/or position of a topic within the hierarchy. "Competency" may be defined as a combination of different microcompetency codes. Further, the same microcompetency may appear in multiple different competency evaluations.

The term "cohort" refers to a group of students who are being evaluated using the same identified components, elements or factors and/or the competencies and/or microcompetencies. Some examples of cohorts may include students grouped by a class, a professor, an associated institution (e.g., college or graduate school), and/or an assigned educational resource for a class (e.g., a metacoded book), among others. Additionally, the discussion modality may warrant another grouping factor that may be addressed by defining sub-cohorts. For example, subsets of students can be assigned to small groups for encountering discussions. Additionally, some embodiments provide that each individual in the cohort is also a member of their own sub-cohort. The details of this process are explained in the discussion modality section. In some embodiments, the cohort may include a set of students who all start at the same time in a training or educational program. In such an embodiment, there may be students who are delayed from completing a program when intended, but the start date may be used for competency-based assessment.

The term "question element" (QE) refers to a single didactic-modality question that includes a stem, one or more distractor answers, one correct answer or combination of choices, and that has a relative value equal to T. For example, a question element may include a simple exam question.

The term "question group" (qgroup) is an expression of a collection of individual didactic questions under a common microcompetency. The didactic-modality questions can be mapped to the microcompetencies at the point of creation and/or at the submission to the system as a testing event report.

The term "testing event" (TE) is a combination of question elements to create a formative evaluation of the cohort or a sub-cohort. Note that the didactic evaluation of sub-cohorts can lead to non-representative results in cumulative analysis.

The term "testing event report" (TER) expresses a cohort performance on a testing event.

The term "item analysis" involves mathematical evaluation of the TER to identify TEs that should be removed due to poor question construction or poor student performance. These tools may vary widely depending on the institution and/or testing mechanism. In some embodiments, the item analysis involves evaluating the individual relative to the cohort.

The term "didactic modality summative report" (DMSR) is a list of each individual's performance on each TE within the cohort after the item analysis have been accomplished and specific TEs have been eliminated from the TER.

The term "didactic modality normalized summative report" is a list of each individual's performance from the DMSR aggregated by RVUs by microcompetency. This report may be verified against the DMSR and then may be submitted to the cumulative data storage for analysis by the various analysis grids.

The term "experiential modality" refers to clinical and/or other "hands-on" type experiences related to a microcompetency code.

The term "procedure anchor code" (PAC) is the expression of coded procedures that can be competed for skills assessment in a clinical setting. In the case of health science they are the ICD-10 codes for medical procedures and CDT codes for dental procedures. In practice, some embodiments provide that the procedure anchor codes are represented and may be later mapped to a subset of microcompetencies.

The term "tieback identification" (tieback ID) is a data element that refers back to the original system where data was encountered by the students. In this way, if there is a discrepancy or a challenge to grade, the tieback ID allows for reference to the original system. FIGS. 28 and 29 illustrate example implementations of tieback IDs 2810. In FIG. 28, the tieback ID 2810 refers to a particular event which generated the evaluation grade and/or RVUs (e.g., a practical encounter, a laboratory, etc.) for a given student 2820 (illustrated as blurred out in the left-most column of the figure) being instructed by a given teacher/instructor 2830 (also blurred out in the figure). In FIG. 29, the tieback ID 2810 refers to an examination given by a particular teacher/instructor 2830 which generated the evaluation grade for the student 2820. It will be recognized that other types of tieback IDs may be generated without deviating from the present invention.

The term "experience element" (EE) refers to an individual performing an actual skill-related task.

The term "experience group" (EGroup) is an expression of a collection of procedures/experiences under a common microcompetency. The experience modality procedures can be mapped to one or more microcompetencies at the point of creation and/or at the submission to the system as an experience event report. An "experience event report" (EER) expresses cohort performance on a testing event during a specific range of time and/or predefined time interval. For example, some embodiments provide that experience event reports may include daily reports from one or more other systems.

The term "experience modality normalized summative report" (EMSR) is a list of each individual's performance from the EMSR aggregated by RVUs by microcompetency. The PAC may be replaced with a microcompetency and its related RVU. This report may be verified against the EMSR and then submitted to the cumulative data storage for analysis by the various analysis grids.

The term "discussion modality" refers to a problem solving or discussion forum related to a microcompetency code where a student's ability to solve a defined problem and/or provide a detailed discussion of a defined discussion element demonstrating proficiency and/or comprehension and critical thinking is able to be given a grade. The discussion modality may be an online environment, a paper-based environment and/or may be a classroom environment. Some embodiments provide that the discussion modality is provided in an online format that accepts user responses and can be (interactively) monitored and/or assessed by a teacher, professor, teacher assistant, and/or other educational evaluator. To promote test integrity, a camera mode can be used and/or biometric inputs can be used to validate that the responder is the student. In other embodiments, a dedicated test site for the testing can be used and student identify can be validated upon access to the site.

An "individual discussion event" (IDE) is an individual making a comment in a discussion environment. There are many different types of IDEs and their value may be different for different types and/or content of comments.

As used herein, a "discussion sub-cohort" is a subset of the total cohort that facilitates the discussion educational experiences. In some embodiments, the entire cohort can be a discussion sub-cohort and/or an individual can be a discussion sub-cohort. Some example embodiments provide that a typical discussion sub-cohort is 5-10 individuals, however, such example is non-limiting in that sub-cohorts may be less than 5 or more than 10 individuals.

A "discussion sub-cohort summative report" (DSSR) expresses discussion sub-cohort performance on a discussion event during a specific range of time and/or time interval. In some embodiments, DS SRs may include a weekly reports from one or more other systems. A DSSR may be sent directly to the system for assignment of microcompetencies and RVU. Unlike the other two environments the topics discussed may be limited to tagging after they happen.

A "discussion sub-cohort normalized summative report" is a list of each individual's performance from the DSSR aggregated by RVUs by microcompetency. A decision may be made within this report as to the members of the sub-cohort who will receive credit for the discussions. The entire group can be given equal credit as a team, or the individuals can be given credit individually. The normalized data may be submitted to the cumulative data storage for analysis by the various analysis grids.

As used herein, the term "cumulative grid" (also referred to as the "grid") refers to a summary of competency related scores of (e.g., microcompetencies, groups of microcompetencies, and/or OEs) for one or more students. The grid can be color-coded to show degrees of competence such as whether a student meets defined threshold levels of competencies in different microcompetencies and/or sub-microcompetencies. The grid can be interactive and/or parseable to allow a user to access supporting data associated with the reported scores which can electronically organize the student data in various ways to analyze positive and negative trends associated with different classes, students and groups of students as well as common factors with different students.

The term "interactive grid" refers to a grid that includes elements that can be selected by a user (via a UI such as a GUI) to then electronically reveal underlying data supporting that element. Thus, when several students are identified as below minimum for a defined competency (e.g., a competency defined by one microcompetency, groups of microcompetencies, one or more sub-microcompetencies and/or groups of sub-microcompetencies for a topic), some embodiments disclosed herein may allow a user to access and/or interrogate (e.g., point and click on a block) the grid to identify individual ratings in various sub-competencies, as well as common factors, such as professor, school, class time, textbook, (clinical) experiences or tasks, and/or a location where the tasks were performed, among others. This cohort or associated data can allow educators or schools to adjust curriculums to address student needs where deficiencies are identified, for example.

The term "registered" means that the user is a recognized online participant of the system, typically using a password and login and/or authorized portal. The term "administrative user" refers to a user that does not have permission to access student records. Different types of administrative users can have different access levels to the system. Some participants/users may have access to cohort data correlated to student success, without any student identifiers. The term "web-based" means that the service uses at least one server to communicate with different users over one or more networks including, for example, the World Wide Web (e.g., the Internet), using, for example, the hypertext transfer protocol (HTTP), among others.

The term "weblog" and/or "blog" refers to a discussion or informational website published on the World Wide Web consisting of discrete, often informal diary-style text entries ("posts"). Posts are typically displayed in reverse chronological order, so that the most recent post appears first, at the top of the web page.

The term "problem-based learning" (PBL) refers to an open-ended discussion of any topic within a group with the expressed purpose of better understanding a core concept or the relationship of a topic to other topics.

The term "weblog PBL group" refers to a subset of students from a cohort that is assigned to a group in the weblog software to focus their discussions. The term "weblog PBL post" refers to a text entry from a member of the group.

The term "logistics post type" or "logistics post" refers to a qualitative characterization of any student post to be either (1) asking the group a question, or (2) giving direction to the group for specific tasks.

The term "content post type" or "content post" refers to a qualitative characterization of any student post to be providing information (content) that furthers the solution of a problem. FIG. 37 illustrates a user interface displaying an example post of the content post type.

The term "case post type" or "case post" refers to a qualitative characterization of any faculty post that provides a prompt or problem to the group for the students to solve. FIG. 49 illustrates a user interface displaying an example post of the case post type.

The term "guidance post type" or "guidance post" refers to a qualitative characterization of any faculty post that guides the students' discussions as the students solve a problem.

The term "trash post type" or "trash post" refers to a qualitative characterization of any student post that is to be discarded from evaluation. For example, a trash post may be a post that is mistakenly made, blank/empty, non-responsive, meritless and/or is otherwise detrimental to the discussion. FIG. 51 illustrates a user interface displaying a blank post of the trash post type.

The term "other post type" or "other post" refers to a qualitative characterization of any student or faculty post not otherwise categorized (e.g., as a logistics, content, case, trash, or guidance post). For example, a post that gives support or accolades to a member or the entire group may be characterized as an "other" post type. FIG. 50 illustrates a user interface displaying an example post of the other post type.

The term 'weblog PBL thread" refers to a sequence of related posts managed by the weblog. FIG. 32 illustrates an example of a weblog PBL thread.

Figure 52:
FIG. 52 is a screen shot of a graphical user interface displaying a sample screener assignment according to some embodiments of the present invention.

The term "screening" refers to the process of assigning each post in a thread to a post type-logistics, content, case, guidance, other, or trash. If a person performs this task, that person may be called the "Screener." FIG. 52 illustrates a user interface displaying a sample screener assignment.

The term "discussion grading" refers to the process of adding microcompetency code(s) and related relative value units to content posts of a discussion. If a person performs this task, the person may be called the "Reference Grader."

The term 'committing" refers to the process of the final verification the screening and discussion grading processes. If a person performs this task, the person may be called the "Definitive Grader."

The term "competency assessment" refers to the process of accumulating the points achieved, per microcompetency by a student and/or reporting individual and group statistics and rankings.

The term "participation/leadership assessment" refers to the process of accumulating the numbers of each post type per student and reporting the individual statistics and rankings.

Embodiments or aspects of the present invention may be carried out using any social network service, typically a social network service that can provide suitable security or private (or semi-private) communications. The term "Yammer®" refers to an enterprise social network service that was launched in September 2008 by Yammer, Inc., San Francisco, Calif. Unlike Twitter®, which is known for broadcasting messages to the public, Yammer® is used for private communication within organizations or between organizational members and pre-designated groups, making it an example of enterprise social software. It is contemplated that other suitable enterprise social software/systems/services may be used to carry out aspects of the present invention.

Figure 2:
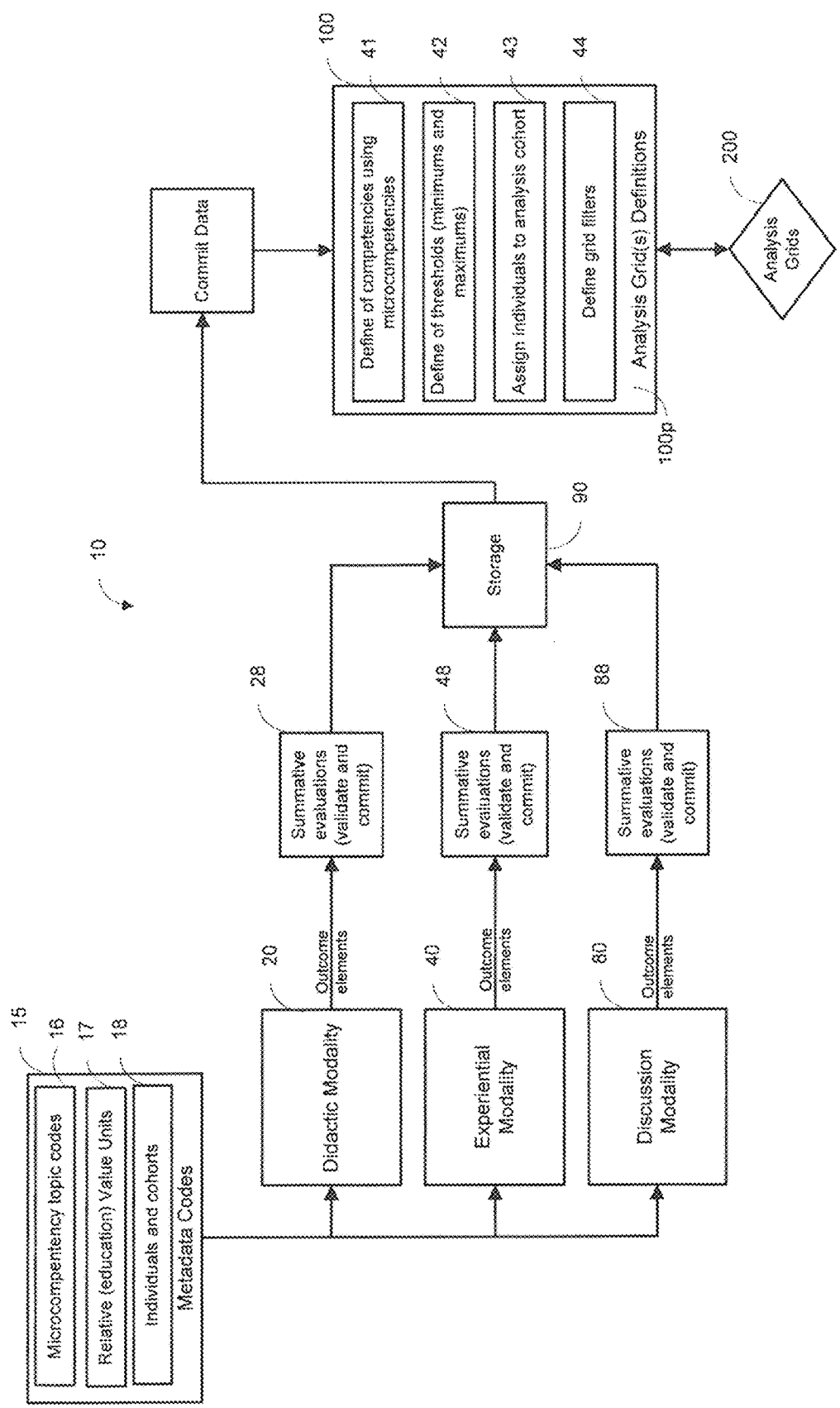
FIG. 2 is a schematic illustration system/method similar to that shown in FIG. 1 with an additional analysis platform according to some embodiments of the present invention.

As shown in FIGS. 1 and 2, embodiments of the invention include systems and methods of analysis 10 that include data from one, two or all three different environments: didactic modality 20, experiential modality 40 and discussion modality 80. Each modality 20, 40 and 80 is able to generate respective summative evaluations 28, 48, 88, which are associated with the metadata codes 15 including, microcompetencies topic codes 16, RVUs 17, individual (student specific) codes and cohort (e.g., class, professor, book, learning institution, etc.) codes 18. The data underlying each report and/or outcome element can be electronically stored for ease of future retrieval as evidence of performance and/or for curriculum or other evaluation.

"Program assessments" are defined as those created by teachers/faculty who teach the courses within the program itself. "Milestone assessments" are externally written and validated assessments that are given to determine the relative quality of the program assessments by comparison of student performance. "Capstone assessments" are those externally written and validated assessments that are given to evaluate performance across educational programs as a way of granting credential or licensure. Although not limited thereto, it is contemplated that some embodiments described herein may also be used in conjunction with a licensing system such as for state legal bar examinations for lawyers, and/or licensure examinations for doctors or veterinarians, among others. These are examples of capstone assessments.

It is also contemplated that some embodiments disclosed herein can evaluate cumulative outcome data with its rich underlying cohort data to provide feedback to educational institutions, book publishers, and the like based on pass rates, topic specific achievements for various microcompetencies, and the like over multiple students and in multiple states. This data analysis can allow such institutions, or other organizations to rank schools, rank professors and/or classes, evaluate text books (noting those that provide the best student outcomes for a particular topic and/or those that produce poor results), reward best-outcome educators for one or more topics, and/or make other changes to a class or curriculum based on such cohort data and cognitive outcome results.

It is also contemplated that the systems/methods can be used to evaluate continuation education CLE evaluation may only evaluate one or a sub-set of the three environments. First, the didactic environment provides for a direct delivery of content and a relatively simple assessment using questions and answers. Second, the clinical environment provides for the performance of skills and a relatively simple assessment of skill performance. Third, the discussion environment provides for delivery of stated scenarios that require research and synthesis and a relatively complex assessment of problem-solving behaviors and skills.

Didactic Modality

There are at least two subcomponents of the didactic environment. The first subcomponent may include basic didactic assessments, which are multiple choice and true false. The second subcomponent may include applied didactic assessments which include short answer and essay-type answers.

(1) Basic Didactic Assessments

Still referring to FIG. 1, the didactic modality 20 can include outcome elements 28 that are based on individual testing elements (block 21) that are electronically (pre) tagged with an associated microcompetency and RVU (block 22), then grouped into examinations for respective individual testing element summative evaluation (block 23). The grouping can group sets of individual testing elements 21 with scores (normalized using RVUs) (block 23) for summative evaluations×N (block 24). Thus, the student encounter with the examinations may be filtered through extensible outcome element item analysis as a binary evaluation (block 25), with post-item analysis summary report (block 26) before being submitted and/or used for outcome element summative grading 28 and data storage 90, and electronic cumulative analysis 100.

Didactic modality 20 may provide summative evaluations 28 based on individual test elements that are electronically pre-tagged with one or more associated microcompetencies and a corresponding RVU. Stated differently, exam questions are associated with topics and points, then collected into an exam for students to test their knowledge.

For many educational environments, individuals are evaluated for knowledge based on simple questions with single correct responses. These questions are typically given in collections as tests and exams. Performance may be based on relative percentage of correct responses. Thresholds for summative analysis may be relatively simple. Examples of associated steps for this evaluation are described below:

Step 1. Question stems are associated with responses, which are tagged as correct or as distractors. These are question elements. Each question element is associated with a unique identifier. Each question element is given a RVU of 1. The assumption is that the amount of time that it takes to understand material to get the correct answer on one item is equal to the minimal time of relative value (T). An explanation of the correct answer may be provided for later use. Some embodiments provide that the stem can include images.

In some embodiments, question stems are associated with responses, which are tagged as correct or as distractors. These are question elements. Each question element may be associated with a unique identifier.

Step 2. Question elements are tagged with one or more microcompetency codes (microcompetencies). This can be accomplished in two ways. In some embodiments, each question element may include metatags where a code can be associated. In some embodiments, question groups (QGroups) are generated and then question elements are placed under the appropriate QGroup.

Step 3. Question elements are sequenced into testing events. Each testing event may be associated with a summative analysis code. In most cases this may be related to a course. A testing event may include question elements that are associated with one or more microcompetencies and a RVU. Therefore, formative reports can be generated to associate individual performance relative to a pass/fail threshold, relative to the other individuals in a cohort, and/or by subject matter.

Step 4. Using a learning management system, the cohort of individuals encounters the testing event and data concerning the individual achievement on each question element is recorded. A non-adjusted testing event report may be generated.

Step 5. After all individuals have completed the testing event, each item may be analyzed for quality of the item. The effect of the cohort may be important at this juncture in the process. Every student must encounter the summative evaluation so a post evaluation item analysis can be performed on the raw results. In some embodiments, an institution may decide not to perform item analysis to generate a normalized summative report, but it is preferable to exclude poorly written questions or questions where the cohort guessed.

It is noted that item analysis may include many statistics that can provide useful information for improving the quality and accuracy of multiple-choice or true/false items (questions). Some of these statistics include item difficulty, which may be determined as the percentage of students that correctly answered the item. This process can be performed within the learning management system and/or through operations and methods disclosed herein. One function of the item analysis is to remove poorly constructed questions or questions where the entire cohort performed poorly. An institution can devise multiple methods for this process. This disclosure does not provide the specific mechanism of item analysis, but it provides that this operation be performed before a summative report is sent for analysis.

Step 6. Based on question element item analysis, individual question elements may be eliminated from reporting. In some embodiments, items may be deleted one item at a time, because a higher exam reliability coefficient may be provided if a question element is deleted, and the item-total statistics report is re-run to ensure that the overall alpha of the exam is not lowered.

In some embodiments, item analysis may involve many statistics that can provide useful information for improving the quality and accuracy of multiple-choice or true/false items (questions). Some of these statistics may include item difficulty which may be determined as the percentage of students that correctly answered the item, also referred to as the p-value. The range is from 0% to 100%, or more typically written as a proportion of 0.0 to 1.00. The higher the value, the easier the item.

In some embodiments, the calculation may include dividing the number of students who got an item correct by the total number of students who answered it. A goal value may be slightly higher than midway between chance (1.00 divided by the number of choices) and a perfect score (1.00) for the item. For example, on a four-alternative, multiple-choice item, the random guessing level is 1.00/4=0.25; therefore, the goal difficulty level may be 0.25+(1.00−0.25)/2=0.62. On a true-false question, the guessing level is (1.00/2=0.50) and, therefore, the goal difficulty level may be 0.50+(1.00−0.50)/2=0.75, or higher. P-values above 0.90 may indicate easy items and should be carefully reviewed based on the teacher's purpose. For example, if the teacher is using easy "warm-up" questions or aiming for student mastery, then some items with p-values above 0.90 may be warranted. In contrast, if an teacher is mainly interested in differences among students, these items may not be worth testing.

P-values below 0.20 may indicate very difficult items and should be reviewed for possible confusing language, removed from subsequent exams, and/or identified as an area for re-instruction. If almost all of the students get the item wrong, there is either a problem with the item or students were not able to learn the concept. However, if an teacher is trying to determine the top percentage of students that learned a certain concept, this highly difficult item may be necessary.

The relationship between how well students did on the item and their total exam score, also referred to as the Point-Biserial correlation (PBS), may have a range from (−1.00) to 1.00. The higher the value, the more discriminating the item. A highly discriminating item may indicate that the students who had high exams scores got the item correct, whereas students who had low exam scores got the item incorrect. Items with discrimination values near or less than zero may be removed from the exam. This indicates that students who overall did poorly on the exam did better on that item than students who overall did well. The item may be confusing for higher scoring students in some way. An acceptable range for this value may be 0.20 or higher.

The reliability coefficient may be a measure of the amount of measurement error associated with a exam score. The range may be from 0.0 to 1.0. The higher the value, the more reliable the overall exam score. Typically, the internal consistency reliability is measured. This may indicate how well the items are correlated with one another.

High reliability may indicate that the items are all measuring the same thing, or general construct (e.g. knowledge of how to calculate integrals for a Calculus course).

Three ways to improve the reliability of the exam may include 1) increase the number of items in the exam, 2) use items that have high discrimination values in the exam, and/or 3) perform an item-total statistic analysis.

A corrected item-total correlation is the correlation between an item and the rest of the exam, without that item considered part of the exam. If the correlation is low for an item, this means the item is not really measuring the same thing the rest of the exam is trying to measure.

Another useful item review technique to use is distractor evaluation. The distractor should be considered an important part of the item. Research shows that there is a relationship between the distractors students choose and total exam score. The quality of the distractors may influence student performance on an exam item. Although the correct answer must be truly correct, it is just as important that the distractors be incorrect. Distractors may appeal to low scorers who have not mastered the material, whereas high scorers should infrequently select the distractors. Reviewing the options can reveal potential errors of judgment and inadequate performance of distractors. These poor distractors can be revised, replaced, or removed.

(2) Applied Didactic Assessments

Step 1: Question stems are generated. Applied Didactic Assessments may include a case/scenario in addition to the typical stem. The case scenario may be used as a separate component. The scenario may be a story that places the student in a situation that needs to be solved. For clinical exams, this may give a patient scenario, often with images.

Step 2: Questions may be associated with timers. Applied didactic assessments can, and often do, include a question timer. If a timer is deployed it sets a fixed amount of time that the student has to answer the question.

Step 3: Rules for advancement through the questions during the applied didactic assessment may be determined. Applied didactic assessments can include direct advancement. This is a process where the student encounters each question in order without being able to review previous questions. The direct advancement allows for progressive disclosure of a scenario. The student, when receiving new parts of the scenario cannot go back and apply that knowledge to a previous answer.

There are at least two unique formats of applied didactic assessments—(1) multi-response and (2) free-response. The differences are centered around the ways that the answers are made and the scores are calculated.

Applied didactic assessments may be deemed, in most competency-based programs, as being sufficiently complex as to be able to be used to test "competence." In some instances, both types of questions are merged to form very complex exams. If the exams are used to test competence, then the date of completion may need to be kept for accreditation. This decision may be made before the students take the assessment.

If the assessment is marked as "for competence" then the result of failure also needs to be determined. By definition, a "for competence" assessment must be passed to successfully complete the program.

A determination may be made as to which type of applied didactic assessment is the best to test the needed concept. In general, the multi-response may be used when testing the students' discrimination between categories—such as differential diagnosis. The free-response may be used when requiring the student to explain their decision-making or problem-solving methodologies.

(2a) Multi-Response Applied Didactic Assessment

Step 4a. Question stems are associated with responses. In a multi-response applied didactic assessment, the multi-response question looks like a basic multiple choice question with many more choices. However, in a multi-response question the satisfactory answer depends on selecting the proper combination of answers, not just one simple correct answer. The answers for the multi-response assessments may be fashioned into a list. There are, in some embodiments, four different answer types. (a) correct answer—associated with positive points. (b) push answer—associated with no points. Note that these answers are not considered as either directly correct or incorrect. (c) incorrect answer—associated with zero or negative points. Note that answering one incorrect answer may not be enough to fail the question. This depends on the rules of the question. (d) critical failure answer—associated with zero or negative points. Note that answering with this selection will automatically fail the entire question. The answer is considered so poor as to be a critical failure. These are question elements. Each QE may be associated with a unique ID number. Each correct QE may be given a RVU and incorrect answers are given a negative RVU.

Step 5a. Each correct answer is tagged with a microcompetency code (MC). The same question can have multiple correct answers and multiple MCs. The number of multiple-choices may be relevant to the overall success of the assessment. There should be enough choices to require the student to combine multiple correct answers and to avoid incorrect choices.

The RVUs assigned to the correct answers are set. For multiple-choice, there is often only one correct answer, usually worth 1 point. For multi-response, every answer can be worth a different number of points, yielding a total number of points for the question that can be much greater than 1 point. This variation in points per question can have an impact on normalization. Essentially, the faculty member has to think about the relative weight of getting a multi-response question correct relative to a single multiple choice. The multi-response requires the simultaneous use of more knowledge and application to a state problem.

If timers are used as part of the assessment, they may be determined for the respective questions.

Step 6a. Question elements are sequenced into testing events (TE). There are several unique rules for a multi-response question: (a) In most cases, answering a critical failure answer means failing the entire question; (b) Rule of maximum points—this means that, before the question is given, a maximum number of points is set. This requires that the selection of all answers with positive, negative and zero-point answers must sum to a total number of points; and (c) Rule of minimum points—this means that, before the question is given, a minimum number of points is set. This allows that some incorrect, but non-critical failure, answers can be answers in addition to the correct answers to sum to the pre-set minimum. By setting a minimum and a maximum, there is a threshold of points required for successful encounter to each question. Each TE is associated with a summative analysis code. In most cases this is related to a course. A TE may include QEs that are associated with a MC and an RVU. Therefore, formative reports can be generated to associate individual performance relative to a pass/fail threshold, relative to the other individuals in a cohort, or by subject matter.

Exams with multiple-response items may involve more effort than setting a basic percentage. It is possible that there could be certain questions that the faculty member thinks are critical to assess competence. Therefore, it is important to determine which questions specifically are correct instead of a basic percentage. This is why applied didactic assessments can be used to test specific areas of competence in a different way than basic didactic assessments.

Using a learning management system, a cohort of individuals encounters the TE and data concerning the individual achievement on each QE is recorded. A non-adjusted TE report may be generated. After all individuals have completed the TE, each item may be analyzed for a quality of the item. This may include a comparison of the answers provided for the TE to the correct, push, incorrect, and critical failure answers.

(2b) Free-Response Applied Didactic Assessment

Step 4b. Question stems are associated with responses. The free-response applied didactic assessment allows the student to write a series or words, sentences or paragraphs that fully respond to a question in the stem.

The free response answer is unique in that the question writer writes what he/she expects should be written by the student when encountering the question. The points for the answer may be estimated based on the complexity of the answer.

Step 5b. Each correct answer is tagged with a microcompetency code (MC). The same question can have multiple correct answers and multiple MCs. The RVUs assigned to each correct answer may be based on the complexity of the pre-determined correct answer written by the faculty. Again, the variation in RVUs may be relevant to the normalization. By using multiple choice as the base, the faculty member may determine the relative weight of getting the answer correct on a free-response question versus a simple multiple-choice. In general, these are worth multiple points.

Step 6b. Question elements are sequenced into testing events (TE). When the answer is graded, the student answer is compared to the pre-written example answer. The student is graded down from the maximum points based on the elements present. Therefore there is not a simple binary correct or incorrect answer, some answers are partial credit. Essentially the assignment of points determines correct or incorrect answer, but the point assignment may not be binary.

Didactic Reports

After the didactic assessments are complete, reports may be generated.

Step 7. Following exclusion of flawed question elements, a didactic modality summative report may be generated to give the individual their adjusted score (% correct), the class average, the individual class rank, and/or an explanation of the items missed, among others. The institution may choose to average these reports over courses to give traditional grades. That process is not unique and is not in detail herein.

Alternative Step 7. As an alternative to the above-described operation, following the exclusion of flawed question elements, a didactic modality summative report may be generated to give the individual their adjusted score (% correct), the class average, the individual class rank, and/or an explanation of the items missed, among others. Question elements may be tagged with one or more microcompetency codes (microcompetencies).

Step 8. A didactic modality normalized summative report may be created. This data may be verified by the testing specialist as being complete and may be sent to a cumulative analysis engine (electronic circuit and database(s)). In this manner, the RVUs associated with individual questions may be replaced with an aggregation of RVUs by microcompetency per individual for submission to the cumulative analysis grid.

Step 9. The didactic modality normalized summative report may be verified against the summative evaluation report to make sure that the individual is receiving the same number of points relative to the cohort. This may be important to the process. If the overall goal of the process is to see where an individual student is strong or weak relative to topics, different students in the same cohort can score the same percentage of points, but have done well or poorly in different microcompetency areas. This verification step assures that the same number of points are transferred during the normalization process.

Step 10. The verified normalized summative report may be submitted to the cumulative analysis grid and it may be verified that the student received the appropriate number of points to the appropriate competency.

Step 11. The verified normalized summative report may be archived as "committed" for audit purposes.

Experiential Modality

Still referring to FIGS. 1 and 2, experiential modality 40 may also be associated with metadata codes 15 for outcome elements. The experiential modality 40 can employ outcome elements that are formulated using (pre)tagged specific skills (e.g., "Individual Experience Element" or "IEE"). The individual experience elements (block 41) are electronically associated with a respective microcompetencies 16, groups of microcompetencies and/or sub-microcompetencies and RVUs 17 (block 42). Each student can encounter one or more individual experience elements (skills) 41 at different times and the number of events (N) (block 43) can vary from student to student. Proficiency in a skill provides the binary decision (block 44) used by a post-event summative report 45 to submit the outcome element 48 for cumulative analysis 100 and/or an electronic competencies assessment platform 100*p*.

Placing a topic metatag (like microcompetency code) to a specific course component allows an institution to visualize where certain topics are taught over the delivery schedule of the curriculum. From a practical view, time units may be mapped in increments of 15 minutes, however, the disclosure is not so limited. The didactic environment is the most predictable and is the closest to standardization. For example, 15 minutes of lecture or presentation laboratory experience (cadaver lab, histology lab) is 15 minutes regardless of the subject matter. Therefore, it is substantially knowable and quantifiable for most faculty to agree upon the definition in order to report.

There are two different types of assessments under the experiential environment—(1) quantitative skills assessments which count the number of experiences performed, and (2) qualitative skills assessments which are a rubric-based evaluation of how well an experience is performed.

(1) Quantitative Skills Assessments

For experiential modality 40, microcompetency codes can be pre-defined with respect to various actions, seminars, participation or viewing events and procedures associated with an experiential environment of a particular educational curriculum (e.g., clinical, surgical or laboratory system for health sciences and practicals for observation or teaching in schools for a teacher curriculum). On a defined temporal basis, e.g., daily, weekly or the like, an electronic report can be generated (e.g., in a CSV format) which identifies student, RVUs, provider identification code and the respective microcompetencies. These reports can be generated daily and can accumulate over the academic life (and beyond) of each student. The data is provided with a convention for student identifiers (or a translator for allowing data input), and the system can be automated to create, evaluate and submit each report to a grid data repository and analysis circuit.

In health science, the performance in actual clinical procedures is important to properly evaluate individual performance. The individuals record these events in electronic patient record systems. Every procedure is tagged with an existing Procedure Anchor Code (PAC), which is usually associated with the financial remuneration for the successful performance of the task. In medicine, these are the ICD-10 codes. In dentistry, these are the CDT codes. Examples of individual experience element evaluation steps are described below.

Step 1. Match each PAC with an appropriate microcompetency code. All assessment reports will substitute the microcompetencies for the PAC.

Step 2. Each procedure that is represented by a PAC is evaluated for RVU. As noted above, the RVU measures the relative educational value for each procedure. To normalize the outcomes assessment for experiential (clinical) and discussion-based educational environments, the RVU may be based on three components. The first component is time, which may be the physical time that it takes to perform a clinical task. In embodiments in which the normalized value of one exam question is 15 minutes of educational investment, 15 minutes is equal to 1 RVU. The second component is laboratory time as many dental procedures involve laboratory time for students. The amount of time that a student will perform laboratory tasks that are separate from clinical contact with the patient may be estimated. The third component is higher expertise. For example, some procedures, like complex oral surgery, will involve a higher level of interest by the student or a higher level of specialty instruction to perform in a pre-doctoral setting. Some embodiments provide that a multiplier of 3 may be used, although the multiplier may be a value other than 3 in other embodiments. Some codes are "observational" in that students would not actually perform the procedure and therefore only get credit for being involved.

In the experiential (e.g., dental clinical) examples that follow, a list of CDT codes was presented to a group of faculty members for their estimate of an RVU for each code. "T" was previously defined as equaling 15 minutes, so 15 minutes is equal to "1 unit". The following formula was used:

$$RVU = (\text{clinic time} + \text{lab time}) \times \text{complexity multiplier}. \quad \text{(Equation 1)}$$

For each institution, there is a core list of CDT codes that apply to all dentistry and there are certain procedures that are unique to that educational environment. For example, every "house code" has an assigned RVU. Certain laboratory skills are taught in preclinical courses and can be given PACs as derivative CDT codes. In this manner, the institution may use the clinical system to track laboratory outcomes. Examples of clinical experiences with assigned RVUs and associated MC are:

PAC-D0421—Genetic test-oral diseases—36.00 Based on 2 hours of clinical time (12 RVU), 1 hour of laboratory time, with HE Multiplier. MC—01.02.09.01 Genetic Testing PAC-D7287—Cytology sample collection—2.00 Based on 30 minutes of clinical time. MC—01.08.01.08—Bacterial Cultivation PAC-D1310—Nutritional counseling—8.00 Based on 1 hour of clinical time, 1 hour of laboratory time. MC—01.07.02.05—Nutritional Assessment Step 3. Each day in the experiential curriculum, an individual may perform procedures. A successful attempt may be given credit by an appropriate authority. In some embodiments, all individuals in the cohort perform procedures as part of daily curriculum events. This is called a experience event report.

Once all procedures are tagged with MC and RVUs, then the experiences may be made available to the students and the qualitative determination of successful completion may be defined. There are many ways that success can be defined, including basic binary rubrics. It is even possible to create complex methods for discounting the RVUs for different quality performance levels, however, if the goal of the assessment is to simply count the number of experiences, a basic determination is made of acceptable work. This determination is relevant for normalization. Developing skills for a skills-based program may be valued more than a single multiple choice question.

Once the opportunities for the student to encounter the experiences are made, then a determination made for the time frame for reporting the experiences. This can be a daily, weekly, monthly report or some similar time-based reporting mechanism. For some competency-based programs, the program may evaluate how often students encounter certain experiences, so the reporting needs to be based on ways that the program can look at ways to optimize experiences.

Step 4. An experience modality normalized summative report is generated from the experiential platform to give the individual production of procedures and RVUs for each of the associated microcompetencies. The summative report may be time-based in some embodiments. An experience modality normalized summative report is created in a similar fashion to the didactic environment. This data is verified by the outcomes specialist as being complete and is sent to a cumulative analysis engine. Some embodiments provide that the process replaces the RVUs associated with individual procedures with an aggregation of RVUs by microcompetency per individual for submission to the cumulative analysis grid.

Step 5. The experience modality normalized summative report is verified against the experience event report to make sure that the individual is receiving the same number of points relative to the cohort. In this manner, areas of an individual student's strength and/or weaknesses relative to topics may be determined even if different students in the same cohort can score the same percentage of points. The areas of strength and/or weakness may be identified by determining that a student has done well or poorly in different microcompetency areas. This verification step assures that the same number of points may be transferred during the normalization process.

Step 6. The verified experience modality normalized summative report is submitted to the cumulative analysis grid and it may be verified that the student received the appropriate number of points to the appropriate competency.

Step 7. The verified experience modality normalized summative report is archived as "committed" for audit purposes.

(2) Qualitative Skills Assessments

Qualitative skill assessments involve the direct or indirect observation of the student's participation in an experience. In quantitative skills assessment, the number of procedures that are completed are counted. For qualitative skills assessment, the student is judged based on the quality of the performance, not the simple completion of the task. Note that is possible for groups of students to be evaluated as a team using this assessment technique.

Step 1: Determine a rubric. For qualitative skills assessment, the rubric is the TE, however the student does not encounter the TE directly. Instead, the student performs the task and is directly evaluated by the grader, or graders, using the TE. Note that the student may uses the same rubric to self-assess before being evaluated by the grader. Rubrics are essentially complex survey instruments. For qualitative skills assessments, there are universal components of a rubric. The rubric "step" defines one aspect of performance that is to be evaluated by a grader. As example, if one were judging a student's ability to drive a car, one step could assess the ability to maintain speed, and another step could assess the proper use of turn signals. Under a step are the "strata" which define the quality of performance. A minimum of two strata are required under each step. The first is a failure (or critical failure) stratum which denotes that the student did not perform the task to an acceptable level of quality. The second is a passing stratum which denotes a minimum of a basic level of acceptable quality. In some rubrics, there are several levels of passing strata—such as excellent/ideal, good/very good, acceptable, etc. Note that complex rubrics may include groups of steps, called rubric blocks.

Step 2. Each rubric step may be tagged with a Microcompetency Code (MC). The rubric can have multiple steps and multiple MC.

Step 3: Each rubric stratum may be tagged with a RVU based on the level of acceptability and the relative value of each step. For example, a stratum that signifies a higher level of quality (e.g., excellent/ideal) may be tagged with a higher RVU total than a stratum that signifies a lower level of quality (e.g., acceptable).

Step 4. Question Elements may be sequenced into testing events (TE). Each TE may be associated with a summative analysis code. In most cases this is related to a course. A TE includes QEs that are associated with a MC and a RVU. Unlike didactic exams, rubrics have different rules that are possible for standards of pass and fail. In competency-based qualitative skills assessments, failure strata on any step may mean that the student fails the entire assessment because the student is considered to have not met competence. For other rubrics, failure on a single step can mean a lower score. Also, unlike didactic exams, groups of students could be evaluated for team competence. Rules about assigning points to individuals in the group or all participants in the group must be decided before the assessment is given. The assignments of points is relevant to normalization. In most cases, the qualitative assessment of a skill is a multiple of the RVU that was assigned for the basic quantitative skill. That multiple is determined by the program.

For some programs, qualitative skills assessments are a major assessment type for determining competence. Therefore, if the assessment is tracked as a "for competence" assessment, then the date of completion is recorded for reporting to accreditation.

The qualitative skills assessment may be constructed with differing numbers of rubric steps. The number of steps and the points (RVUs) assigned to each strata define the total number of points that are possible for the TE. Different qualitative skills assessments have different complexity, and thus, different numbers of rubric steps.

The rules of passing and failing may be specific for the qualitative skills assessment. If, as in most competency-based qualitative skills assessments, the rule for passing means that the student must pass every step of the rubric, then the points for passing strata only have to relate the level of quality. If the rules allow for individual steps of the rubric to be failed without failing the entire assessment, then the points may relate to a percentage that can be calculated to determine pass/fail.

What is different for qualitative skills assessment from didactic exams is the need for a rule of retakes. If a student fails a qualitative skills assessment on the first attempt, then there can be additional rules that either (1) allow retakes without reduction of points, or (2) allow retakes with reduction of points.

Similarly, the program must determine how many attempts are allowed. "For competence" qualitative skills assessments can have a limited number of attempts before the student fails a course or is dismissed from the program. This is harsh, but, in competency-based curricula, some students may not be able to perform a required skill to an acceptable level and, therefore, may be required to leave the program.

Unique to rubric-based assessments are the inclusion of multiple graders for evaluation of performance. There are many different mechanisms for determining how those different graders are used in the calculation of the final grade for each rubric step. If multiple graders are used, then several rules must be implemented to decide how the different graders will qualify towards the calculation of a grade (including pass/fail). There are many different techniques for determining calibration of graders. One of the techniques may be used to allow for fairness and validity of the qualitative skills assessment. Methods for determining calibrations of graders are described in commonly-assigned U.S. patent application Ser. No. 16/117,433, filed Aug. 30, 2018, entitled "Systems, Methods, and Computer Program Products for Characterization of Grader Behaviors in Multi-Step Rubric-Based Assessments," the entire contents of which are included by reference herein.

Qualitative skills assessment is different from didactic assessments in another important way. The performance of a skill can be delayed in a way to allow the student to first assess their own work before being graded. In many programs, self-assessment is part of accreditation standards. It is possible that the results of self-assessment could be used to adjust grades. However, this is not the usual primary focus of self-assessment. The characterization of self-assessment is usually used formatively to help improve performance on subsequent skills assessments.

Step 5. A course summative grade report is generated to sum the results of the students qualitative performance from all skills assessments relative to the others in the cohort. This is to give the individual the sum of production, the class average, and/or the class rank for a particular course.

Step 6. The course summative grade report is verified against the experience event report to make sure that the individual is receiving the same number of points relative to the cohort. In this manner, areas of an individual student's strength and/or weaknesses relative to topics may be determined even if different students in the same cohort can score the same percentage of points. The areas of strength and/or weakness may be identified by determining that a student has done well or poorly in different microcompetency areas. This verification step assures that the same number of points may be transferred during the normalization process.

Step 7. The verified course summative grade report is submitted to the cumulative analysis grid and it may be verified that the student received the appropriate number of points to the appropriate competency.

Step 8. The verified course summative grade report is archived as "committed" for audit purposes.

Discussion Modality

The Discussion Modality includes at least two specific types of assessments—(1) assessment of discussions which counts each element of discussions between curriculum participants, and (2) assessments of projects/documents which is a rubric-based evaluation of project or documents that stems from the exploration of educational concepts.

(1) Assessment of Discussions (Problem-Based Learning)

Still referring to FIGS. 1 and 2, the discussion modality 80 can electronically tag student discussions (e.g., text or multi-media) posts with microcompetencies 16 and RVUs 17 after the student (or other test-subject) encounter (block 84). In some embodiments, the discussion subject can be associated with a defined (pre-tagged) microcompetencies 16, but the RVU may be typically generated after the fact, based on student knowledge, responses and/or proficiency. The individual discussion elements (IDE) can be defined (block 81). For example, as discussed below in more detail in reference to FIG. 4, a discussion event input screen may be provided for identifying, providing and/or defining the individual discussion element. The IDEs can be grouped into summative discussions (block 82). Some embodiments provide that the discussion modality 80 can be an interactive electronic (e.g., online) environment forum that a student or other test subject can respond to a given problem, question or other prompt.

In complex educational environments, the ability to solve problems from practical discussion of cases or problems may be difficult to evaluate and track. Accreditation bodies may place a great deal of value on the ability to apply knowledge. Since the discussion itself can cross multiple topics and can involve different levels of complexity, the discussion events may be typically tagged for educational value separate from the event itself.

While embodiments disclosed herein contemplate that text based postings will be a viable means of providing a discussion forum, it is also contemplated that online multimedia communications may also be used for a discussion modality 80. Combinations of these types of discussion formats can also be used. Some embodiments provide that video streams of the multi-media video may be electronically stored with a summary of evaluation for cumulative analysis. Services related to online multimedia communications may be provided by a third-party online multimedia communications service provider, which may be, e.g., a consumer videoconferencing service provider such as Skype, Microsoft Live Messenger, Yahoo! Messenger, America Online Instant Messenger, and/or Apple iChat, among others.

In some embodiments, the discussion modality 80 can be carried out using and/or including a threaded discussion logged by student with time posting. The discussion posts can augment basic blog technology with a RSS (Really Simple Syndication) client. RSS allows for subscription, management and posting of content to secure blog systems. In this manner, the user may make postings to the blog without launching a browser. Current RSS clients are useful models for binary applications in order to give rise to properly engineered applications specifically engineered to meet the complex needs of case-based education.

However, computer applications for writing, managing, and participating in cases can be written that may be more suitable for larger schools/practitioner implementation. Using the case application suite, an implementation (on-boarding into a central system or use in discrete standalone systems) with multiple schools, practices, and programs can be facilitated.

Some embodiments of the invention seek to provide participating educators with an implementation strategy for case-based education that can actually be scaled to fulfill the educational mission to teach critical thinking and problem solving. From an educational philosophy standpoint, educators may disagree concerning the number of cases, the depth of cases, the role of the teacher, and the outcomes assessment of individual implementations. From a technology standpoint, the systems can be powerful enough to facilitate the educational mission while simple enough to encourage use.

For a discussion modality 80, it may be desired to include cases that provide fact patterns that are authentic, promote realism and yield intense learning experiences that the practitioners and/or educators can relate to students. Beyond recruiting "non-traditional" cases, the technology for writing the case components, attaching related content, and creating learning objectives may be consistent. Faculty resources may limit the time within the schools to reformat each practitioner case, and the alternative is to limit the number of practitioner submissions. For some disciplines (e.g., dental and medical), to adequately assess competency, it is believed that there should be hundreds, if not thousands, of discussion cases available to students. The preferred case writing application should provide simple processing tools for creating the components, for reediting components, and then should package the resultant case so the components cannot be altered.

Managing cases may be a different experience from writing. Each school can have a different role for cases. Each school can have different theories for student and faculty grouping. Each school can also have differing views for outcomes measurement. In some embodiments, the systems and methods disclosed herein can be configured to accept a case package from a case-writing tool and allow the course director to assign students and faculty, to determine posting times and resolution dates, and/or to design appropriate grading criteria, among others. As a practical matter, this application environment would adapt individual cases to meet larger curriculum goals. Participating in cases should be relatively simple. Once the management application assigns a case to a student or faculty, the participation tool for the discussion environment should: alert the user to the assignment; "push" the postings to the client through simple subscription; allow for direct posting; and monitor time components and grading issues.

It is believed that there will be many users of the participation tool, fewer users of a case writing tool, and very few users of the case management tool. Practitioners may propose or submit cases that other practitioners could take for CE credit. Students may write cases for other students. Issues that currently restrict school and program use of cases, such as number of cases, and number of faculty, could be reduced, if not eliminated.

In some embodiments, evaluating performance corresponding to the discussion modality 80 may include exemplary operations as provided in the following steps.

Step 1. A discussion group is created with one or more individuals. This group will all receive the same credit as each individual. The individuals participate in a collective. The cohort can be, and usually is divided into sub-cohorts to facilitate discussion. In the current implementation, the typical sub-cohort has 5-10 students. The discussion sub-cohort summative report can be generated (block 83). The individual discussion element 81 can be meta-tagged with metadata codes including microcompetencies 16 and RVUs 17 (block 84). For example, typically, at least the RVU is defined and tagged (subjective with guidelines) by a grader. The microcompetencies may also be applied at that time, but may also be generated earlier based on defined topics rather than "stream of thought" type discussion. The definition of outcomes cohort can be generated (block 85) as well as a post-element analysis summative report (block 86). The outcome elements for summative evaluations 88 can be submitted to the cumulative outcome storage data collection 100.

Step 2. A discussion may be initiated with a question or prompt. Within that thread, individuals may respond to the prompt and to the participation of others in the group. FIG. 32 illustrates a sample screenshot of a thread involving students responding to a discussion question.

Step 3. An individual discussion event may include a unique item identifier, a unique thread identifier, a time stamp of the posting (including date and time), a unique user identifier, and/or the body of the posting, among others.

Step 4. A discussion may be limited by time. Based on the time stamps of the discussions all of the IDEs within a proper reporting interval, a discussion sub-cohort summative report may be generated for assessment. The discussion sub-cohort summative report may be verified and sent for formatting by the discussion evaluation tool. This process may present the discussion for third party evaluation.

The discussion sub-cohort summative report may be submitted for "discussion grading" which will attach corresponding microcompetencies and RVUs to each post. An evaluator, grader, host, other prompt and/or other students can interact with the test student(s) to assess depth of knowledge, problem solving skills and the like. The RVU may be partially based on subjective criteria and partially based on objective criteria (e.g., keywords, length of text, discussion time, and the like). The system can accept a post-discussion summative report that attaches a summary of discussion grading of the discussion with the discussion text itself for future retrieval. The subjective weighting may be provided by the interactive person "discussion grading" the student/test taker, or groups of students, and is typically within a predefined range based on time increments of 15 minutes and difficulty. In some embodiments, a simple post may be worth at least 0.1 RVUs.

Brief reference is now made to FIG. 3, which is a screen shot 80s of a user interface in which a post is being graded. The screen shot 80s includes a table-format summary of: Post Author by name (or student identifier), a Type of input (e.g., Student Post Content, Student Post Logistics, Student Post Other, or if Faculty Advisor, Faculty Post Case, Faculty Guidance or Faculty Other), microcompetencies corresponding to each post content and logistics, etc. with associated RVUs and Comments. A Student summary window 80w may include a summary of numbers of posts and total RVUs for each student and overall for the IDE. An evaluator "submit" input may be used to submit the data to an evaluation circuit once the IDE is complete with RVUs and microcompetencies.

Brief reference is now made to FIG. 5, which is an example of a CSV file from a Yammer® discussion. The evaluation and tagging of discussion content can be facilitated by a dynamic survey. It is contemplated that a report (e.g., generated from Yammer®, for example) can be used to create a dynamic "survey" using a defined survey tool, for a faculty member or other defined person to grade the discussion events. As noted above, the report can provide a word count for the body of the post.

Reference is now made to FIG. 4, which illustrates a screen shot 80m of a user interface that may be used for the discussion modality 80 to allow an evaluator to electronically assign microcompetencies and associated RVUs for an IDE 81 (FIG. 1) for a student and posting type. A word count may be generated and displayed. For example, as illustrated the word count is 75/100. A progress to completion of topic (potentially with a time remaining reminder) input and a comment input section may be included. User inputs such as "Next" and/or "Submit" may be provided for the evaluator or other user to proceed to a next step or to submit the data. An "Overview" user input may provided for a user to toggle to an Overview screen. After all posts have been graded, a discussion sub-cohort normalized summative report may be generated. All of the microcompetency codes may be verified as valid, but there is no raw data to verify against.

The sub-cohort information may be very useful at this juncture. Each sub-cohort of the cohort provides multiple opportunities for RVU point assignment. Unlike the didactic environment, each sub-cohort has unique discussions and posts. The decision may be made by the outcomes specialist to give each individual their own grade based on their personal posts, and/or to give all sub-cohort participants credit for everyone's participation. This is a choice that may be made based on the discussion environment and the curriculum needs. At the end of all of the posts (text or multi-media), there can be a place for a "group grade" of pass/no pass. There can also be a place for an individual grade of pass/no pass beside the name of the student/user.

The verified discussion sub-cohort normalized summative report may be submitted to the cumulative analysis grid and verified that the student received the appropriate number of points to the appropriate competency. The verified discussion sub-cohort normalized summative report may then be archived as "committed" for audit purposes.

For each post, the grader can evaluate one more of the following:

(1) Posting Type: From a pull-down there are a number of possibilities, shown below as six possible choices:
"Faculty Post Case"
"Faculty Post Guidance"
"Faculty Post Other"
"Student Post Content"
"Student Post Logistics"
"Student Post Other"
"Student Post Trash"

(2) Microcompetency code(s): The input can include a plurality of fields, e.g., 3 fields, where microcompetencies associated with the post can be entered (a user must then elect the 3 closest microcompetencies, the system may provide a keyword search of the post and suggest microcompetencies that may be appropriate).

(3) Relative Value Units: This input is typically limited by a range of 0-10, such as, for example, a field limitation which may be implemented or selected by a user via a Pulldown with numbers, e.g., 1 to 5. The RVU assignment may be relevant for normalization. Discussion posts may be fraction points relative to a multiple-choice question.

(4) Comment: A field that assumes no comment, but where a message/paragraph can be entered.

In more detail, the discussion grading may include the following steps:

Exporting Discussion Data

Figure 33:
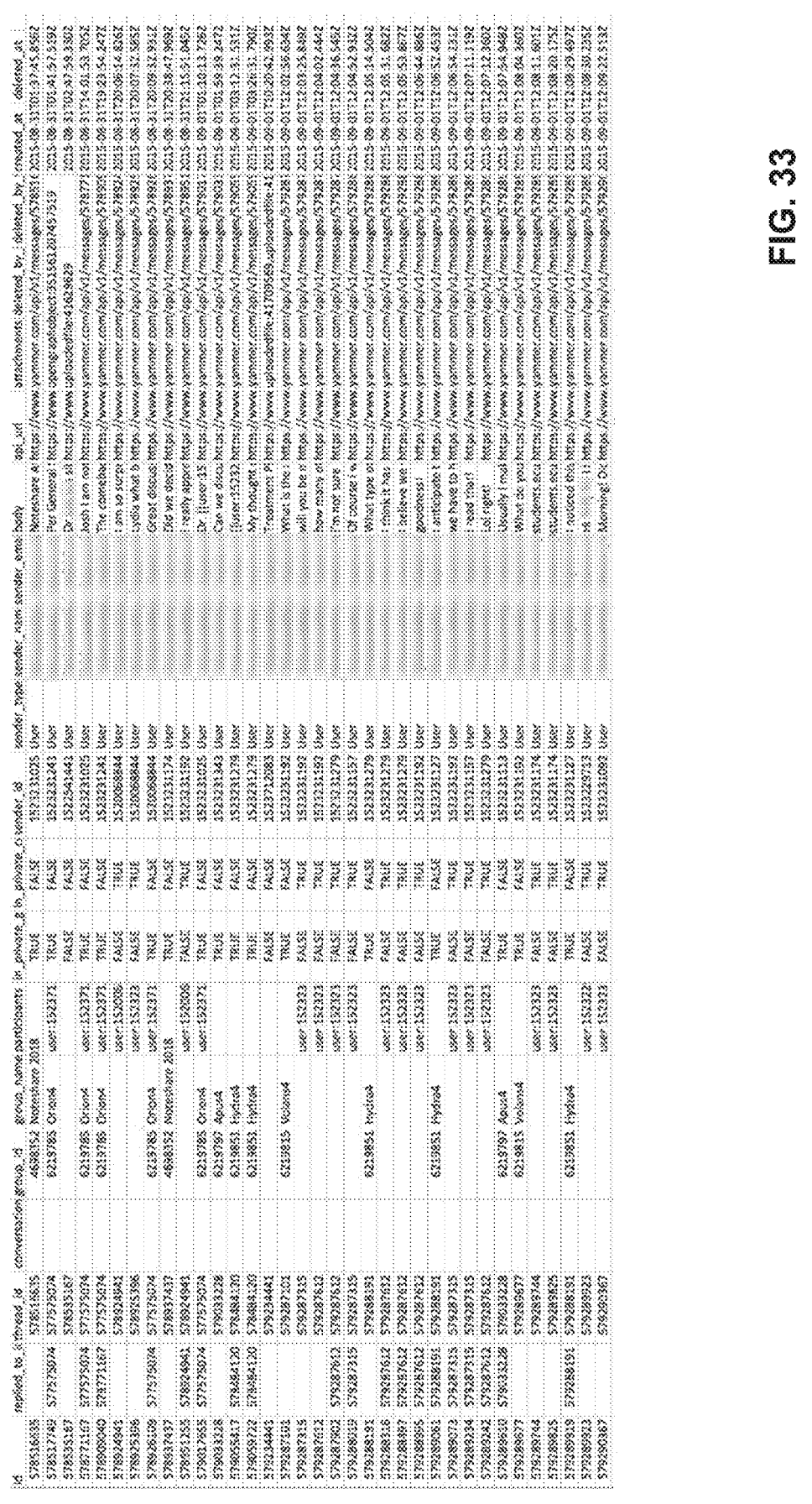

A comma-separated values (CSV) file may be exported with specific data for the thread, the post in the thread, the date and time of the post, the group, the student in the group, and the actual text of the post. FIG. 33 illustrates a sample data export indicating example discussion data that may be collected.

Parsing Discussion Data into Gradable Formats

A system may parse the exported data by group, thread and/or post. The groups and students may be de-identified to make the discussion grading fair and unbiased.

Screening

The screener is presented with the list of groups and students (de-identified) to begin the assessment process. FIG. 34 illustrates a user interface providing options for a screener to provide assessment for students in various discussion groups.

The screener assesses each post and assigns it to one of the post types (e.g., logistics, content, other, trash, etc.). In some embodiments, the assignment of a post to a post type may be determined automatically, e.g., through the use of key word and/or textual analysis. In some embodiments, the assignment of post type may be performed by a machine learning algorithm, such as, for example, a neural network. In some embodiments, only the content posts are assigned grades. In these embodiments, the other posts are counted for participation/leadership assessment. When all posts are screened, the grader is ready to assign codes and points. FIG. 35 illustrates a user interface providing a screener the ability to view posts and assign a post type.

Discussion Grading

Figure 36:
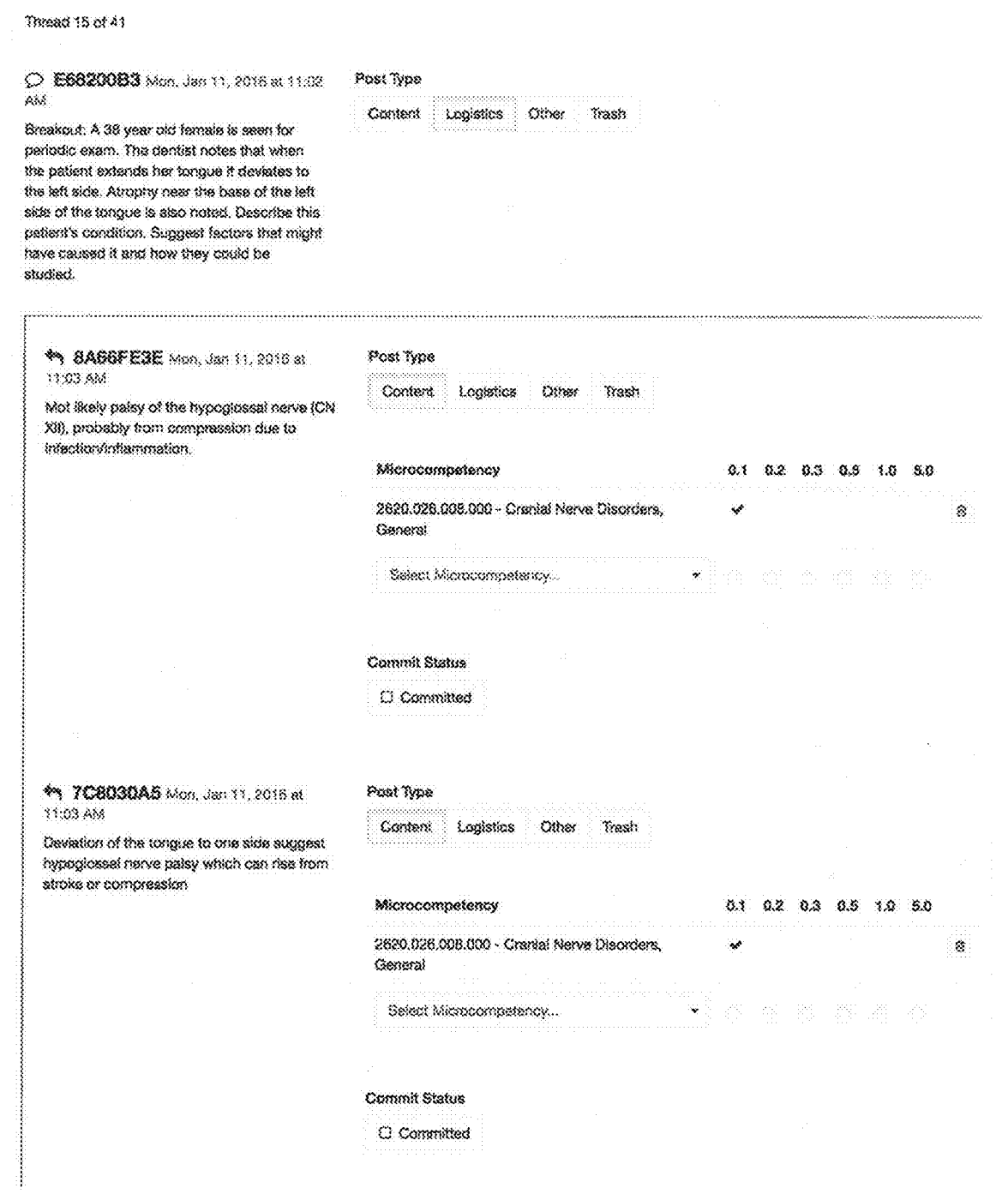

Following screening, the content posts are assigned (1) microcompetency codes to denote the topic that was discussed, and (2) relative value units (points) based on the complexity of the post. In some embodiments, one (1) RVU point may correspond to 15 minutes of discussion, so most posts are worth a fraction of one point. After all posts in all threads are graded, they are sent to the definitive grader for final commitment. FIGS. 36 and 37 illustrate user interfaces providing a screener the ability to assign grades to particular content posts.

Committing

Figure 38:
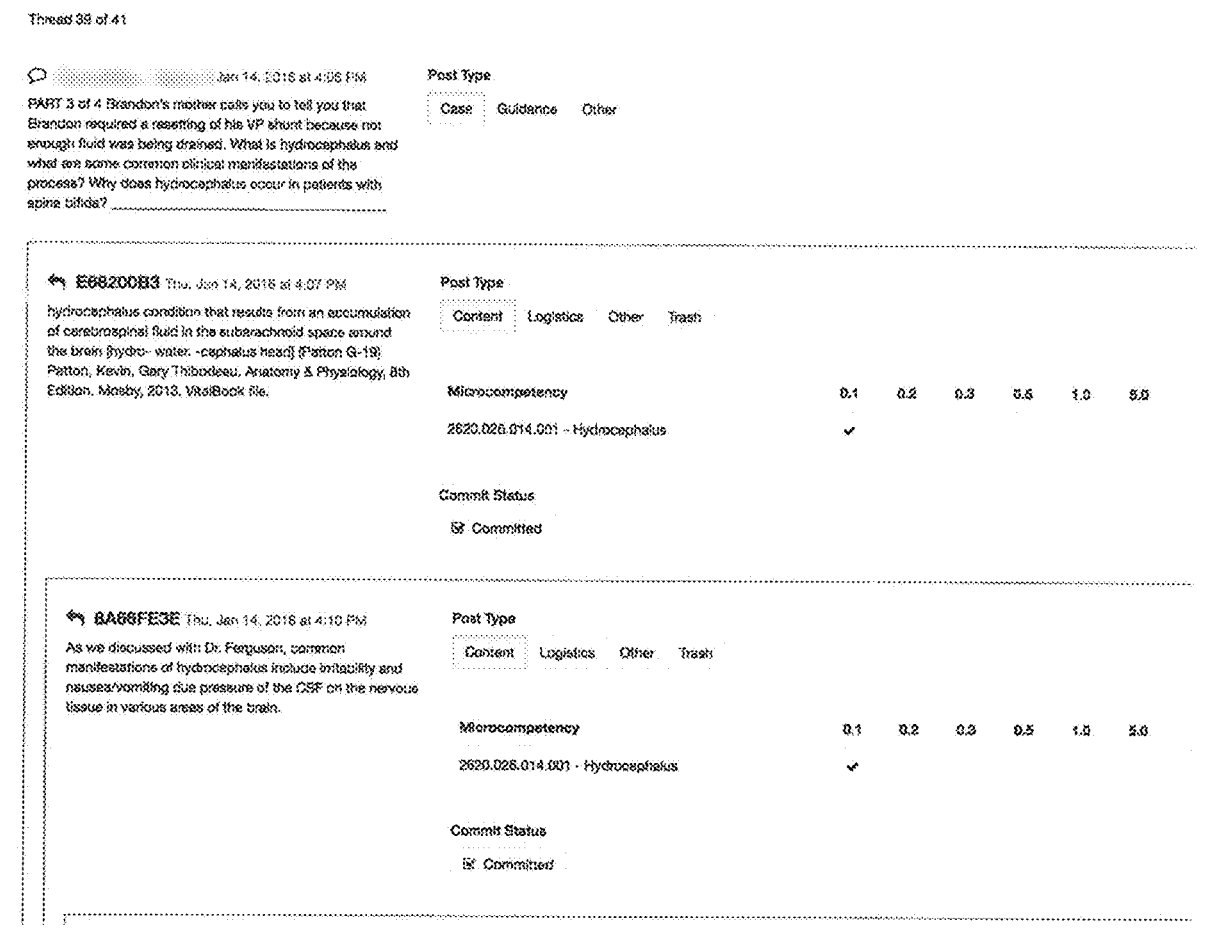

The final process involves going through all posts and verifying the previous screening and discussion grading. This allows for corrections. When all posts are committed, the data may be reported in two different ways—by competence and by participation. FIG. 38 illustrates a user interface providing the ability to commit submitted discussion grades.

Competency Assessment

When all posts are committed, the points may be reported for the weekly time frame of the discussions. Typical calculations of individual points may be calculated. FIG. 39 illustrates a user interface providing a generated report with assigned RVUs per student.

In some embodiments, a summary of the participation of all weeks of discussion may be calculated and the students may be ranked for cumulative points. FIG. 40 illustrates a generated report with individual student rankings across several weeks of reporting.

In some embodiments, the groups may be ranked for cumulative points and the individuals may be ranked within the groups. Note that rankings can be done by cumulative student points or by student average for each group. When the group size varies, the average points may be a better standard for ranking. FIG. 41 illustrates a generated report with group rankings, as well as rankings of individuals within groups.

Figure 42:
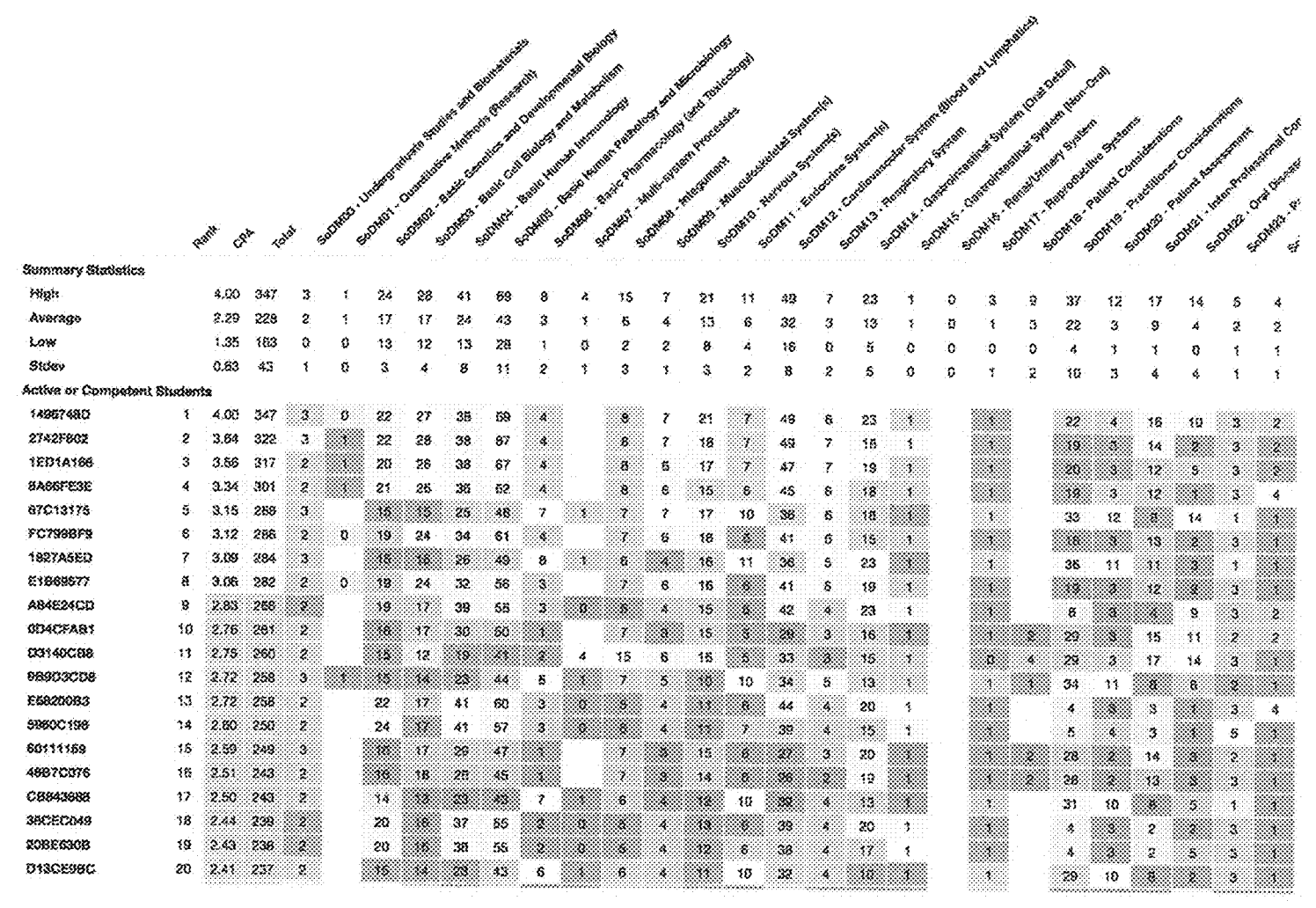

In some embodiments, the points per microcompetency may be mapped to the program competencies to show the specific topics and depths of discussions per competency. FIG. 42 illustrates a generated report with student ranks by competency based on the graded discussions. In some embodiments, color coding may be used to indicate performance levels for respective students. For example, a first color may be used to indicate RVU values that exceed the average, while a second color may be used to indicate RVU values that are less than the average. Using color-coding may allow for a quick review of the cohort to understand which students are performing well, and which students may need extra assistance, Participation/Leadership Assessment In some embodiments, the numbers of each type of post may be calculated for each student. FIG. 43 illustrates a generated report indicating the types of posts detected for each student, as well as the overall RVUs achieved.

The trash posts may be subtracted from the cumulative number of posts to yield a final "meaningful posts" count. FIG. 44 illustrates a generated report with adjustments to discount trash posts.

The total RVUs may be listed for comparison with the number of content posts for comparison. A multiplicative inverse of the RVUs divided by the number of content posts may be calculated to yield a content score. This content score may denote the impact that the student had on the amount of content generated by the group. Since all students within the group benefit from the participation of others in the group, this score gives a higher score to the students who contributed more to the success of the group. The program may set a percentage (0.0-1.0) or (0-100) weight that they want the content score to represent relative to leadership. FIG. 45 illustrates a generated report with example data for rankings of students assessed for discussion provided in online postings. In the example of FIG. 45, the content participation score 4510 was deemed to be worth 50% (0.50) (e.g., having a weight 4520 of 0.5) of the overall evaluation of leadership/participation represented by an adjusted content score 4530. The adjusted content score may be finalized by multiplying the raw content score by the weight.

Figure 46:
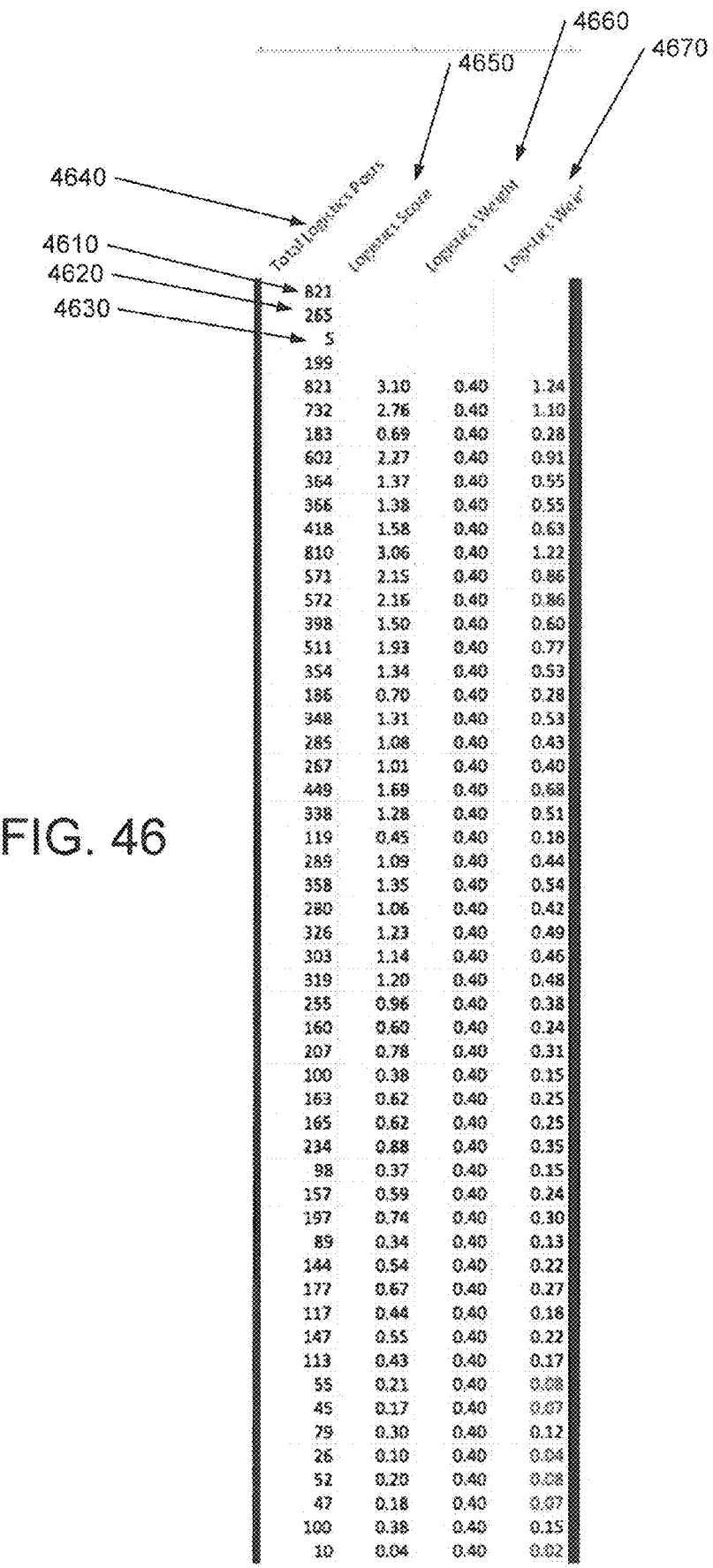
FIG. 46 is a screen shot of a graphical user interface that illustrates a generated report with example rankings for a particular category of posting (logistics) according to some embodiments of the present invention.

FIG. 46 illustrates a generated report with example rankings for a particular category of posting (logistics). Referring to FIG. 46, the total logistics posts 4640 may be listed for each student with the calculated high 4610, median 4620, and low 4630 for the group. The logistics score 4650 for each student may be generated by dividing number of logistics posts 4640 for each student by the student median 4620 (or high 4610 depending on program). The program may set the weight 4660 of logistics with a percentage similarly to content (40% is the example). A weighted score 4670 for the given category of postings may be generated by multiplying the raw logistics score 4650 by the weight 4660.

FIG. 47 illustrates a generated report with example rankings for a posting category of other posts. Referring again to FIG. 47, the total other posts 4740 may be listed for each student with the calculated high 4710, median 4720, and low 4730. The other post score 4750 may be generated by dividing the total number of other posts 4740 for each student by the student median 4720 (or high 4710 depending on program). The program may set the weight 4760 of other with a percentage similarly as for content (40% in the example of FIG. 47). A weighted other content score 4770 may be generated by multiplying the raw other score 4750 by the weight 4760.

Weighted content, logistics, and other scores may be summed to generate an adjusted participation Score. The students may be ranked from highest to lowest number. Additional calculations can be performed to grant RVUs to students for leadership based on the calculation of student performance by cohort high performance and multiplying by a predetermined number of points. FIG. 48 illustrates a generated report with student rankings based on a calculated adjusted participation score.

When finished, a verifiable electronic file may be created that summarizes a report for the group and then appends the student file with the latest results. All students get credit for all RVUs for all microcompetencies if they "pass." There can be a separate submission process where the grader submits the report to a student analysis grid and/or a class analysis grid.

(2) Assessment of Projects/Documents

Assessments of projects are an extension of the discussion modality. For papers and projects, the students explore educational concepts and adapt their group or individual understanding into a product or document that can be evaluated with a rubric.

These assessments may involve the indirect observation of student(s) final product. For assessment of projects/documents the student may be judged based on the quality of the document. In some embodiments, it may be possible for groups of students to be evaluated as a team using this assessment technique.

Step 1: Determine a rubric. For assessment of projects/documents, the rubric is the TE. However, the student may not encounter the TE directly. Instead, the student may perform the task and be directly evaluated by the grader, or graders, using the TE. Note that the student may use the same rubric to self-assess before being evaluated by the grader. Rubrics are essentially complex survey instruments. In some embodiments, the self-assessment of the student may be used to adjust the grader evaluation depending on whether the self-assessment is concordant or discordant with the grader's evaluation. For example, if the self-assessment is discordant from and/or differs from the final evaluation by more than a predetermined threshold, the grader evaluation may be adjusted (e.g., downwards). This may cause a respective student to be more readily introspective and/or aware of his/her actual ability/performance and can provide valuable life "feedback" as a reality check on future independent work. Thus, the self-assessment may help emphasize the ability to accurately assess one's own performance.

The assessment of projects/documents may follow an evaluation format similar to the qualitative skills assessment discussed herein. For assessment of projects/documents there may be universal components of a rubric. The rubric "step" defines one aspect of performance that is to be evaluated by a grader. Under a step are the "strata" which define the quality of performance. A minimum of two strata are required under each step. The first is a failure (or critical failure) stratum which denotes that the student did not perform the task to an acceptable level of quality. The second is a passing stratum which denotes a minimum of a basic level of acceptable quality. In most rubrics, there are several levels of passing strata—such as excellent/ideal, good/very good, acceptable, etc. Note that complex rubrics may include groups of steps, called blocks.

Step 2. Each rubric step may be tagged with a microcompetency code (MC). The rubric can have multiple steps and multiple MC.

Step 3: Each rubric strata may be tagged with a RVU based on the level of acceptability and the relative value of each step. The assigned RVU may be relevant for normalization. Just like qualitative skills assessments, the relative value of these assessments may depend on the importance to competence.

Step 4. Question elements may be sequenced into testing events (TE). Each TE may be associated with a summative analysis code. In most cases this is related to a course. A TE may include QEs that are associated with a MC and a RVU. Unlike didactic exams, rubrics have different rules that are possible for standards of pass and fail. In project assessments, failure strata on any step may mean that the student fails the entire assessment because the student is considered to have not met competence. For other rubrics, failure on a single step can mean a lower score. Also, unlike didactic exams, groups of students could be evaluated for team competence. Rules about assigning points to individuals in the group or all participants in the group must be decided before the assessment is given.

Rubric-based assessments may include multiple graders for evaluation of performance. There are many different mechanisms for determining how those different graders are used in the calculation of the final grade for each rubric step.

Step 5. A course summative grade report may be generated to sum the clinical production of the individual relative to the others in the cohort. This is to give the individual the sum of production, the class average, the class rank for a particular course.

Cumulative Outcomes Storage

In some embodiments, the system 10 can be configured so that common naming and coding of students is used in all modalities and/or environments and/or that appropriate translators are used to import and/or exchange data between the various systems and/or the cumulative analysis engine.

Where all three environments are used (modalities 20, 40, 80), all verified normalized summative reports (with outcome elements) from all modalities 28, 48, 88 can be submitted to at least one data repository 90 (e.g., archived student education history server). Typically, the reports (e.g., outcome elements) may be provided as they are generated or completed, but may also be provided on a time-based input (upload or other data transfer).

Each of the outcome elements that is stored in the common data repository may include the following fields:

Unique Element ID
Unique Program ID
Unique Student ID
Date
Didactic, Clinical, Discussion
Primary, Remediation
Microcompetency
RVU The fields do not have to be in a specific order, provided that the source file can map to these elemental fields.

Analysis Grids

Figure 6:
FIG. 6 is a partial screen shot of an exemplary interactive (color-coded) evaluation grid according to some embodiments of the present invention.

A cumulative analysis module 100 (FIGS. 1, 2) can be configured to analyze data from one, two or all the environments corresponding to modalities 20, 40, 80 for a respective student over time or at a particular desired time. Thus, as shown in FIG. 6, the systems/methods can generate a cumulative evaluation grid 200 also known as a cumulative analysis or competencies grid. The cumulative analysis module 100 can be housed in one server or host or may be distributed. Additionally, the cumulative analysis module 100 and/or the data repository 90 may be provided using distributed computing resources, such as, for example, cloud-based data storage and/or processing.

Data cross-section is a basic expression of difficult data. The data from educational outcomes may be specifically difficult to express. Advantages from methods and systems disclosed herein may be realized based on the concept of competence itself. A "competency" or "competency statement" is a synthetic aggregation of related skills or topics.

Competencies are extensible by definition. Any program defines these extensible concepts based on their own concepts and approaches. The grid 200 is the expression of the data from all of the sources in methods that show individual student data relative to all students in the cohort and relative to the relevant topics that represent competence for the cohort.

Education may be difficult and complex. Every student enters a new educational experience with previous knowledge and different abilities. Every program within a discipline tries to provide experiences that are engineered to train a student to become capable of being a member of a specific workforce. That could be a chemist, an author, a dentist, an engineer, or any of another myriad specialties.

Educational programs present the students with a series of experiences, called curriculum, and evaluate performance with many different metrics. Systems and methods disclosed herein create a way to "normalize" the various outputs of curriculum evaluation to simplify the visual presentation of this data.

In the previous discussion, the systems/methods for the creation of the grid data expression is addressed. In this section, the data is manipulated to better graphically represent the results for educational decision-making.

At the cross-section of the student and the competency is the "grid cell". Each grid cell 201 is unique to that grid and that cohort. Depending on the data allowed, the grid cell 201 calculates that students' performance for the respective microcompetencies defined for that competency. The sum of all of the points and partial points are represented in one number that may be expressed to, for example, the tenths decimal place. Two separate events may be calculated based on the individual grid cell 201. First, the total student performance may be calculated for each student in the cohort. Second, the student data for a specific competency may be analyzed for various rankings. The details for each grid cell 201 can be attained currently with a combination of specific keys.

A grid cell 201 that detects no data for display may be represented with 0 and with specifically colored background to denote a lack of data. For example, some embodiments provide that a grey background may denote a lack of data. Showing no data within a grid cell 201 is not unusual in the early parts of a curriculum, however a hole in the latter stages of training may show a curricular deficiency.

In some embodiments, the sum of all grid cells 201 may be summed in a number to a defined degree of accuracy, e.g., as shown to the tenths decimal place in a separate column. The rows may be auto-sorted from greatest number to lowest number with a result of ranking the students within the cohort. With the addition of new content the rows may auto-sort and result in new rankings.

The grid cells 201 may then be evaluated vertically for each competency. Some embodiments provide that the data from all of the grid cells 201 may be mathematically sorted into three to seven standard deviations. Some embodiments provide that the data is sorted into five standard deviations. The highest standard deviation values may be represented with a gold background to the related grid cell 201. The lowest standard deviation may be represented with a red background to the related grid cell 201. The second, third and forth standard deviations may be represented by shades of green, for example, from lightest to darkest, respectively. The result is a graphic display that allows the administrator to see how students rank based on the specific topics within a grid 200. Additionally, the areas of specific weakness for a student "lights up" in red and areas of specific strength are shown in gold. This allows the program to target remediation of specific weakness and recognition of specific strengths. The colors disclosed herein are by way on non-limiting example in that other colors may be used within the scope and spirit of the present invention.

Two additional features can alter the standard deviation color-coding. These may be referred to as a "hard floor" and a "glass ceiling". The administrator can place number values in the grid 200 to represent a minimal value that is required to be competent. This "hard floor" will set a value below which the number will be represented as red, regardless of the standard deviations. This may serve to set minimal standards for numbers of procedures that must be accomplished. The glass ceiling manual designation is a number above which all grid cells 201 will be designated as gold. This "glass ceiling" allows the administrator to determine a threshold that represents excellence, regardless of the standard deviations. In this manner, students can go above this number and the entire cohort can gain this level of excellence.

In some embodiments, the high (gold) cutoff and low (red) cutoff may default to the standard deviations unless specifically entered by the administrator. The grid 200 may automatically calculate a Student High, a Student Low and an Average for each Microcompetency column.

The grid 200 can be of a single topic with multiple associated microcompetencies or based on other topics or classifiers of interest. Each cell 201 of the grid represents an intersection of the student and their performance (RVUs) filtered by the specifically included microcompetencies and by the included environments. No value can be represented in a grid cell 201 as equal to zero RVUs or can be left blank. For statistical purposes a blank value may be equal to zero RVUs. Some embodiments provide that the rows of cells may represent respective students in the cohort and the columns of cells may represent the respective microcompetencies, however, such arrangement is non-limiting.

The grid 200 may change with the frequency that inputs are provided. For example, some embodiments provide that the grid 200 may automatically update daily if inputs are provided daily. For example, daily reports from experiential environments will provide points associated with microcompetencies that will accumulate over time to the grid. The same microcompetencies can show up in multiple areas. Similarly, for didactic inputs, exam reports may provide normalized points from the didactic exams and can be provided for cumulative analysis. For both the didactic and experiential inputs, some embodiments provide that an AXIUM® project management software may be used, Axium XTS, Inc. Oregon, USA. It is believed that AXIUM® has an extensible metatag called "category" that can be adapted for the microcompetency code to avoid the use of a translator, which may reduce potential implementation errors.

The grid 200 can be interactive as noted above. The grid 200 can presented on a display with a UI (User Interface) such as a GUI (Graphic User Interface) that allows a user to select a student to reveal more data associated with the student, to select microcompetencies to electronically automatically reveal various sub-topics and associated scores. In this manner, a user can analyze trends with the student data, e.g., search for common factors for students failing, for students in honors ranges and the like. Thus, for example, if a number of more students that are identified as failing are in the same class, perhaps that is an indication that there is a problem with the class.

The interactive grid 200 can be configured to allow users to click and drag the table to navigate and ctrl-click, select and/or touch (contact or touch gesture) a cell 201 for cell-specific information. For example, student ID numbers and competency score cells can be be clicked to show data points used to create the selected cell's content.

A user can drill down to show groups of students for different criterion, i.e. year in program, gender, and the like. The grid 200 can include cell information pop-up comments and the information accessible and/or shown when a user select (e.g., ctrl-clicks) a cell can be defined by the type of user accessing the grid.

The cumulative data in the evaluation may identify other common factors to allow for pro-active adjustments in the curriculum, educational resources and/or for the student.

In some embodiments of the grid 200, the didactic environment summative grading inputs may have a much smaller weighting of relevance in the cumulative evaluation than either of the experiential or discussion environment grading inputs. For example, about 10% of an overall cognitive assessment score for a particular microcompetencies can be based on didactic summative grading, compared to about 40-60% for experiential and 30-50% for discussion summative grading.

The grid 200 allows extensible definition of "competencies" as subsets of microcompetencies. As data accumulates to the data repository, the grid can dynamically calculate performance from all three environments. As noted above, minimal thresholds and performance rewards can be tagged.

As briefly discussed above, the elements of mapping using common topic logic, called microcompetencies, may provide a hierarchical numbering label for topics. In some embodiments, there are 4 levels of this hierarchy separated by legal numbering periods. Examples are as follows:

02—Designates Body System
02.08—Designates Gastrointestinal System
02.08.07—Designates Clinical Dentistry
02.08.07.13—Designates Resin Restorations
01—Designates Pan-systemic Disciplines
01.06—Designates Human Immunology
01.06.08—Designates Immunizations
01.06.08.01—Designates Vaccines Some embodiments provide that not all topics have 4-level detail. For example, some outcomes may adequately test the 3rd level as a group. In the numbering scheme, a 00 may be added in the fourth level of the code.

Different educators within a curricular program may have different student evaluation needs, therefore different views of the total body of outcomes are needed. A "competency grid" may define related topics for simultaneous viewing. For instance, there may be a need to see how the students perform in human anatomy. A grid can be created to represent all of the anatomic microcompetencies. The data may be parsed by anatomy by system. In this example, anatomy is the basis of the grid, each system represents an extensible competency, and the microcompetencies for the anatomy of that system defines the student performance that will be represented in the grid cell 201 of the grid 200.

For the purpose of the grid 200, the definition of each competency may be a simple list of the codes that the administrator considers to define what needs to be displayed. An example for the anatomy of the cardiovascular system follows:

CVAS—Normal Development and Structures
02.06.01.00
02.06.01.01
02.06.01.02
02.06.01.03
02.06.02.00
02.06.02.01
02.06.02.02
02.06.02.03
02.06.02.04
02.06.03.00
02.06.03.01
02.06.03.02
02.06.03.03
02.06.03.04
02.06.03.05
02.06.03.06
02.06.03.07
02.06.03.08
02.06.03.09
02.06.03.10
02.06.03.11
02.06.03.12
02.06.03.13
02.06.03.14
02.06.03.15

Once the codes are defined, the second factor that filters the expression within a grid cell 201 is the data source. As described previously, there is data from the discussion environment, didactic environment and the clinical environment. Any grid 200 can display the data in a grid cell 201 from the designated microcompetencies from any one or combination of data sources. A grid can be made to show all data or just the data from didactic exams.

In practice, some students are better on exams than they are in clinic. This will show in the expression of filtered grids 200. As described above, different administrators and educational stakeholders may need different reports from the curriculum. The creation of specific grids allows these customized views.

Similar to data source filtering is the inclusion of remediation elements. Each data source element may also be designated as primary or remediation. Primary data may represent outcome elements that every student experiences. Remediation data may represent outcome elements that are targeted to re-test certain students for specific deficiencies. In this manner, the administrator may create grids that only use primary for an evaluation of the entire cohort. This allows specific grids to be made to show additional work that is given to certain students. This provides that the grids that would allow for the expression of remediation can include "hard floor" designations in the grid to show when a student has achieved a defined level of competence.

Certain grids are made to give a very broad analysis of the complete curriculum. In practice, this can result in a multiplication error. For example, if the administrator is not careful, the same microcompetency can be represented in multiple competencies in the same grid. The best practical example is a grid that has both systems and disciplines represented. If the same microcompetency is in multiple competencies, and that microcompetency has several outcomes, there will be a multiplication effect error that incorrectly affects the student rankings. The achievement or deficiency in a specific microcompetency will be compounded relative to single microcompetencies. In some embodiments, that may be desired, but the skewing of the data expression may be anticipated.

Brief reference is made to FIGS. 7A and 7B, which illustrate two hierarchical competency lists (that can be used for a competency grid) with an exemplary list of associated microcompetency codes. The 00.01 et seq. list is for "Quantitative Methods" while the 00.02 et seq. list is for "Basic Genetics and Embryogenesis". In this manner, an extensible mechanism for evaluating the quality of a curriculum that is responsible for defining competency may be provided. Additionally, all three types of educational techniques can be evaluated concurrently. The normalization processes allow every adopter to customize their analysis, as desired. Further, each institution may customize the evaluation tool e.g., instead of 15 minute time normalization, shorter or longer standards may be used, e.g., 5 minutes or 30 minutes. Each institution may then generate different microcompetencies that may be further normalized when comparing between institutions.

Figure 8:
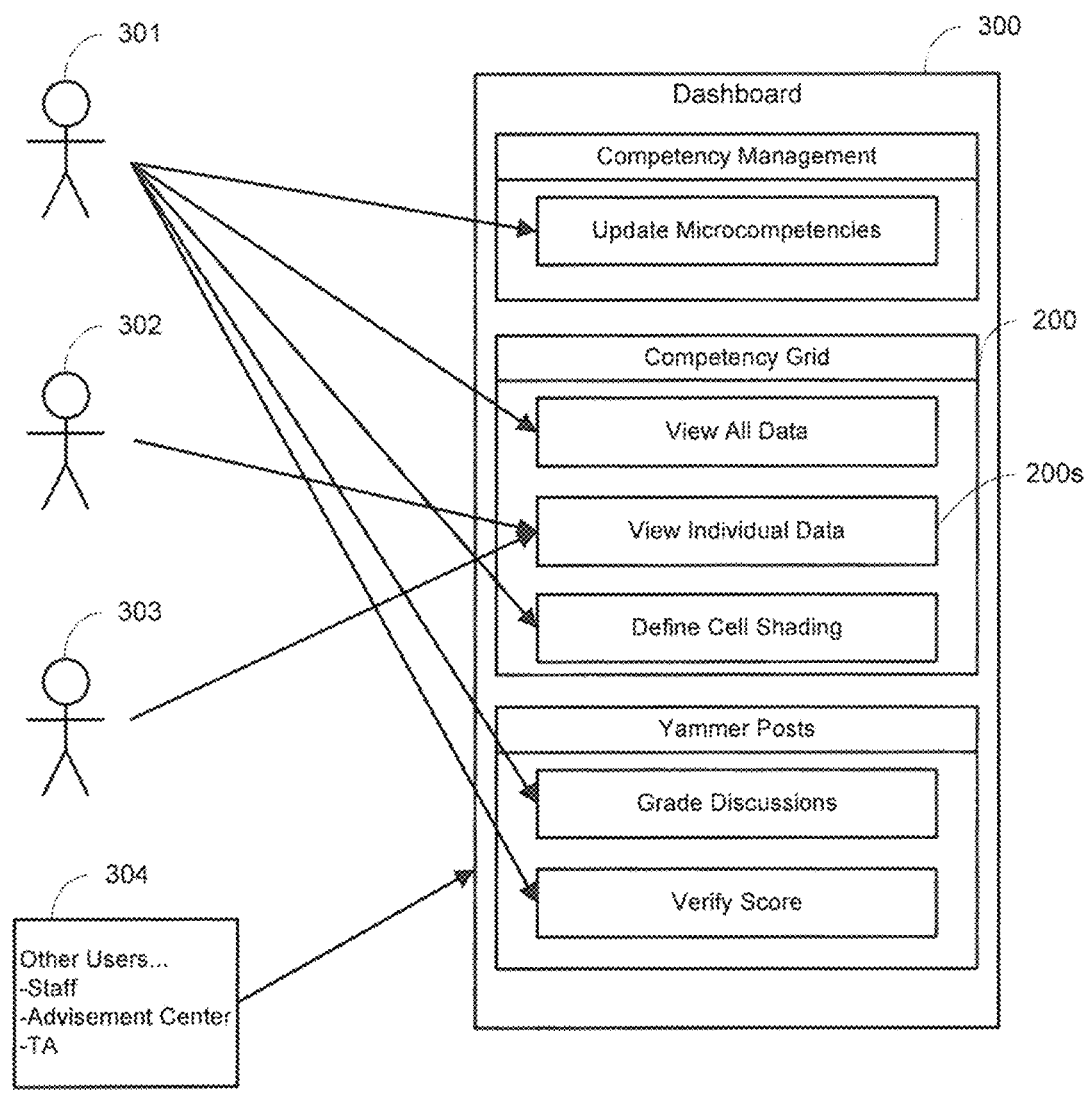
FIG. 8 is a schematic illustration of a dashboard with restricted views based on user profiles/types according to embodiments of the present invention.

Brief reference is now made to FIG. 8, which is a schematic illustration of a dashboard 300 that restricts the type of data that can shown to different users. Some embodiments of the system 10 can restrict information/functionality based on who logs into the dashboard 300. Initially, the users may be characterized as one of three types of users that will be accessing the dashboard. The dashboard (or portal) can define more specific access rights as additional dashboard elements are created (Yammer® discussion grading and microcompetency management). Examples of user types according to some embodiments include:

User: (teacher, professor 301)
   access all information and functionality
Educational (University) Admin 302
   Can only view competency grid (no access to microcompetency management or yammer areas).
   FERPA: to comply with FERPA the Student ID column can be omitted as needed.
Student 303
   Can only view their scores in the competency grid 200. The competency grid 200 may be customized to show only the student data, but the grid 200 may also show student high and class averages.

Other users 304 may include teachings assistants, staff, advisors, publishers of educational resources (identify materials that provide better student outcomes or those that need improvement), teacher evaluation functions (for awards or correctional help), accreditation services, and/or licensing boards, among others. Again, as needed to comply with privacy rights, employment laws and the like, the type of data presented to different users can be controlled.

Types of Assessments Towards Competency

Some embodiments disclosed herein may be particularly suitable for evaluating health-science students, schools, classes, education materials (e.g., books) and/or curriculums. However, other embodiments can be used to evaluate other students, schools, curriculums, teachers, classes, resource books and the like. The term "health-science" refers to medical-related educational fields, including nursing, dental, pharmacy, medical doctors, veterinarians, psychiatrists, psychologists, physical therapists, other therapists and practitioners, particularly those health/science fields where board certification may be required for practice in a particular field.

Many educational programs may require proof of knowledge, skills, and inter-disciplinary problem solving. Some embodiments provide systems and processes for a continuous (over time) and, optionally, substantially simultaneous analysis of performance from didactically-focused, skill-based, and problem-based environments. Educational outcomes can be forecasted and cognitive success identified in a pro-active manner.

Research and implementation of the present invention has uncovered an unexpected result that differences exist in the use and performance of the assessment types within the didactic, experiential, and discussion environments. For example, students perform very differently between basic multiple choice and essay questions in the didactic environment. Similarly, there are students who perform well qualitatively in skills with few quantitative experiences. Conversely, there are some students who perform many quantitative procedures, but perform the tasks poorly. Therefore the program is faced with juggling the different types of assessments to prove "competence."

This leads to the prediction of success for capstone performance. What has been found is that programs may benefit from the use of the proper assessment type when testing within the program to best predict capstone performance. For many years, medicine and dentistry have given multiple choice questions to grant practicing credentials. That means that the program may use basic multiple choice to predict performance on this licensure capstone assessment. Often, students who perform well on program basic didactic exams have a higher probability of passing the capstone assessment that is given in the same assessment type. This is also true for predicting applicant success. If a student who applies to a program performs well on basic assessments—like multiple choice—they will perform well in the program and they will probably perform well on the capstone licensure exam. The alignment of the assessment type to the definition of "competence" may therefore be useful.

In recent years, certain programs have determined that basic didactic assessments, while testing simple knowledge retention, are poor predictors of "competence." These programs have now shifted to applied didactic assessments that require synthesis of knowledge to solve problems. Similarly, there are programs which rely exclusively on quantity of experiences or quality of experience to define "competence" in skills-based programs. Often, it may be useful to track both. It is not surprising that experiential assessment performance is not predictive of didactic performance, or vise versa.

However, experiential assessments and/or applied didactic assessments may be difficult to quantify in a standardized way. The systems, methods, and computer program products described herein provide a normalized method in which experiential and applied didactic assessment may be compared in a way that allows both didactic and other experiential type of assessments to be commonly compared. The invention described herein provides multiple technical improvements over conventional assessment systems. For example, the systems, methods, and computer program products described herein provide a deterministic process that is repeatable, statistically valid, and not subject to subjective comparison between qualitative and quantitative assessments. Assessments made with the systems described herein provide an objectively normalized combination of qualitative and quantitative data and are capable of being statistically validated by the underlying data. In addition, the embodiments described herein provide an automatic way to combine results from multiple different types of testing encounters that may greatly save on resources. The embodiments described herein may be performed automatically based on existing data, and may perform operations using thousands, and potentially millions, of calculations automatically without requiring human intervention. Such a large raw number of inputs and operations is thought to be unmanageable if performed by a person. The use of the embodiments herein thus provide for a more efficient system capable of greater accuracy, efficient processing, and repeatable and statistically valid results.

Referring to FIG. 2, the system 10 can include an electronic competencies assessment platform 100$p$. The term "competencies assessment platform" refers to a module, circuit, and/or processor that can accept data from and/or integrate a combination of different systems and defined variables for analysis of cognitive outcomes in competency-based education environments related to a defined set or sets of microcompetencies related to one or more competency areas. The competencies assessment platform 100$p$ may creates an ongoing substantially constant (e.g., updated over time, but not necessarily real time) cumulative analysis of competencies as defined by formative and summative evaluation components.

Cummulative Data

Some embodiments disclosed herein contemplate that substantially all outcomes from all platforms build toward competency. Thus, all formative reports can be aggregated into a common analysis if all events use the same criteria. For example, each individual can be given credit for a certain number of points per microcompetency per event. If the cognitive outcomes for a competency can be represented as an aggregation of microcompetencies, then an infinite number of cumulative analyses can be generated from the same data set. Examples of some steps that can be used for cumulative analysis steps are summarized below:

Step 1. The cumulative data storage is defined as one or more data repository for every outcome event for an individual. Regardless of the source platform (didactic, clinical, or discussion), the individual may be given credit for points associated for each microcompetency. Thousands of these events may accumulate over time, platform, and assessment.

Step 2. Cumulative analysis mapping as disclosed herein may provide an institution with the ability to define how the raw data will be aggregated for display and analysis. A competency is a statement of the subset of content that an institution uses to evaluate performance. The mapping allows the institution to define a competency in terms of different combinations of microcompetencies. Some embodiments provide that there can be multiple maps of differing detail. Each competency may aggregate an individual's performance by combining the performance of each microcompetency. The assumed cross-reference is a set of individuals that make up a cohort. The mapping allows the institution to determine what individuals make up a cohort.

The present invention established the granularity of the microcompetency code (MC) so they could be mixed and matched to define program competencies. What this means is that there can be complex competencies that may include hundreds of microcompetency codes as well as detailed competencies with a single MC. FIG. 30 illustrates a sample listing of microcompetency codes associated with a defined program competency. As a result of the present invention, there can be multiple grids that track all of the competencies for a complete program, and simultaneously multiple detailed grids that show sub-components of the program. FIG. 31 illustrates a sample listing of competencies that may be associated with a particular program. In some embodiments, the same microcompetency code may not be used in more than one competency in the same grid. In these embodiments, the duplicate usage of the same data may skew reports.

Summary Report

As the individual students encounter the program, their summary data accrues. For each competency, a student high, student low, and student average (with standard deviation) may be calculated for each competency and for the summed total for all competencies. When an entire cohort finishes the program, this data becomes archival for the evaluation of the program itself.

Date of Competence Report

As has been mentioned before, different programs use different assessment types to evaluate student performance of competence. In some programs, individual summative assessments are designated as "for competence." These special assessments are required to be tracked for the "date of completion" in addition to the RVUs generated from their completion. Programs who are required by accreditation to report dates of competence, are also required to generate a report that summarizes the completion date of all "for competence" assessments, telling the accreditation organization which student passed all of these assessments by which date. It is also useful, as part of program assessment, to look at cohort behavior on these special assessments. The report may indicate why certain students take longer to complete some assessments versus others.

Faculty Participation Reports

For each TE, the faculty member/grader who either provided the question or graded the assessment is noted. This allows the program to see which faculty members perform the most student assessments and which types of assessments that each faculty member participates in.

Step 3. Additional cross-cohort data can be assessed and placed in the same grid. For example, maximum performance, minimum performance, cohort averages, minimal achievable levels, and other items of interest may be assessed and placed in the grid.

Cross-cohort reports may be created to show summary data from graduating cohort to graduating cohort in order to see differences as curriculum changes within a program. Comparisons can be made by looking at curriculum mapping data simultaneously with assessment summaries. Accreditation organizations may study the performance of the program from this data. Generally, accreditation follows programs for multiple years—(e.g., seven years). It may be useful to note that "curriculum" is the course of study for one cohort of students during a pre-determined time period. Therefore, curriculum changes from academic year to academic year. Courses change and faculty/teachers change. In some programs, the assessments used to define competence change, and there are different percentages of each assessment type that change. These changes are all intended to make the program better. However, data such as that generated by the embodiments described herein may assist in making the changes available for comparison.

Cross-cohort reports can also include the tracking of faculty assessment participation across cohorts. As faculty members come into a program and leave a program, different faculty members slightly change the assessments. This can occur by intent or by different faculty members' comfort with different assessment types. These subtle changes can make substantive changes to the program over time. Accreditation reports are supposed to track how faculty members assess competence over time and across cohorts, and these subtle changes can be used to better understand program success or needs for improvement.

Step 4. Desired data to be shown in a display grid 200 or grids can be defined.

Some embodiments of the invention may use a computing architecture in which the user interface, the application processing logic, and/or the underlying database(s) can be encapsulated in logically-separate processes. In any given application utilizing this type of computing architecture, the number of tiers may vary depending on the requirements of the particular application; thus, such applications are generally described as employing an n-tier architecture. See, e.g., Exforsys.com, N-Tier Client-Server Architecture. For instance, some embodiments of the invention may employ a 2-tier architecture, commonly referred to as a client-server architecture, wherein a client application such as a web browser makes a request from a web server, which processes the request and returns the desired response (in this case, web pages). Other embodiments of the invention may be structured as a peer to peer or a 3-tier or other larger multi-tier architecture. For the latter, the web server provides the user interface by generating web pages requested by a web browser, which receives and displays code in a recognized language such as dynamic HTML (Hypertext Markup Language); middleware executing on an application server handles the business logic; and database servers manage data functions. Often, the business logic tier may be refined into further separate tiers to enhance manageability, scalability, and/or security.

Accordingly, in some web-based hearings services, the web applications can use a 3-tier architecture with a presentation tier, a business logic tier, and a student record data tier. The web application tiers may be implemented on a single application server, or may be distributed over a plurality of application servers. For example, the presentation tier can provide the discussion modality 80 using web pages that allow a user to request student responses and allow communication between the student and an educator (e.g., teacher or professor). The presentation tier may communicate with other tiers in the application such as the business logic tier and/or student record data tier by accessing available components or web services provided by one or more of the other application tiers or by third party service providers. The presentation tier may communicate with another tier to allow authorized users to access student record data and/or database stored microcompetency codes, procedures, instructions, or protocols. The business logic tier can coordinate the application's functionality by processing commands, restricting user access and evaluating data. The functionality of the business logic tier may be made accessible to other application tiers by, for example, the use of web services. The business logic tier may also provide the logic, instructions or security that can separate and distinguish users. While the student data record tier can hold the private student records data and encapsulate such records from unapproved parties so as to comply with FERPA or other privacy regulations. The student records data tier can make data available through, for example, stored procedures, logic, instructions and the like accessible, for example, by web services.

Figure 9:
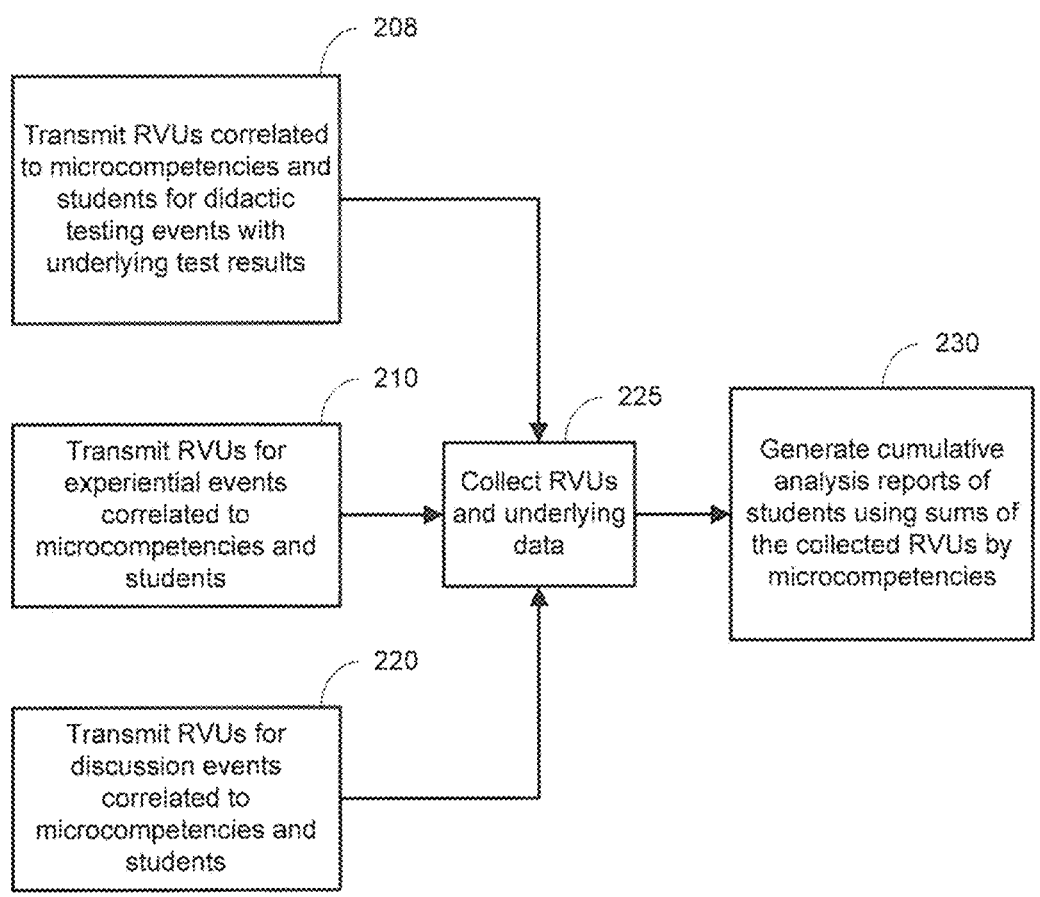
FIG. 9 is a flow chart of exemplary operations that can be performed according to some embodiments of the present invention.

FIG. 9 is an example of method steps that can be carried out according to embodiments of the present invention to evaluate students cognitive progression in a competency-based manner. As shown, RVUs for didactic testing events, correlated to student and microcompetencies, are transmitted to and collected by a student data record repository (e.g., database with memory such as one or more servers) (blocks 208, 225). Similarly, RVUs for experiential events, correlated to students and microcompetencies are transmitted to and collected by a student data record repository (blocks 210, 225). RVUs for discussion events, correlated to students and microcompetencies are transmitted to and collected by a student data record repository (blocks 220, 225). The same or different repositories may be used, e.g., different ones for different students, schools, different type of student record, and the like. Cumulative analysis reports can be generated for respective students by summing collected RVUs by microcompetencies (block 230). The reports can be generated automatically over time (e.g., daily, weekly, monthly) and/or upon request. The minimum threshold that establishes satisfactory cognition for a particular topic (e.g., microcompetencies) can be changed over time by a defined user (not student) to account for educational progression. The reports can be customized to block data or present only defined fields of data, depending on user-based access privileges as discussed above. The reports (particularly, where student identifiers are present) can be sent to an email account or placed on a secure (restricted) web portal. The student can define how often to receive such a report at log-in or set-up (or such a report may be based on a default action), or a student may request a report by accessing the web portal. Some systems may automatically send the student a report when a cumulative summary report indicates that one or more microcompetencies scores is below a desired threshold at that point in time.

As will be appreciated by one of skill in the art, embodiments of the invention may be embodied as a method, system, data processing system, or computer program product. Accordingly, the present invention may take the form of an entirely software embodiment or an embodiment combining software and hardware aspects, all generally referred to herein as a "circuit" or "module." Furthermore, the present invention may take the form of a computer program product on a computer usable storage medium having computer usable program code embodied in the medium. Any suitable computer readable medium may be utilized including hard disks, CD ROMs, optical storage devices, a transmission media such as those supporting the Internet or an intranet, or magnetic or other electronic storage devices.

Computer program code for carrying out operations of the present invention may be written in an object oriented programming language such as Java, Smalltalk, C# or C++. However, the computer program code for carrying out operations of the present invention may also be written in conventional procedural programming languages, such as the "C" programming language or in a visually oriented programming environment, such as Visual Basic.

Certain of the program code may execute entirely on one or more of a user's computer, partly on the user's computer, as a stand alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider). Typically, some program code executes on at least one web (hub) server and some may execute on at least one web client and with communication between the server(s) and clients using the Internet.

The invention is described in part below with reference to flowchart illustrations and/or block diagrams of methods, systems, computer program products and data and/or system architecture structures according to embodiments of the invention. It will be understood that each block of the illustrations, and/or combinations of blocks, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the block or blocks.

These computer program instructions may also be stored in a computer readable memory or storage that can direct a computer or other programmable data processing apparatus to function in a particular manner, such that the instructions stored in the computer readable memory or storage produce an article of manufacture including instruction means which implement the function/act specified in the block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the block or blocks. The Internet can be accessed via any desired device having access to the Internet including wireless or hard-wired communication systems (such as cellular telephones), PDAs, desktop or portable computers including lap or handheld computers, notebook computers, and the like.

Figure 10:
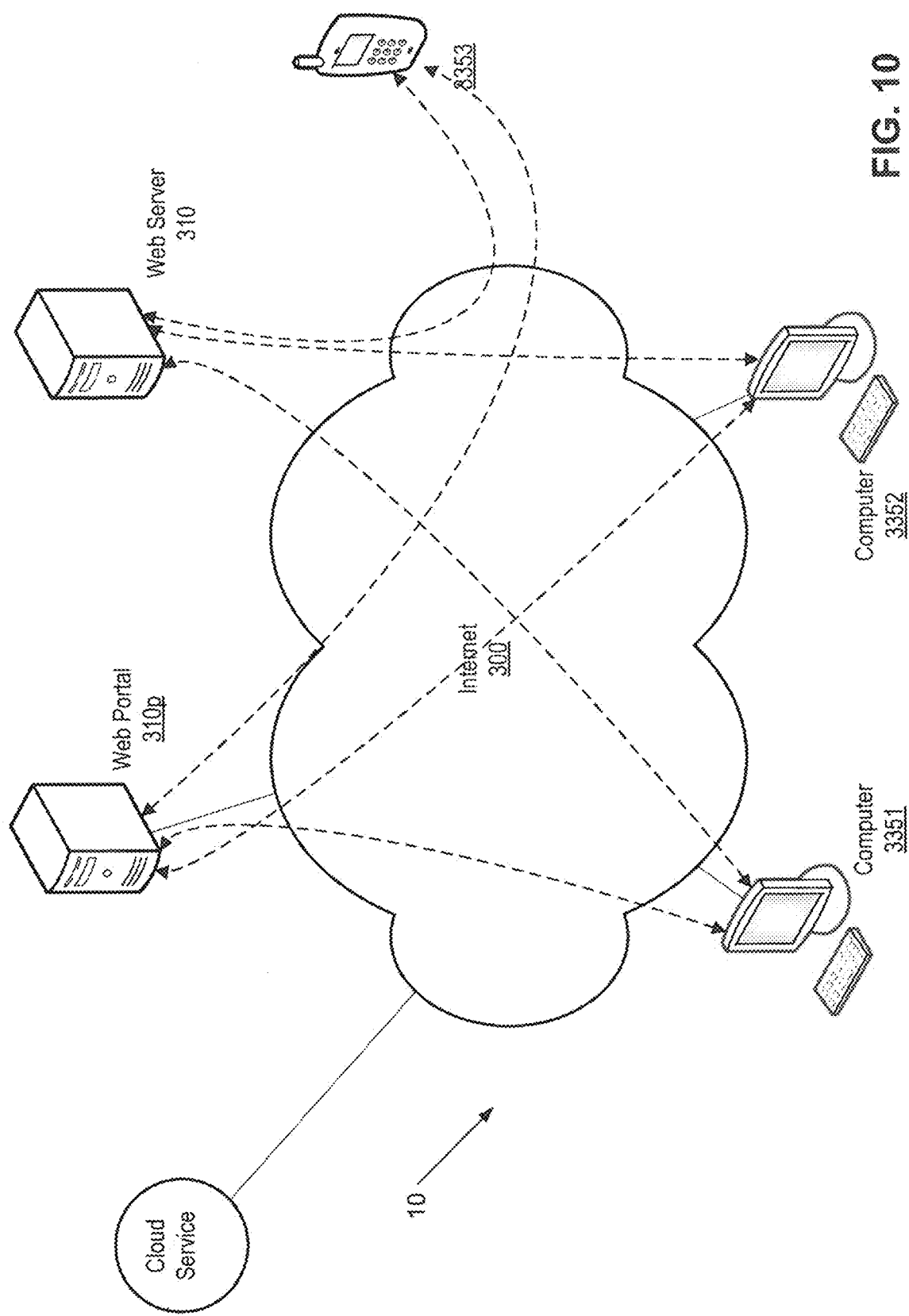
FIG. 10 is a schematic illustration of one example of a web-based system according to some embodiments of the present invention.

Referring to FIG. 10, in some embodiments, the system 10 includes at least one web server 310 (which may be provided by an online communications provider such as Yammer®) and a plurality of web clients 3351-3352. Although illustrated as two web client, the number of web client may be substantially more than two and may vary by institution (numbers of participating students, administrators and teachers/professors or other educators), typically, is between 100-10,000, for a respective institution, or even more, corresponding to the number of registered users. Some of the users can communicate with the system 10 via any suitable device having website browsing capability, including, for example, PDAs and/or cellular telephones 3353 as shown in FIG. 10. Thus, for example, a professor user can communicate with the student user during a discussion event via the Internet 300 using a PDA (personal digital assistant), notebook or cellular telephone having web-browsing capability (or palm, laptop or desktop computer).

The at least one web server 310 can include a single web server as a control node (hub) or may include a plurality of servers (not shown) providing a web portal 310p. The system 10 can also include routers (not shown). For example, a router can coordinate privacy rules on data exchange or access. Where more than one server is used, different servers (and/or routers) may execute different tasks or may share tasks or portions of tasks. For example, the system 10 can include one or combinations of more than one of the following: a security management server, a registered participant/user directory server, a student record management server, and the like. The system 10 can include firewalls and other secure connection and communication protocols. For Internet based applications, the server 310 and/or at least some of the associated web clients 35 can be configured to operate using SSL (Secure Sockets Layer) and a high level of encryption. Furthermore, given the ubiquitous nature of the Internet, web-access devices may readily be moved from site to site. Additionally, additional security functionality may also be provided. For example, incorporation of a communication protocol stack at the client and the server supporting SSL communications or Virtual Private Network (VPN) technology such as Internet Protocol Security Architecture (IPSec) may provide for secure communications between the student sites and other sites to thereby assure privacy.

The server 310 can provide a centralized administration and management application. The server 310 can be configured to provide session management, tracing and logging systems management, workload management and member services. The server 310 can include or communicate with a plurality of databases including participant/user profiles, a security directory, routing security rules, and student records. The server 310 can include several sub-servers for integration into web systems, such as, but not limited to, a web application server (WAS) which may comprise an IBM WebSphere Application Server, a Directory Server such as an LDAP directory server, and may include an Anonymous Global Patient Identifier (AGPI) Server, a DB2 Server, and a Simple Mail Transfer Protocol (SMTP) Server. It is noted that although described herein as "servers" other suitable computer configurations may be used. The server 310 can be configured with web application functions that appear at portal sites. The server 310 may comprise and/or be configured as a Web Sphere Business Integration (WBI) server. The web server 310 can include a web-based administration application. The web application can be used to: allow a user to register as a participant, manage Access Control Lists (ACLs), logon using universal ID or password access, logoff, define profile preferences, search, participate in discussion events and the like.

The web clients 3351-3352 can be associated with different users and different user categories or types. Each category or type may have a different "privilege" or access level to actions or data associated with the systems 10. For example, the systems 10 can include student users, administrative users, and teacher/professor users, each of which can have different access levels or restrictions to data and/or actions allowed by the system.

The web clients 3351, 3352 can be distributed at different geographic locations in different time zones and states or even countries. In other embodiments, the web clients 35 can be at a single educational center. Different user types may be at different geographic locations.

As noted above, the clients may include webcams or cameras to allow for multimedia communication during some discussion or some experiential events, for example.

Figure 11:
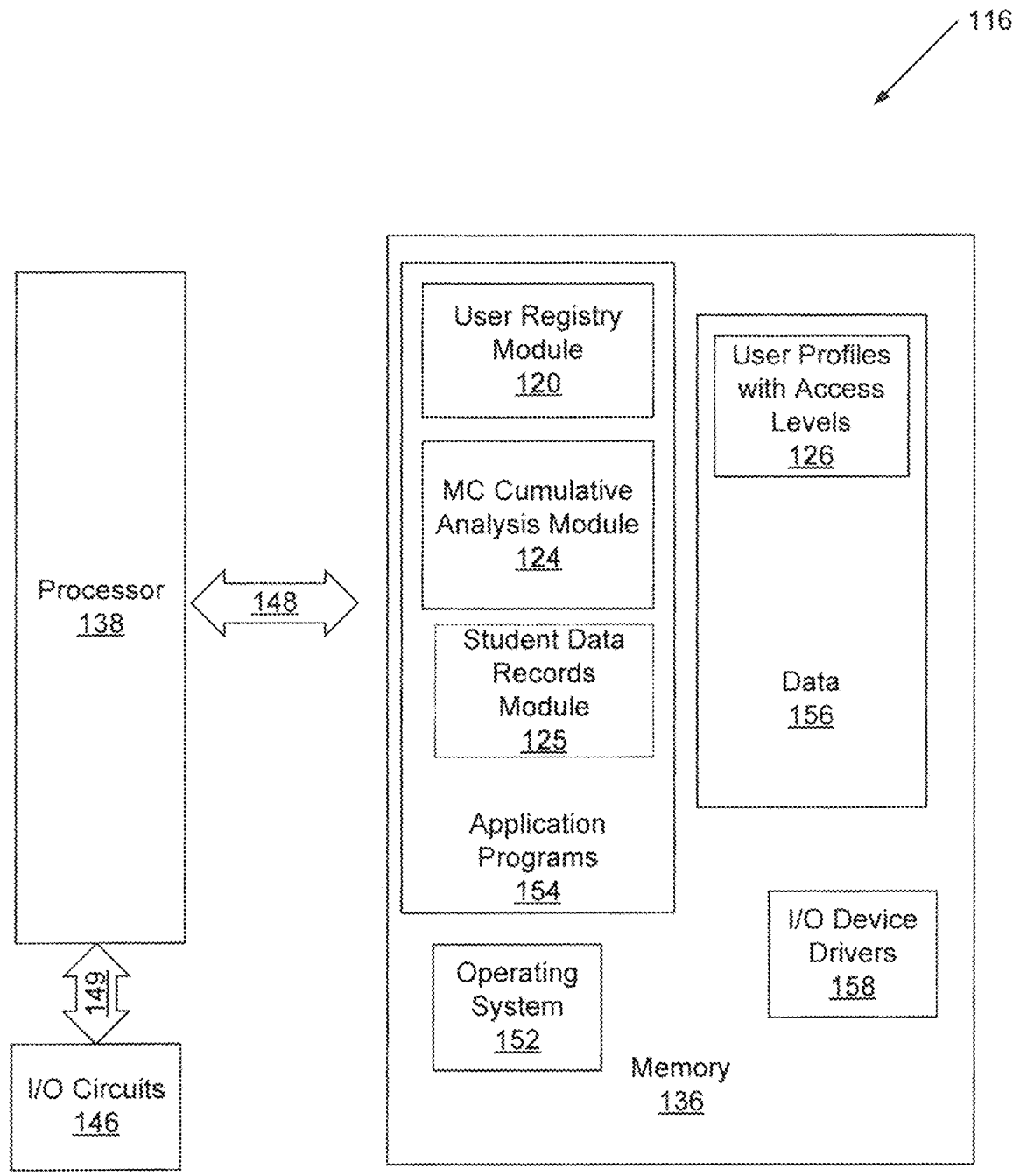
FIG. 11 is a block diagram of a data processing system according to some embodiments of the present invention.

FIG. 11 illustrates an exemplary data processing system or database environment that may be included in devices operating in accordance with some embodiments of the present invention. As illustrated in FIG. 11, a data processing system 116 which can be used to carry out or direct operations of the hub and/or web application (e.g., comprising an Administrative Server) includes a processor 138, memory 136 and input/output circuits 146. The data processing system may be incorporated in, for example, one or more of a personal computer, server, router, or other device with web access/functionality. The processor 138 communicates with the memory 136 via an address/data bus 148 and communicates with the input/output circuits 146 via an address/data bus 149. The input/output circuits 146 can be used to transfer information between the memory (memory and/or storage media) 136 and another computer system or a network using, for example, an Internet protocol (IP) connection. These components may be conventional components such as those used in many conventional data processing systems, which may be configured to operate as described herein.

In particular, the processor 138 can be commercially available or custom microprocessor, microcontroller, digital signal processor or the like. The memory 136 may include any memory devices and/or storage media containing the software and data used to implement the functionality circuits or modules used in accordance with embodiments of the present invention. The memory 136 can include, but is not limited to, the following types of devices: cache, ROM, PROM, EPROM, EEPROM, flash memory, SRAM, DRAM and magnetic disk. In some embodiments of the present invention, the memory 136 may be a content addressable memory (CAM).

As further illustrated in FIG. 11 the memory (and/or storage media) 136 may include several categories of software and data used in the data processing system: an operating system 152, application programs 154, input/output device drivers 158, and data 156. The application programs can include a User Registry Module 120, a Microcompetency Cumulative Analysis Module 124, a Student Data Records Module 125, and the like. The data 156 can include user profiles with defined access levels 126. The user profiles 126 may additionally or alternately include an application program.

The data processing system 116 can include a Trend Analysis Module (that may be an application program similar to the modules discussed above with respect to FIG. 11) that can access electronically stored student test records and underlying cohort data and generate a visual output/display of a graph of test trends. A trend can be electronically generated and shown on a display associated with a client 35 (e.g., an administrator, professor/teacher, or student. The trend can be in graphic form and may indicate a risk of failure or a need for an intervention or adjustment in a curriculum based at least in part on the results. The system 10 can be configured to generate a "flag" that increases the report frequency if a student (or group of students or a particular class) is identified as being below minimum. The system 10 may also be configured to alert students, advisors, professors/teachers via email, postal mail and/or using text messages or other suitable communication protocol to notify one or more of a negative trend or a "failure" in one or more microcompetencies.

As will be appreciated by those of skill in the art, the operating system 152 may be any operating system suitable for use with a data processing system, such as, but not limited to, those from Microsoft, Inc. (Windows), Apple Computer, Inc. (MacOS), Wind River (VxWorks), RedHat (Linux), LabView or proprietary operating systems. The input/output device drivers 158 typically include software routines accessed through the operating system 152 by the application programs 154 to communicate with devices such as the input/output circuits 146 and certain memory 136 components. The application programs 154 are illustrative of the programs that implement various features of the circuits and modules according to some embodiments of the present invention. Finally, the data 156 represents the static and dynamic data used by the application programs 154, the operating system 152, the input/output device drivers 158 and other software programs that may reside in the memory 136.

While the present invention is illustrated with reference to the application programs 120, 124, 125 in FIG. 11 as will be appreciated by those of skill in the art, other configurations fall within the scope of the present invention. For example, rather than being application programs 154 these circuits and modules may also be incorporated into the operating'system 152 or other such logical division of the data processing system. Furthermore, while the application programs 120, 124, 125 (122) are illustrated as modules in a single data processing system, as will be appreciated by those of skill in the art, such functionality may be distributed across one or more data processing systems. Thus, the present invention should not be construed as limited to the configuration illustrated in FIG. 11 but may be provided by other arrangements and/or divisions of functions between data processing systems. For example, although FIG. 11 is illustrated as having various circuits and modules, one or more of these circuits or modules may be combined without departing from the scope of the present invention.

Typically, during "on-boarding" or customer set-up, a client 35 is brought into the network or system 10 and assigned one or more privacy levels based on a legal or organizational entitlement to send and/or receive certain types (and/or content) of data. An organization may include one or a plurality of web clients 35, each with one or more different assigned privacy levels. The privacy level can define what data that entity or person associated with that entity can receive, send or access.

Figure 12:
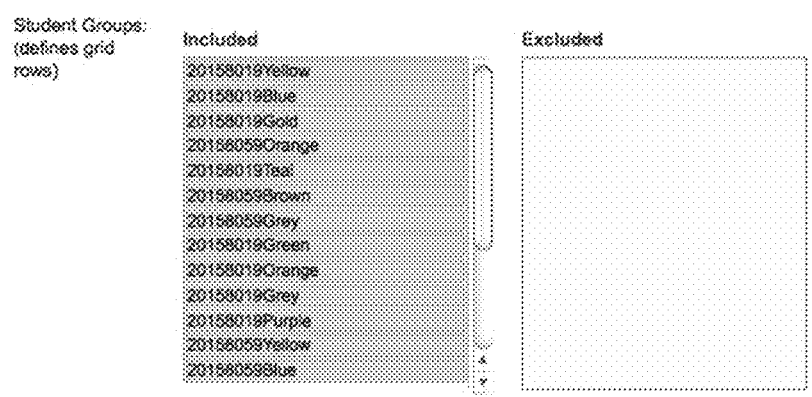
FIG. 12 is a screen shot of a graphical user interface for a sub-cohort manager according to some embodiments of the present invention.

Brief reference is now made to FIG. 12, which is a screen shot of a graphical user interface for a sub-cohort manager according to some embodiments of the present invention. As illustrated, student groups may be created and/or modified by including or excluding specific individuals. As illustrated, no individuals are shown as being excluded from the example sub-cohort. In some embodiments, the student groups may be used to define the grid rows (FIG. 16, 202) for an interactive evaluation grid 200.

Reference is now made to FIG. 13, which is a screen shot of a graphical user interface for a summative report after discussion grading according to some embodiments of the present invention. Note that the specific post authors, which are listed in the "Post Author" column are redacted from the screen shot. Each line in the report corresponds to a single post made in a discussion event. For each post, the type of post (e.g., Student Post Logistics, Student Post Content, Faculty Post Guidance, Student Post Other, etc.), the identifications of ay applicable microcompetencies, and a corresponding RVU may be listed. In addition, a comment field is provided to receive and record any comments for each post.

Reference is now made to FIG. 14, which is a screen shot of a graphical user interface for a post verification report before the data is submitted to the grid according to some embodiments of the present invention. The post verification report may provide a RVU Commit Summary portion that summarize the students and corresponding RVUs in a discussion event. Additionally, a Student Posts portion may provide a detailed report of each student in the discussion event and the microcompetencies and corresponding RVUs earned therein. Additionally, a Group Overview Portion may provide a detailed report of the group total microcompetencies and corresponding RVUs earned in the discussion event.

Figure 15:
FIG. 15 is a screen shot of a graphical user interface for a managing submitted reports according to some embodiments of the present invention.

Reference is now made to FIG. 15, which is a screen shot of a graphical user interface for a managing submitted reports according to some embodiments of the present invention. The user interface may include a "committed" status indicator, and columns for the date, the course identifier, the group identifier and the discussion grading summary for each of the committed discussion events.

Reference is now made to FIG. 16, which is a partial screen shot of an exemplary interactive evaluation grid 200 that is parsed to display a single system according to some embodiments of the present invention. As discussed above, as the evaluation grid is interactive, it may be also referenced as a graphical user interface. As illustrated, the parsed grid represents grid data corresponding to the musculoskeletal system. The student identifiers (Student #) are redacted from the screen, but are understood to be the unique identifiers corresponding to different students, which correspond to rows in the grid. The columns in the grid correspond to the sub-topics in and/or related to the musculoskeletal system. The total number of points within musculoskeletal system may be provided as well as high, low and average points corresponding to each sub-topic.

Reference is now made to FIG. 17, which is a partial screen shot of a graphical user interface for a managing an interactive evaluation grid according to some embodiments of the present invention. The grid manager may list each of the grids that are currently defined. In this manner, a single interface screen may provide selection and access where multiple grids are presented for editing.

Reference is now made to FIG. 18, which is a partial screen shot of an exemplary interactive evaluation grid that is parsed to analyze the data by discipline according to some embodiments of the present invention. As illustrated, the parsed grid represents grid data corresponding to the anatomy discipline. The student identifiers (Student #) are redacted from the screen, but are understood to be the unique identifiers corresponding to different students, which correspond to rows in the grid. The columns in the grid correspond to the sub-topics in and/or related to the anatomy discipline. The total number of points within anatomy discipline may be provided as well as high, low and average points corresponding to each sub-topic.

Brief reference is made to FIG. 19, which is a partial screen shot of a graphical user interface according to some embodiments of the present invention. Some embodiments of the user interface include a component of the interactive evaluation grid that allows selective viewing of one or more modalities and provides for the definition of the analysis time interval. For example, the analysis time interval may be selected by identifying start and stop times and/or dates of the desired interval.

Brief reference is made to FIG. 20, which is a screen shot of a graphical user interface of a cohort manager according to some embodiments of the present invention. As illustrated, the cohort manager may be used to determine which students and faculty are included in the cohort. For example, student or faculty names may be selected and moved from the excluded window to the included window to identify members of a cohort.

Reference is now made to FIG. 21, is a partial screen shot of a graphical user interface for a managing an interactive evaluation grid according to some embodiments of the present invention. As illustrated, where competencies, such as, for example, "03 Anatomy Discipline" may be defined by and/or correspond to multiple microcompetencies, which may be listed and displayed in an associated scrollable window.

Figures 22, 23:
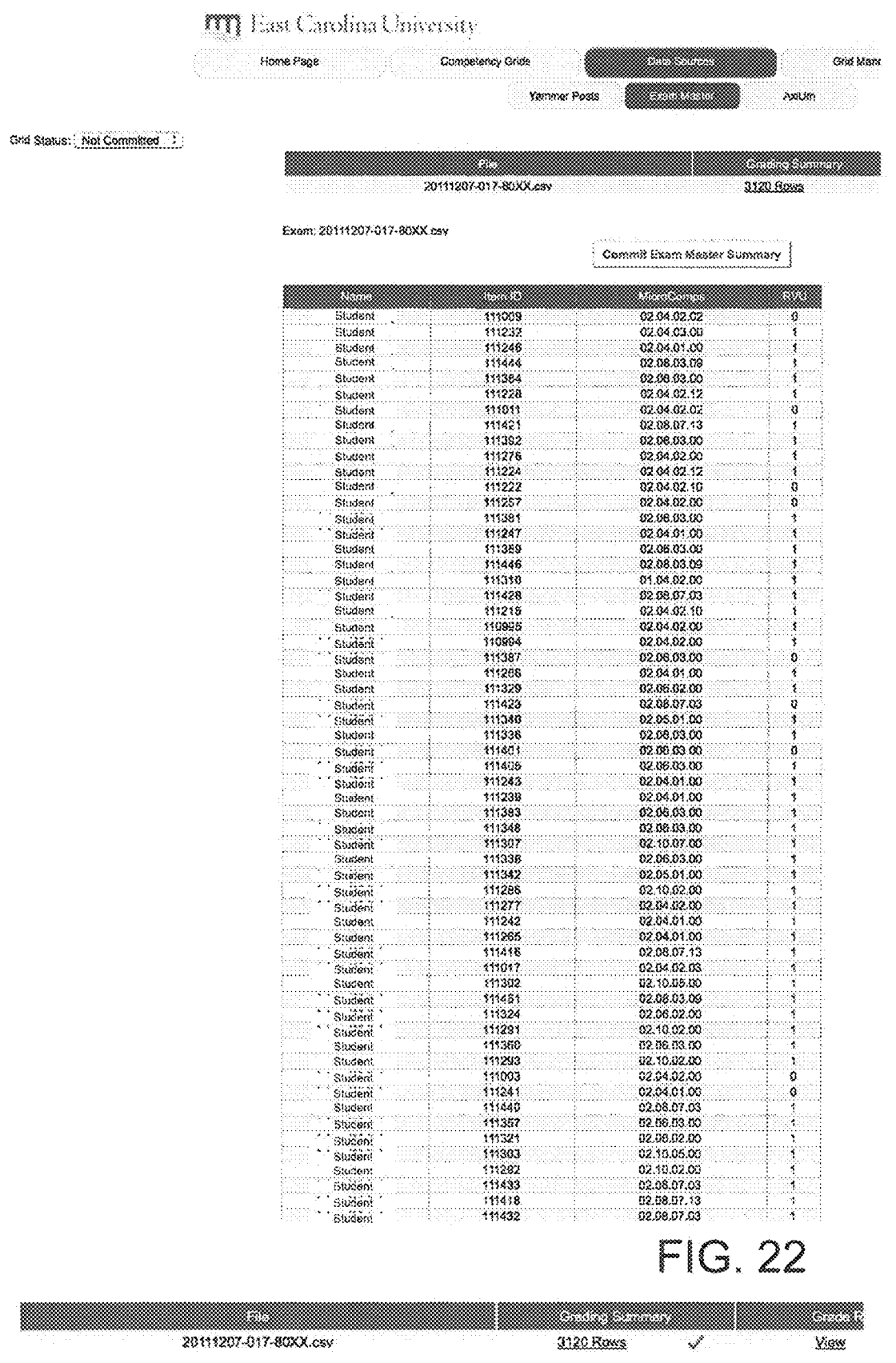

Reference is now made to FIG. 22, which is a screen shot of a graphical user interface illustrating raw imported exam data after an item analysis has been performed according to some embodiments of the present invention. A didactic exam is a series of binary events that are presented to test-takers so they can make the binary choice. A learning management system, as disclosed herein is irrelevant to the result of the completed exam for a specific cohort. In some embodiments, the result of an exam is a simple delimited file that includes the following data for each test item: unique student identifier; test item identifier; microcompetency code; binary choice (0 for incorrect, 1 for correct); and relative value unit. For an exam with 100 questions for 10 students, the resultant file will have 1000 rows for these four columns of data. Some embodiments provide that when the file is imported three additional items may be added, namely: program identifier (school, university, etc); date of exam; and course identifier. Once the raw data is digested into the data source environment, the raw data is listed exactly as the raw import file as a first check for validation. As illustrated, the raw imported exam data includes a row for each test item identifier. In some embodiments, each row may include the name (or identifier) of the student, the test item identifier (i.e., which exam question), the associated microcompetency and the earned RVU. Once the raw data is digested into the data source environment, the raw data is listed exactly as the raw import file as a first check for validation. A comparison with the original delimited file can be done manually or programmatically.

Brief reference is made to FIG. 23, which is a partial screen shot of a graphical user interface for checking a raw data report in preparation for validation according to some embodiments of the present invention. A comparison to the grading summary, which lists how many rows are in the raw import display may be useful in identifying in under and/or over inclusions of data corresponding to the exam data.

At this point the administrator "commits" the raw data for conversion from binary presentation to microcompetency presentation. Each student is represented with a summary of the points by microcompetency. Multiple questions in one exam may have the same microcompetency designation. The total number of points (RVUs) is then validated against the original number of points that the learning management system calculated in the binary presentation. As such, this step converts individual test items to topic-associated results.

Figure 24:
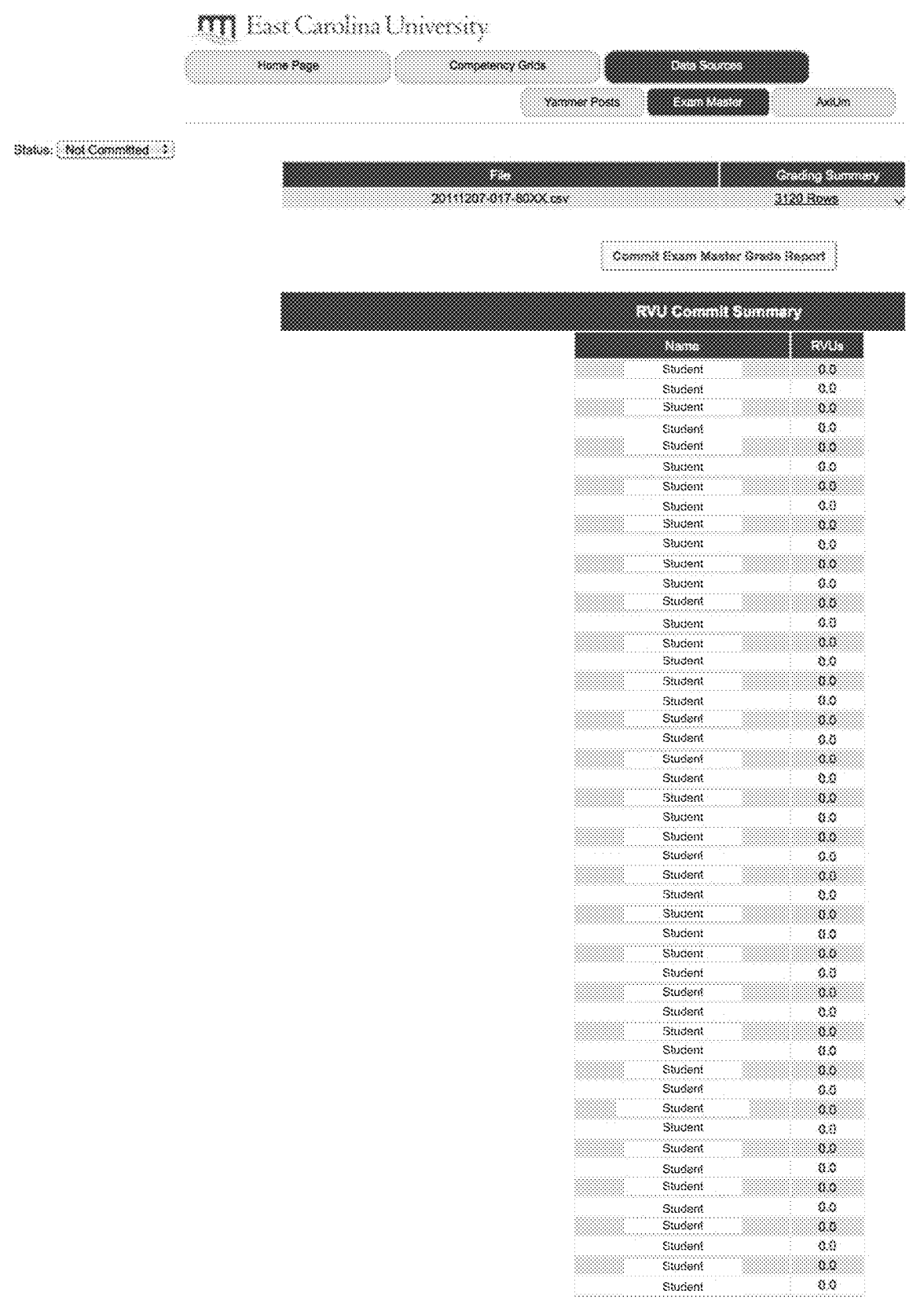

Brief reference is made to FIG. 24, which is a screen shot of a graphical user interface illustrating an RVU commit summary screen before the data is committed according to some embodiments of the present invention. Note that before the data is committed, as indicated by the status "Not Committed", the RVUs in the RVU Commit Summary are displayed as 0.0.

Reference is now made to FIG. 25, which is a partial screen shot of a graphical user interface illustrating data that was collected and merged by microcompetency code according to some embodiments of the present invention. The student scores are displayed for an administrator or other evaluator to commit the data. For each student, a total RVU is indicated, and RVUs for each microcompetency are listed. Some embodiments provide an approval interface, such as, for example a button or check box. As a separate step, the administrator manually validates that the number of RVUs is correct with a check step.

Figure 26:
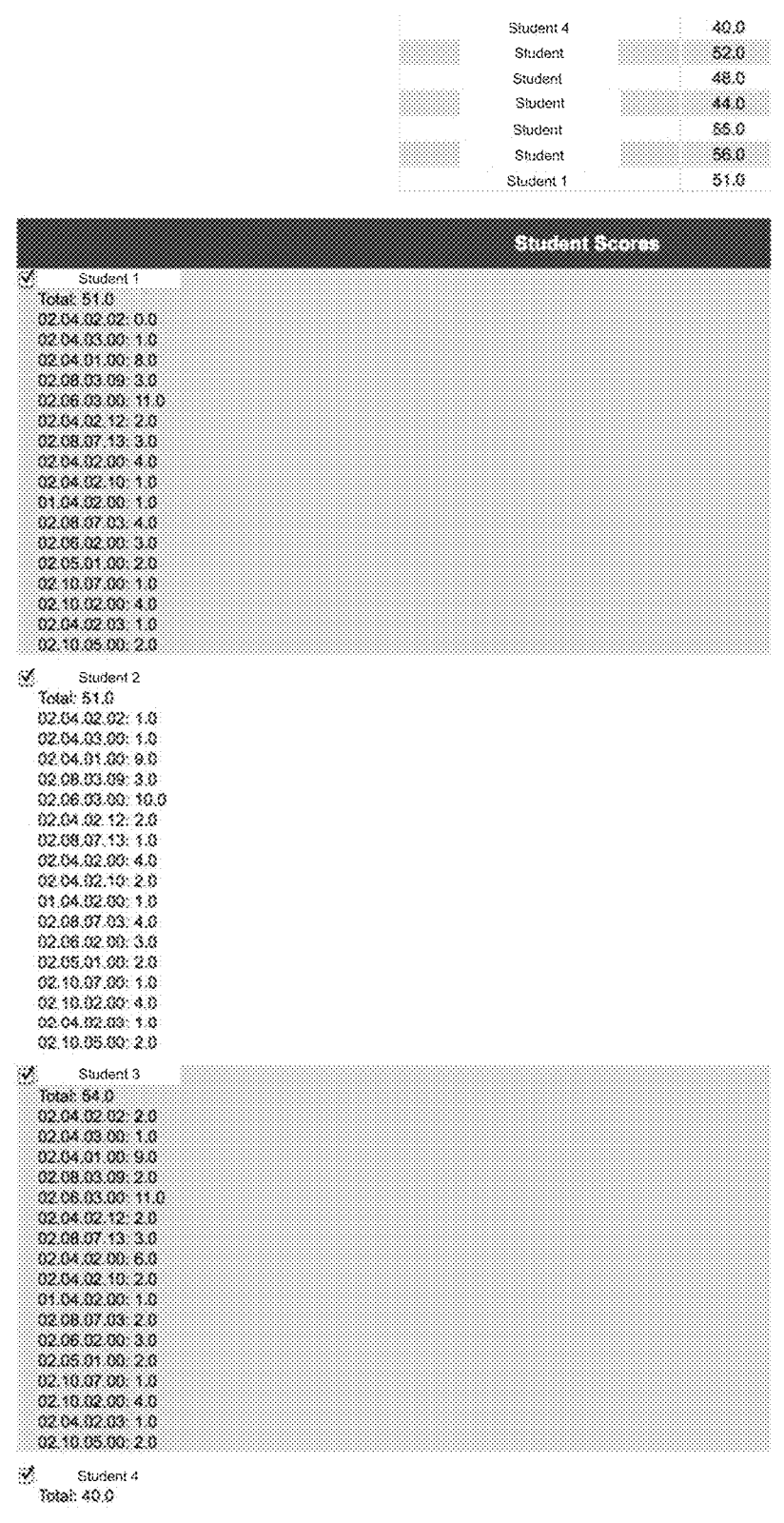

Reference is now made to FIG. 26, which is a screen shot of a graphical user interface illustrating data that was collected and merged by microcompetency code and that has been verified to provide all students with the correct score according to some embodiments of the present invention. Note that each of the student check boxes are selected indicating that the data has been verified. Additionally, referring to FIG. 27, which is a partial screen shot of a graphical user interface illustrating the RVU commit summary screen that includes the scores ready to commit to the grid according to some embodiments of the present invention, when the data is checked it moves the points to a commit summary data page for one remaining check.

After validation, each data element is stored to the common data repository with a unique identifier. The data may be represented in the grid based on the rules of the specific grid. For example, exam data may parse in grids where exam data is supposed to be displayed.

One must appreciate the importance of the validation steps. The resulting grid depends on the correct assignment of microcompetency codes to exam items and the aggregation of this data for representation. Important decisions about student weakness and strength may be made based on the grid data. The aggregate data page associates the student points with the specific student. When the administrator is satisfied that the data is correct, they will "commit" a grade report to the grid for display. The import file is tagged as "committed" and the next file is encountered.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. In the claims, means-plus-function clauses, where used, are intended to cover the structures described herein as performing the recited function and not only structural equivalents but also equivalent structures. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The invention is defined by the following claims, with equivalents of the claims to be included therein.

That which is claimed is:

1. A computer program product for generating an assessment of a student in an online electronic discussion environment comprising a presentation tier, a business logic tier in communication with the presentation tier, and a student record data tier in communication with the presentation tier and the business logic tier, the computer program product-comprising a non-transitory computer readable storage medium having computer readable program code embodied in the medium that when executed by at least one processor causes the at least one processor to perform operations, comprising:

obtaining discussion data from the student record data tier comprising a plurality of discussion posts in a data file, each comprising a post author and post content;

automatically grouping, by the business logic tier, the plurality of discussion posts of the data file into a plurality of discussion threads;

automatically classifying, by the business logic tier, individual discussion posts of the plurality of discussion posts based on a post type, where the post type is automatically determined based on a keyword analysis and/or a textual analysis of the respective individual discussion posts;

assigning, by the business logic tier, relative value units (RVUs) to at least one of the plurality of discussion posts, wherein the RVUs are time-normalized scores based on a complexity of the at least one of the plurality of discussion posts, wherein assigning the RVUs to the at least one of the plurality of discussion posts is automatically determined by the business logic tier based, at least in part, on a number of keywords in the at least one of the plurality of discussion posts;

generating, by the business logic tier, the assessment of the student based on the RVUs assigned to the at least one of the plurality of discussion posts; and presenting, by the presentation tier, the assessment of the student via a user interface communicatively coupled to the at least one processor.

2. The computer program product of claim 1, wherein automatically classifying the individual discussion posts of the plurality of discussion posts based on the post type comprises classifying the individual discussion posts of the plurality of discussion posts as at least one of a case post type, a guidance post type, an other post type, a content post type, a logistics post type, or a trash post type.

3. The computer program product of claim 2, wherein automatically assigning the RVUs to at least one of the plurality of discussion posts comprises assigning the RVUs to at least one of the plurality of discussion posts of the content post type.

4. The computer program product of claim 1, wherein the operations further comprise assigning a microcompetency code to the at least one of the plurality of discussion posts, wherein the microcompetency code corresponds to one or more skills contributing to competence of the student.

5. The computer program product of claim 1, wherein the operations further comprise:

automatically calculating, by the business logic tier, a number of discussion posts of a post type in which the student is the post author; and automatically determining, by the business logic tier, a leadership assessment for the student based on the calculated number of discussion posts of the post type in which the student is the post author.

6. The computer program product of claim 5, wherein the student is one of a plurality of students contributing the plurality of discussion posts, and wherein the operations further comprise:

automatically calculating, by the business logic tier, a median number of discussion posts of the post type contributed by the plurality of students;

automatically dividing, by the business logic tier, the number of discussion posts of the post type in which the student is the post author by the median number of discussion posts of the post type contributed by the plurality of students to generate a post score for the student;

automatically multiplying, by the business logic tier, the post score by a weight assigned to the post type to generate an adjusted post score; and automatically determining, by the business logic tier, the leadership assessment for the student based on the adjusted post score.

7. The computer program product of claim 1, wherein one RVU corresponds to a predetermined number of minutes of discussion.

8. The computer program product of claim 1, wherein the operations further comprise:

prior to assigning the RVUs to the at least one of the plurality of discussion posts, electronically receiving a self-assessment of the at least one of the plurality of discussion posts by the student.

9. The computer program product of claim 8, wherein the operations further comprise:

based on a determination that the self-assessment is discordant with the assigned RVUs, adjusting the assigned RVUs downward.

10. A computer analysis system for generating an assessment of a student of a plurality of students in an online discussion environment, the system comprising:
a processor;
a display coupled to the processor; and
a memory coupled to the processor and storing computer readable program code that when executed by the processor causes the processor to perform operations comprising:
obtaining discussion data comprising a plurality of discussion posts in a data file, each comprising a post author and post content;
automatically classifying individual discussion posts of the plurality of discussion posts based on one of a plurality of post types, the plurality of post types comprising at least a first post type and a second post type;
assigning relative value units (RVUs) to at least one of the plurality of discussion posts of the first post type in which the student is the post author, wherein the RVUs are time-normalized scores based on a complexity of the at least one of the plurality of discussion posts;
automatically calculating a first number that is representative of the discussion posts that are of the second post type authored by the plurality of students;
automatically calculating a second number of the discussion posts that are of the second post type authored by the student;
automatically generating a post score for the student based on a comparison of the first number to the second number;
automatically adjusting the post score based on a predetermined weight of the discussion posts of the second post type to generate a leadership assessment for the student; and
automatically generating the assessment of the student based on the assigned RVUs and the leadership assessment.

11. The system of claim 10, wherein the plurality of post types comprise a case post type, a guidance post type, an other post type, a content post type, a logistics post type, and a trash post type.

12. The system of claim 11, wherein the first post type is the content post type, and
wherein assigning the RVUs to at least one of the plurality of discussion posts comprises assigning the RVUs to at least one of the plurality of discussion posts of the content post type.

13. The system of claim 10, wherein the operations further comprise assigning a microcompetency code to the at least one of the plurality of discussion posts, wherein the microcompetency code corresponds to one or more skills contributing to competence of the student.

14. The system of claim 10, wherein automatically calculating the first number that is representative of the discussion posts that are of the second post type authored by the plurality of students comprises calculating a median number of discussion posts of the second post type contributed by the plurality of students,
wherein automatically generating the post score for the student based on the comparison of the first number to the second number comprises dividing the second number of discussion posts of the second post type authored by the student by the median number of discussion posts of the second post type authored by the plurality of students to generate the post score for the student, and
wherein automatically adjusting the post score based on the predetermined weight of the discussion posts of the second post type to generate the leadership assessment comprises:
multiplying the post score by the predetermined weight assigned to the second post type to generate an adjusted post score; and
automatically generating the leadership assessment for the student based on the adjusted post score.

15. The system of claim 10, wherein one RVU corresponds to a predetermined number of minutes of discussion, and
wherein assigning the RVUs to the at least one of the plurality of discussion posts of the first post type in which the student is the post author is automatically determined based on a number of keywords in the at least one of the plurality of discussion posts.

16. A computer program product for operating an electronic device to generate an assessment of a student of a plurality of students in an online discussion environment comprising a non-transitory computer readable storage medium having computer readable program code embodied in the medium that when executed by a processor causes the processor to perform operations comprising:
obtaining discussion data comprising a plurality of discussion posts in a data file, each comprising a post author and post content;
automatically classifying individual discussion posts of the plurality of discussion posts based on one of a plurality of post types, the plurality of post types comprising at least a first post type and a second post type;
assigning relative value units (RVUs) to at least one of the plurality of discussion posts of the first post type in which the student is the post author, wherein the RVUs are time-normalized scores based on a complexity of the at least one of the plurality of discussion posts;
automatically calculating a first number that is representative of the discussion posts that are of the second post type authored by the plurality of students;
automatically calculating a second number of the discussion posts that are of the second post type authored by the student;
automatically generating a post score for the student based on a comparison of the first number to the second number;
automatically adjusting the post score based on a predetermined weight of the discussion posts of the second post type to generate a leadership assessment for the student; and
automatically generating the assessment of the student based on the assigned RVUs and the leadership assessment.

17. The computer program product of claim 16, wherein the plurality of post types comprise a case post type, a guidance post type, an other post type, a content post type, a logistics post type, and a trash post type.

18. The computer program product of claim 17, wherein the first post type is the content post type, and
wherein assigning the RVUs to at least one of the plurality of discussion posts comprises assigning the RVUs to at least one of the plurality of discussion posts of the content post type.

19. The computer program product of claim 16, wherein automatically calculating the first number that is representative of the discussion posts that are of the second post type authored by the plurality of students comprises calculating a median number of discussion posts of the second post type contributed by the plurality of students,
> wherein automatically generating the post score for the student based on the comparison of the first number to the second number comprises dividing the second number of discussion posts of the second post type authored by the student by the median number of discussion posts of the second post type authored by the plurality of students to generate the post score for the student, and
>
> wherein automatically adjusting the post score based on the predetermined weight of the discussion posts of the second post type to generate the leadership assessment comprises:
>> multiplying the post score by the predetermined weight assigned to the second post type to generate an adjusted post score; and
>>
>> automatically generating the leadership assessment for the student based on the adjusted post score.

20. The computer program product of claim 16, wherein the operations further comprise:
> prior to assigning the RVUs to the at least one of the plurality of discussion posts, electronically receiving a self-assessment of the at least one of the plurality of discussion posts by the student; and
>
> based on a determination that the self-assessment is discordant with the assigned RVUs, adjusting the assigned RVUs downward.

* * * * *

UNITED STATES PATENT AND TRADEMARK OFFICE
CERTIFICATE OF CORRECTION

PATENT NO. : 11,170,658 B2  
APPLICATION NO. : 16/117827  
DATED : November 9, 2021  
INVENTOR(S) : Robert Todd Watkins, Jr.

Page 1 of 1

It is certified that error appears in the above-identified patent and that said Letters Patent is hereby corrected as shown below:

On the Title Page

(56) References Cited, U.S. PATENT DOCUMENTS, Column 2, Line 5:  
Please correct "Kijlack" to read -- Kulack --

(56) References Cited, OTHER PUBLICATIONS, Page 2, Column 2, Line 20:  
Please correct "Aug. 21. 2018" to read -- Aug. 21, 2018 --

(56) References Cited, OTHER PUBLICATIONS, Page 2, Column 2, Line 25:  
Please correct "2011280014075.4" to read -- 201280014075.4 --

In the Specification

Column 13, Line 47:  
Please correct "DS SRs" to read -- DSSRs --

Signed and Sealed this  
Twenty-second Day of March, 2022

Drew Hirshfeld  
*Performing the Functions and Duties of the*  
*Under Secretary of Commerce for Intellectual Property and*  
*Director of the United States Patent and Trademark Office*